United States Patent
Nagahama et al.

(10) Patent No.: US 10,165,498 B2
(45) Date of Patent: Dec. 25, 2018

(54) MANAGEMENT DEVICE, TERMINAL DEVICE, AND MANAGEMENT METHOD PERFORMING PROCESS OF SELECTING RESOURCE OF RADIO LINK

(71) Applicant: JVC KENWOOD Corporation, Yokohama-shi, Kanagawa (JP)

(72) Inventors: Tomonori Nagahama, Yokohama (JP); Ichiro Shishido, Yokohama (JP); Tomoko Yaginuma, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/466,781

(22) Filed: Mar. 22, 2017

(65) Prior Publication Data

US 2017/0280376 A1  Sep. 28, 2017

(30) Foreign Application Priority Data

Mar. 23, 2016  (JP) ................. 2016-058758
Mar. 24, 2016  (JP) ................. 2016-060295
Sep. 23, 2016  (JP) ................. 2016-185758
Sep. 26, 2016  (JP) ................. 2016-186776

(51) Int. Cl.
   *H04W 48/06*  (2009.01)
   *H04W 16/10*  (2009.01)

(52) U.S. Cl.
   CPC ........... *H04W 48/06* (2013.01); *H04W 16/10* (2013.01)

(58) Field of Classification Search
   CPC . H04W 12/06; H04W 36/0072; H04W 36/18; H04W 72/005; H04W 72/0446; H04W 36/22; H04W 4/08; H04W 72/02; H04W 72/10; H04W 72/12; H04W 76/021; H04W 16/10; H04W 48/06
   See application file for complete search history.

(56) References Cited

U.S. PATENT DOCUMENTS

| | | | | |
|---|---|---|---|---|
| 5,655,219 A | * | 8/1997 | Jusa .................. | H04W 12/06 455/338 |
| 2006/0203713 A1 | * | 9/2006 | Laroia ............... | H04L 5/023 370/209 |
| 2007/0165587 A1 | * | 7/2007 | Choi .................. | H04W 72/06 370/338 |
| 2008/0085717 A1 | * | 4/2008 | Chhabra ............ | G06F 9/5011 455/450 |
| 2009/0175183 A1 | * | 7/2009 | Mochizuki ......... | H04W 36/18 370/252 |

(Continued)

FOREIGN PATENT DOCUMENTS

JP  2013-211803 A  10/2013

*Primary Examiner* — Jean Gelin
(74) *Attorney, Agent, or Firm* — Brundidge & Stanger, P.C.

(57) ABSTRACT

An acquirer acquires parameters that correspond to a plurality of base station devices using a resource for communication with a terminal device and can be used for predicting a shortage of a resource of each base station device. A generator generates information relating to a priority level of a resource desired to be used by a terminal device connected to one of the plurality of base station devices in accordance with the parameters acquired by the acquirer. A transmitter transmits the information generated by the generator.

15 Claims, 40 Drawing Sheets

(56) References Cited

U.S. PATENT DOCUMENTS

| | | | |
|---|---|---|---|
| 2009/0232143 A1* | 9/2009 | Li | H04W 72/1242 |
| | | | 370/395.3 |
| 2009/0290555 A1* | 11/2009 | Alpert | H04W 4/20 |
| | | | 370/331 |
| 2010/0080195 A1* | 4/2010 | Hara | H04W 4/20 |
| | | | 370/336 |
| 2014/0321376 A1* | 10/2014 | Damnjanovic | H04W 72/1215 |
| | | | 370/329 |
| 2016/0095074 A1* | 3/2016 | Park | H04W 8/005 |
| | | | 370/350 |
| 2016/0183138 A1* | 6/2016 | Murakami | H04W 36/0061 |
| | | | 370/332 |
| 2016/0192392 A1* | 6/2016 | Park | H04W 74/0875 |
| | | | 370/336 |
| 2017/0019791 A1* | 1/2017 | Shishido | H04L 63/104 |
| 2017/0238225 A1* | 8/2017 | Senarath | H04W 36/18 |
| | | | 370/331 |

* cited by examiner

FIG. 3A

| BASE STATION DEVICE | POSITION REGISTRATION NUMBER | ALLOWED VALUE |
|---|---|---|
| FIRST BASE STATION DEVICE | 140 | 100 |
| SECOND BASE STATION DEVICE | 50 | 100 |
| THIRD BASE STATION DEVICE | 70 | 100 |

| BASE STATION DEVICE | NEIGHBORING BASE STATION DEVICE |
|---|---|
| FIRST BASE STATION DEVICE | SECOND BASE STATION DEVICE |
| | THIRD BASE STATION DEVICE |
| SECOND BASE STATION DEVICE | FIRST BASE STATION DEVICE |
| | THIRD BASE STATION DEVICE |
| THIRD BASE STATION DEVICE | FIRST BASE STATION DEVICE |
| | SECOND BASE STATION DEVICE |

| BASE STATION DEVICE | CHANNEL |
|---|---|
| FIRST BASE STATION DEVICE | CHANNEL A |
| SECOND BASE STATION DEVICE | CHANNEL B |
| THIRD BASE STATION DEVICE | CHANNEL C |

| COMMAND | PARAMETER 1 | PARAMETER 2 |
|---|---|---|
| PRIORITY CHANNEL DESIGNATION | PRIORITY LEVEL (1:HIGH) | CHANNEL B |

FIG. 4B

| COMMAND | PARAMETER 1 | PARAMETER 2 | PARAMETER 3 | PARAMETER 4 |
|---|---|---|---|---|
| PRIORITY CHANNEL DESIGNATION | PRIORITY LEVEL (1:HIGH) | CHANNEL B | PRIORITY LEVEL (2:MIDDLE) | CHANNEL C |

FIG. 4C

| COMMAND | PARAMETER 1 | PARAMETER 2 | PARAMETER 3 | PARAMETER 4 | PARAMETER 5 | PARAMETER 6 |
|---|---|---|---|---|---|---|
| PRIORITY CHANNEL DESIGNATION | PRIORITY LEVEL (1:HIGH) | CHANNEL B | PRIORITY LEVEL (2:MIDDLE) | CHANNEL C | PRIORITY LEVEL (3:LOW) | CHANNEL A |

FIG. 6A

| SCAN CHANNEL LIST | |
|---|---|
| PRIORITY LEVEL (HIGH) | CHANNEL A |
| PRIORITY LEVEL (MIDDLE) | — |
| PRIORITY LEVEL (LOW) | — |

| SCAN CHANNEL LIST | |
|---|---|
| PRIORITY LEVEL (HIGH) | CHANNEL B |
| PRIORITY LEVEL (MIDDLE) | — |
| PRIORITY LEVEL (LOW) | — |

| SCAN CHANNEL LIST | |
|---|---|
| PRIORITY LEVEL (HIGH) | CHANNEL B |
| PRIORITY LEVEL (MIDDLE) | CHANNEL C |
| PRIORITY LEVEL (LOW) | — |

| SCAN CHANNEL LIST | |
|---|---|
| PRIORITY LEVEL (HIGH) | CHANNEL B |
| PRIORITY LEVEL (MIDDLE) | CHANNEL C |
| PRIORITY LEVEL (LOW) | CHANNEL A |

60

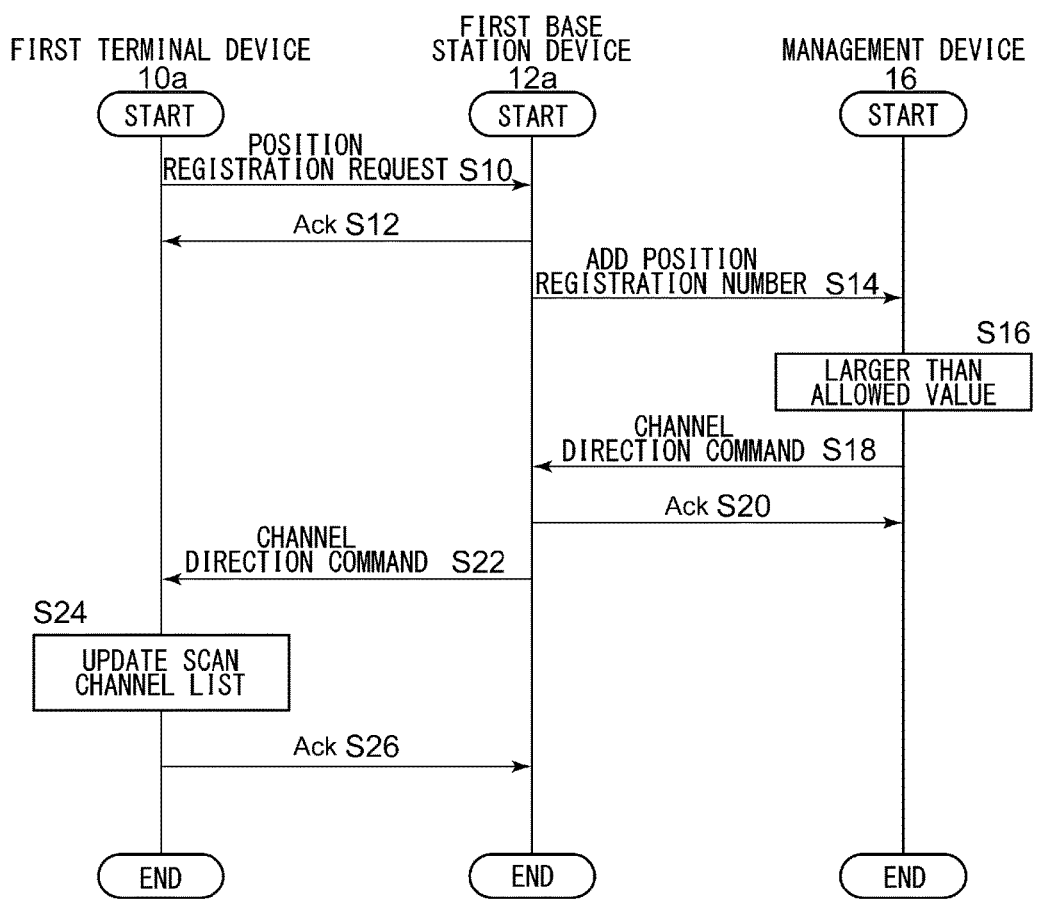

FIG. 8

| BASE STATION DEVICE | POSITION REGISTRATION NUMBER | NUMBER OF CHANNELS OF BASE STATION DEVICE | POSITION REGISTRATION NUMBER PER ONE CHANNEL | ALLOWED VALUE |
|---|---|---|---|---|
| FIRST BASE STATION DEVICE | 140 | 10 | 14 | 20 |
| SECOND BASE STATION DEVICE | 60 | 2 | 30 | 20 |
| THIRD BASE STATION DEVICE | 80 | 4 | 20 | 20 |
| TOTAL | 280 | 16 | 17.5 | 20 |

| BASE STATION DEVICE | GROUP REGISTRATION NUMBER | ALLOWED VALUE |
|---|---|---|
| FIRST BASE STATION DEVICE | 30 | 20 |
| SECOND BASE STATION DEVICE | 10 | 20 |
| THIRD BASE STATION DEVICE | 15 | 20 |

| BASE STATION DEVICE | GROUP REGISTRATION NUMBER | NUMBER OF CHANNELS OF BASE STATION DEVICE | GROUP REGISTRATION NUMBER PER ONE CHANNEL | ALLOWED VALUE |
|---|---|---|---|---|
| FIRST BASE STATION DEVICE | 40 | 10 | 4 | 7 |
| SECOND BASE STATION DEVICE | 20 | 2 | 10 | 7 |
| THIRD BASE STATION DEVICE | 20 | 4 | 6 | 7 |
| TOTAL | 80 | 16 | 5 | 7 |

| DATE AND TIME | POSITIONAL INFORMATION | AREA CODE | CHANNEL | RECEPTION POWER (dBm) |
|---|---|---|---|---|
| 2015/1/1 10:00:05 | X1, Y1 | A-1 | CHANNEL A | -100 |
| 2015/1/1 10:01:10 | X2, Y2 | B-1 | CHANNEL B | -110 |
| 2015/1/1 11:55:30 | X3, Y3 | B-1 | CHANNEL B | -109 |
| 2015/1/2 09:10:20 | X4, Y4 | A-3 | CHANNEL C | -98 |
| 2015/1/2 11:20:30 | X5, Y5 | C-1 | CHANNEL B | -120 |
| 2015/1/2 11:20:35 | X5, Y5 | C-1 | CHANNEL C | -100 |
| 2015/1/2 11:20:40 | X5, Y5 | C-1 | CHANNEL A | -115 |
| . . . . . | . . . . . | . . . . . | . . . . . | . . . . . |

| COMMAND | TERMINAL DEVICE NUMBER | PARAMETER 1 | PARAMETER 2 |
|---|---|---|---|
| PRIORITY CHANNEL DESIGNATION | 1 | PRIORITY LEVEL (1:HIGH) | CHANNEL C |

FIG. 15B

| COMMAND | TERMINAL DEVICE NUMBER | PARAMETER 1 | PARAMETER 2 | PARAMETER 3 | PARAMETER 4 |
|---|---|---|---|---|---|
| PRIORITY CHANNEL DESIGNATION | 1 | PRIORITY LEVEL (1:HIGH) | CHANNEL C | PRIORITY LEVEL (2:MIDDLE) | CHANNEL A |

FIG. 16

| BASE STATION DEVICE | BUSY OCCURRENCE NUMBER PER UNIT TIME | ALLOWED VALUE |
|---|---|---|
| FIRST BASE STATION DEVICE | 10 | 5 |
| SECOND BASE STATION DEVICE | 2 | 3 |
| THIRD BASE STATION DEVICE | 5 | 6 |

| COMMAND | PARAMETER 1 | PARAMETER 2 |
|---|---|---|
| RELATIVE PRIORITY CHANNEL DESIGNATION | CHANNEL A | +1 |

FIG. 17B

| COMMAND | PARAMETER 1 | PARAMETER 2 |
|---|---|---|
| RELATIVE PRIORITY CHANNEL DESIGNATION | CHANNEL B | −1 |

FIG. 17C

| COMMAND | PARAMETER 1 | PARAMETER 2 | PARAMETER 3 | PARAMETER 4 |
|---|---|---|---|---|
| RELATIVE PRIORITY CHANNEL DESIGNATION | CHANNEL B | −2 | CHANNEL A | +2 |

FIG. 18

| BASE STATION DEVICE | BUSY OCCURRENCE NUMBER PER UNIT TIME | NUMBER OF CHANNELS OF BASE STATION DEVICE | AVERAGE BUSY OCCURRENCE NUMBER PER ONE CHANNEL | ALLOWED VALUE |
|---|---|---|---|---|
| FIRST BASE STATION DEVICE | 14 | 10 | 1.4 | 2 |
| SECOND BASE STATION DEVICE | 6 | 2 | 3 | 2 |
| THIRD BASE STATION DEVICE | 8 | 4 | 2 | 2 |
| TOTAL | 28 | 16 | 1.75 | 2 |

| BASE STATION DEVICE | GROUP NUMBER | POSITION REGISTRATION NUMBER | ALLOWED VALUE |
|---|---|---|---|
| FIRST BASE STATION DEVICE | 1 | 50 | 20 |
| | 2 | 20 | 20 |
| | 3 | 10 | 20 |
| SECOND BASE STATION DEVICE | 2 | 30 | 20 |
| | 3 | 20 | 20 |
| | 4 | 10 | 20 |
| | 6 | 5 | 20 |
| THIRD BASE STATION DEVICE | 1 | 10 | 20 |
| | 2 | 10 | 20 |
| | 3 | 10 | 20 |
| | 10 | 15 | 20 |

| BASE STATION DEVICE | NEIGHBORING BASE STATION DEVICE |
|---|---|
| FIRST BASE STATION DEVICE | SECOND BASE STATION DEVICE |
| | THIRD BASE STATION DEVICE |
| SECOND BASE STATION DEVICE | FIRST BASE STATION DEVICE |
| | THIRD BASE STATION DEVICE |
| THIRD BASE STATION DEVICE | FIRST BASE STATION DEVICE |
| | SECOND BASE STATION DEVICE |

| BASE STATION DEVICE | CHANNEL |
|---|---|
| FIRST BASE STATION DEVICE | CHANNEL A |
| SECOND BASE STATION DEVICE | CHANNEL B |
| THIRD BASE STATION DEVICE | CHANNEL C |

| COMMAND | TARGET GROUP | PARAMETER 1 | PARAMETER 2 |
|---|---|---|---|
| PRIORITY CHANNEL DESIGNATION | GROUP 1 | PRIORITY LEVEL (1:HIGH) | CHANNEL B |

FIG. 21B

| COMMAND | TARGET GROUP | PARAMETER 1 | PARAMETER 2 |
|---|---|---|---|
| PRIORITY CHANNEL DESIGNATION | GROUP 2 | PRIORITY LEVEL (1:HIGH) | CHANNEL C |

FIG. 22A

| COMMAND | TARGET GROUP | PARAMETER 1 | PARAMETER 2 | PARAMETER 3 | PARAMETER 4 |
|---|---|---|---|---|---|
| PRIORITY CHANNEL DESIGNATION | GROUP 1 | PRIORITY LEVEL (1:HIGH) | CHANNEL B | PRIORITY LEVEL (2:MIDDLE) | CHANNEL C |

FIG. 22B

| COMMAND | TARGET GROUP | PARAMETER 1 | PARAMETER 2 | PARAMETER 3 | PARAMETER 4 | PARAMETER 5 | PARAMETER 6 |
|---|---|---|---|---|---|---|---|
| PRIORITY CHANNEL DESIGNATION | GROUP 1 | PRIORITY LEVEL (1:HIGH) | CHANNEL B | PRIORITY LEVEL (2:MIDDLE) | CHANNEL C | PRIORITY LEVEL (3:LOW) | CHANNEL A |

FIG. 25

| GROUP NUMBER | NUMBER OF USED BASE STATION DEVICES | ALLOWED VALUE |
|---|---|---|
| 1 | 3 | 2 |
| 2 | 2 | 2 |
| 3 | 3 | 2 |
| 4 | 1 | 2 |
| 6 | 1 | 2 |
| 10 | 1 | 2 |

| BASE STATION DEVICE | GROUP NUMBER | POSITION REGISTRATION NUMBER |
|---|---|---|
| FIRST BASE STATION DEVICE | 1 | 50 |
| SECOND BASE STATION DEVICE | 1 | 10 |
| THIRD BASE STATION DEVICE | 1 | 30 |

| AREA | CHANNEL OF GROUP 1 |
|---|---|
| A-1 | CHANNEL A |
| A-2 | CHANNEL B |
| A-3 | CHANNEL C |
| B-1 | CHANNEL B |
| B-2 | CHANNEL C |
| B-3 | CHANNEL C |
| C-1 | CHANNEL A |

| COMMAND | TARGET GROUP | TARGET AREA | PARAMETER 1 | PARAMETER 2 |
|---|---|---|---|---|
| PRIORITY CHANNEL DESIGNATION | GROUP 1 | B-3 | PRIORITY LEVEL (1:HIGH) | CHANNEL A |

FIG. 31B

| COMMAND | TARGET GROUP | TARGET AREA | PARAMETER 1 | PARAMETER 2 | PARAMETER 3 | PARAMETER 4 |
|---|---|---|---|---|---|---|
| PRIORITY CHANNEL DESIGNATION | GROUP 1 | B-3 | PRIORITY LEVEL (1:HIGH) | CHANNEL A | PRIORITY LEVEL (2:MIDDLE) | CHANNEL C |

FIG. 32

| TERMINAL DEVICE NUMBER (GROUP 1) | AREA |
|---|---|
| 1 | A-1 |
| 2 | B-1 |
| 3 | B-3 |
| 4 | A-3 |
| 5 | C-1 |

| COMMAND | TERMINAL DEVICE NUMBER | PARAMETER 1 | PARAMETER 2 |
|---|---|---|---|
| PRIORITY CHANNEL DESIGNATION | 1 | PRIORITY LEVEL (1:HIGH) | CHANNEL A |

FIG. 33B

| COMMAND | TERMINAL DEVICE NUMBER | PARAMETER 1 | PARAMETER 2 | PARAMETER 3 | PARAMETER 4 |
|---|---|---|---|---|---|
| PRIORITY CHANNEL DESIGNATION | 1 | PRIORITY LEVEL (1:HIGH) | CHANNEL A | PRIORITY LEVEL (2:MIDDLE) | CHANNEL C |

FIG. 34

| BASE STATION DEVICE | GROUP NUMBER | BUSY OCCURRENCE NUMBER PER UNIT TIME | ALLOWED VALUE |
|---|---|---|---|
| FIRST BASE STATION DEVICE | 1 | 5 | 2 |
| | 2 | 2 | 2 |
| | 3 | 1 | 2 |
| SECOND BASE STATION DEVICE | 1 | 0 | 2 |
| | 2 | 3 | 2 |
| | 3 | 2 | 2 |
| | 4 | 1 | 2 |
| | 6 | 1 | 2 |
| THIRD BASE STATION DEVICE | 1 | 1 | 2 |
| | 2 | 1 | 2 |
| | 3 | 1 | 2 |
| | 10 | 1 | 2 |

| BASE STATION DEVICE | GROUP NUMBER | BUSY OCCURRENCE NUMBER PER UNIT TIME | POSITION REGISTRATION NUMBER |
|---|---|---|---|
| FIRST BASE STATION DEVICE | 1 | 3 | 100 |
| SECOND BASE STATION DEVICE | 1 | 5 | 30 |
| THIRD BASE STATION DEVICE | 1 | 1 | 10 |

| COMMAND | TARGET GROUP | TARGET AREA | PARAMETER 1 | PARAMETER 2 |
|---|---|---|---|---|
| PRIORITY CHANNEL DESIGNATION | GROUP 1 | C-1 | PRIORITY LEVEL (1:HIGH) | CHANNEL A |

FIG. 38B

| COMMAND | TARGET GROUP | TARGET AREA | PARAMETER 1 | PARAMETER 2 | PARAMETER 3 | PARAMETER 4 |
|---|---|---|---|---|---|---|
| PRIORITY CHANNEL DESIGNATION | GROUP 1 | C-1 | PRIORITY LEVEL (1:HIGH) | CHANNEL A | PRIORITY LEVEL (2:MIDDLE) | CHANNEL C |

FIG. 39A

| COMMAND | TARGET GROUP | TARGET AREA | PARAMETER 1 | PARAMETER 2 |
|---|---|---|---|---|
| PRIORITY CHANNEL DESIGNATION | GROUP 1 | B-3 | PRIORITY LEVEL (1:HIGH) | CHANNEL A |

FIG. 39B

| COMMAND | TARGET GROUP | TARGET AREA | PARAMETER 1 | PARAMETER 2 | PARAMETER 3 | PARAMETER 4 |
|---|---|---|---|---|---|---|
| PRIORITY CHANNEL DESIGNATION | GROUP 1 | B-3 | PRIORITY LEVEL (1:HIGH) | CHANNEL A | PRIORITY LEVEL (2:MIDDLE) | CHANNEL C |

MANAGEMENT DEVICE, TERMINAL DEVICE, AND MANAGEMENT METHOD PERFORMING PROCESS OF SELECTING RESOURCE OF RADIO LINK

CROSS-REFERENCE TO RELATED APPLICATION

This application is based upon and claims the benefit of priority from the prior Japanese Patent Application No. 2016-58758, filed on Mar. 23, 2016, Japanese Patent Application No. 2016-60295, filed on Mar. 24, 2016, Japanese Patent Application No. 2016-185758, filed on Sep. 23, 2016, and Japanese Patent Application No. 2016-186776, filed on Sep. 26, 2016, the entire contents of which are incorporated herein by reference.

BACKGROUND

The present invention relates to a selection technology, and more particularly, to a management device, a terminal device, and a management method performing the process of selecting resources of a radio link.

In a radio communication system, a mobile station performs an operation called a channel scan. For example, a mobile station moves to another place from a state communicating with a base station operating in a predetermined channel and enters an area of a base station operating in another channel. In such a case, the mobile station performs a search for a channel of a base station by attempting reception of a signal while changing the channel, thereby searching for a base station. Under such a situation, in a case where the number of channels for which the channel scan needs to be performed is large, a time is required. In order to respond to this, the mobile station calculates distances between the mobile station and base stations and determines the sequence of channels of the base stations to be scanned in accordance with the distances (for example, see JP 2013-211803 A).

[Patent Document 1] JP 2013-211803 A

In a case where the mobile station determines the scanning sequence based on distances up to base stations, a case is not considered in which a channel shortage in the base station occurs as the number of mobile stations using base stations increases. In addition, the mobile station needs to store positional information and channel information of base stations in advance. Under such a situation, in a case where the arrangement of base stations is changed, or a channel operating in a base station is changed, the information stored in the mobile station needs to be updated. In other words, while a probability of the establishment of communication between a mobile station and a base station dynamically changes according to situations from time to time, until now, an effective channel scan in sufficient consideration of the easiness of the establishment of communication is not performed.

SUMMARY

In order to solve the problems described above, a management device according to an aspect of this embodiment includes: an acquirer that acquires parameters that correspond to each of a plurality of base station devices using a resource for communication with a terminal device and can be used for predicting a shortage of a resource of each base station device; a generator that generates information relating to a priority level of a resource desired to be used by a terminal device connected to one of the plurality of base station devices in accordance with the parameters acquired by the acquirer; and a transmitter that transmits the information generated by the generator.

Another aspect of this embodiment is a terminal device. This device is a terminal device that communicates with one base station device among a plurality of base station devices by using a resource and includes a receiver that receives information from a management device generating information relating to a priority level of a resource desired to be used by the terminal device in accordance with parameters that correspond to each of a plurality of base station devices and can be used for predicting a shortage of a resource of the base station devices through one base station device and a selector that selects a resource based on the information received by the receiver.

Further another aspect of this embodiment is a management method. This method includes: acquiring parameters that correspond to each of a plurality of base station devices using a resource for communication with a terminal device and can be used for predicting a resource shortage of each of the base station devices; generating information relating to a priority level of a resource desired to be used by a terminal device connected to one of the plurality of base station devices in accordance with the acquired parameters; and transmitting the generated information.

Further another aspect of this embodiment is also a management device. This device includes: a specifier that specifies a group formed by a plurality of terminal devices performing communication using a resource; a generator that generates information relating to a priority level of a resource desired to be used by a terminal device belonging to the group specified by the specifier; and a transmitter that transmits the information generated by the generator to the terminal device belonging to the group specified by the specifier directly or through another device.

Further another aspect of this embodiment is also a terminal device. This device is a terminal device that performs communication using a resource, and the terminal device includes: a receiver that receives identification information used for identifying a group formed by a plurality of terminal devices and information relating to a priority level of a resource; and a selector that determines whether or not the identification information received by the receiver coincides with predetermined identification information and selects a resource based on the information received by the receiver in the case of coincidence.

Further another aspect of this embodiment is also a management method. This method includes: specifying a group formed by a plurality of terminal devices performing communication using a resource; generating information relating to a priority level of a resource desired to be used by a terminal device belonging to the specified group; and transmitting the generated information to the terminal device belonging to the specified group directly or through another device.

In addition, an arbitrary combination of the constituent elements described above, a conversion of the representation of this embodiment among a method, a device, a system, a recording medium, a computer program, and the like is also effective as an aspect of this embodiment.

BRIEF DESCRIPTION OF THE DRAWINGS

FIGS. 3A to 3C are diagrams that illustrate the data structures of databases stored in a storage illustrated in FIG. 2;

FIGS. 4A to 4C are diagrams that illustrate formats of signals transmitted and received in the communication system illustrated in FIG. 1;

FIGS. 6A to 6D are diagrams that illustrate the data structures of scan channel lists stored in a controller illustrated in FIG. 5;

FIG. 7 is a sequence diagram that illustrates the sequence of updating a scan channel list in the communication system illustrated in FIG. 1;

FIG. 8 is a diagram that illustrates the data structure of a database stored in a storage according to Embodiment 2;

FIG. 9 is a diagram that illustrates the data structure of a database stored in a storage according to Embodiment 3;

FIG. 10 is a diagram that illustrates the data structure of a database stored in a storage according to Embodiment 4;

FIG. 13 is a diagram that illustrates the data structure of a database stored in a storage according to Embodiment 6;

FIGS. 15A and 15B are diagrams that illustrate formats of signals transmitted and received in the communication system according to Embodiment 6;

FIG. 16 is a diagram that illustrates the data structure of a database stored in a storage according to Embodiment 7;

FIGS. 17A to 17C are diagrams that illustrate the formats of signals transmitted and received in a communication system according to Embodiment 7;

FIG. 18 is a diagram that illustrates the data structure of a database stored in a storage according to Embodiment 8;

FIGS. 20A to 20C are diagrams that illustrate the data structures of databases stored in a storage illustrated in FIG. 19;

FIGS. 21A and 21B are diagrams that illustrate the format of signals transmitted and received in the communication system illustrated in FIG. 1;

FIGS. 22A and 22B are diagrams that illustrate other formats of signals transmitted and received in the communication system illustrated in FIG. 1;

FIG. 25 is a diagram that illustrates the data structure of a database stored in a storage according to Embodiment 12;

FIG. 27 is a diagram that illustrates the data structure of a database stored in a storage according to Embodiment 13;

FIG. 29 is a diagram that illustrates the data structure of another database stored in the storage according to Embodiment 13;

FIGS. 31A and 31B are diagrams that illustrate the formats of signals transmitted and received in the communication system according to Embodiment 13;

FIG. 32 is a diagram that illustrates the data structure of a database stored in a storage according to Embodiment 14;

FIGS. 33A and 33B are diagrams that illustrate the formats of signals transmitted and received in a communication system according to Embodiment 14;

FIG. 34 is a diagram that illustrates the data structure of a database stored in a storage according to Embodiment 15;

FIG. 36 is a diagram that illustrates the data structure of a database stored in a storage according to Embodiment 17;

FIGS. 38A and 38B are diagrams that illustrate signals transmitted and received in the communication system according to Embodiment 17;

FIGS. 39A and 39B are diagrams that illustrate other signals transmitted and received in the communication system according to Embodiment 17.

DETAILED DESCRIPTION

The invention will now be described by reference to the preferred embodiments. This does not intend to limit the scope of the present invention, but to exemplify the invention.

Embodiment 1

Before specific description of the present invention, first, an overview will be described. Embodiment 1 relates to a communication system in which a plurality of base station devices are disposed, and a terminal device is connected to one thereof and performs radio communication. A resource is used for communication between a base station device and the terminal device in the communication system. An example of the resource is a channel. The channel is a communication line for establishment of communication between a base station device and a terminal device and is specified using a center frequency, a time, or a code. In this embodiment, the channel is assumed to be specified using the center frequency. In the communication system, a plurality of channels are defined, and the center frequencies of the channels are different from each other.

Each base station device is operated in several channels and communicates with a terminal device while using the channels. Also in a case where the terminal device is connected to a base station device by using any one of channels, the terminal device measures the statuses of the channels. This measurement process is also called a channel scan, and the presence of a base station device operated in each channel is searched through the channel scan. A result of the channel scan, for example, is used for selecting a base station device to which the terminal device is to be connected. In a case where the channel is collectively referred to as a resource, the "scan" corresponds to "selection". Here, in order to perform an efficient channel scan in consideration of the easiness of establishment of communication, the following process is performed in this embodiment.

A management device is connected to the base station through a network. The management device stores a database in which a relation between a base station device and a channel is represented. The management device generates information (hereinafter, referred to as a "channel direction command") relating to a priority level of a channel desired to be used when the terminal device performs a channel scan and transmits the generated information from the base station device. At that time, the management device generates a channel direction command in accordance with the number of terminal devices of which positions are registered in each of the plurality of base station devices. The terminal device performs a channel scan in accordance with the channel direction command.

Figure 1:
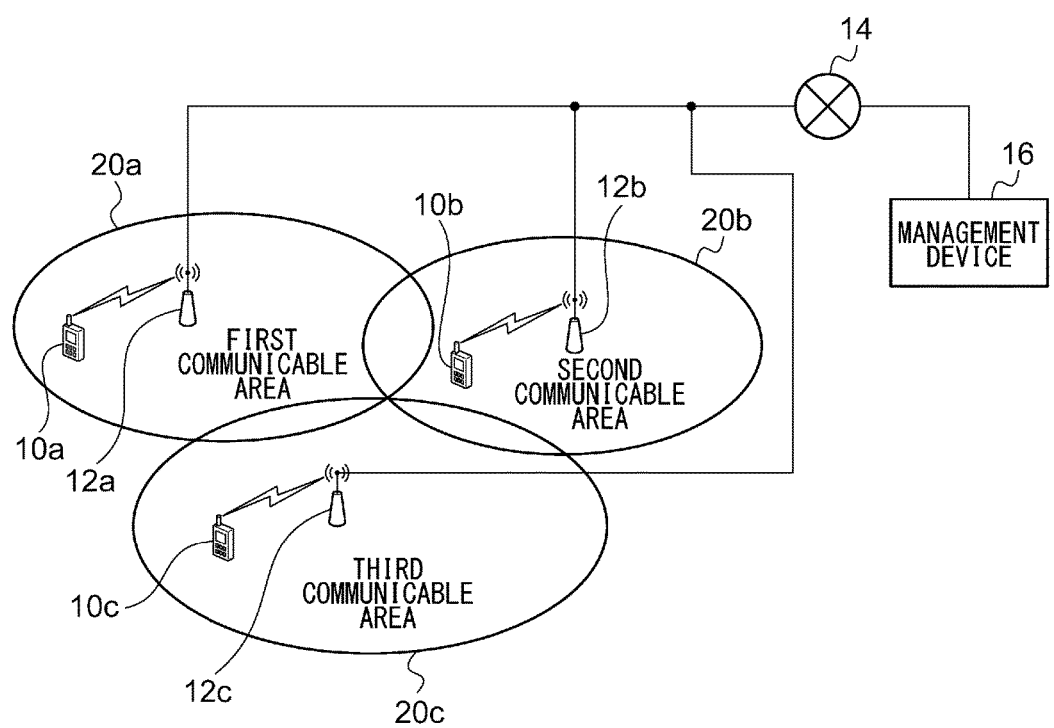
FIG. 1 is a diagram that illustrates the configuration of a communication system according to Embodiment 1.

FIG. 1 illustrates the configuration of a communication system 100. The communication system 100 includes a first terminal device 10a, a second terminal device 10b, and a third terminal device 10c, which will be collectively referred to as a terminal device 10, a first base station device 12a, a second base station device 12b, and a third base station device 12c, which will be collectively referred to as a base station device 12, a network 14, and a management device 16. Here, while both the number of the terminal devices 10 and the number of the base station devices 12 are three, the configuration is not limited thereto.

As illustrated in the drawing, an area communicable with the first base station device 12a, in other words, an area in which a signal transmitted from the first base station device 12a can be received is illustrated as a first communicable area 20a. In addition, similarly, for the second base station device 12b and the third base station device 12c, a second communicable area 20b and a third communicable area 20c are illustrated. Here, the first communicable area 20a, the second communicable area 20b, and the third communicable area 20c will be collectively referred to as a communicable area 20.

The terminal device 10 is connected to the base station device 12 in correspondence with a radio communication system. While an example of the radio communication system is a business radio communication, a mobile telephone system, or the like, these are known technologies, and thus, the description thereof will not be presented here. In a case where the terminal device 10 enters the communicable area 20 and receives a signal in a channel of the base station device 12 forming the communicable area 20, the terminal device 10 performs a position registration request for the base station device 12.

Each of the plurality of base station devices 12 can be connected to the terminal device 10 on one end side in correspondence with a radio communication system that is the same as that of the terminal device 10. In addition, each base station device 12 is connected to the network 14 on the other end side. Here, each base station device 12 operates according to one of a plurality of channels defined in the communication system 100. For example, mutually-different channels are set to two or more base station devices 12 that are neighboring to each other. In a case where a position registration request is received from the terminal device 10, the base station device 12 transmits a use permission to the terminal device 10 and maintains a position registration number (the number of terminal devices 10 of which the positions are registered). The base station device 12 transmits the position registration number to the management device 16 through the network 14. As a result of such a process, as illustrated in the drawing, the first terminal device 10a and the first base station device 12a are connected, and a channel set to the first base station device 12a is used for the first terminal device 10 a and the first base station device 12a.

The base station device 12 is connected to the management device 16 through the network 14. The network 14 transmits/receives data among various devices. The network 14 may be an arbitrary network and, for example, may be a wired network, a wireless network, or a combination thereof. According to such a configuration, the terminal device 10 can communicate with a communication device not illustrated in the drawing through the base station device 12 and the network 14. The communication device not illustrated in the drawing may be a device that is directly connected to the network 14 or another terminal device 10 that is connected to the base station device 12. Here, the communication is a call or data communication.

The management device 16 communicates with the terminal device 10 through the network 14 and the base station device 12. The management device 16 may be included in one of the base station devices 12. The management device 16 receives a position registration number from each base station device 12 through the network 14 and maintains the number of terminal devices 10 connected to each base station device 12. The maintained position registration number is changed according to the movement of terminal devices 10 using each base station device 12. In addition, the management device 16 maintains an allowed value for the position registration number of each base station device 12 and maintains information of neighboring base station devices 12 and information of channels for each base station device 12.

The management device 16, for a base station device 12 of which the position registration number exceeds the allowed value for the position registration number, selects a channel of another base station device 12 of which the position registration number does not exceed the allowed value for the position registration number and is the smallest among other base station devices 12 neighboring to the base station device 12. In addition, the management device 16 transmits a channel direction command used for changing the channel of the terminal device 10 to the selected channel to the base station device 12. The terminal device 10 that has received the channel direction command performs a channel scan in response to the channel direction command.

Figure 2:
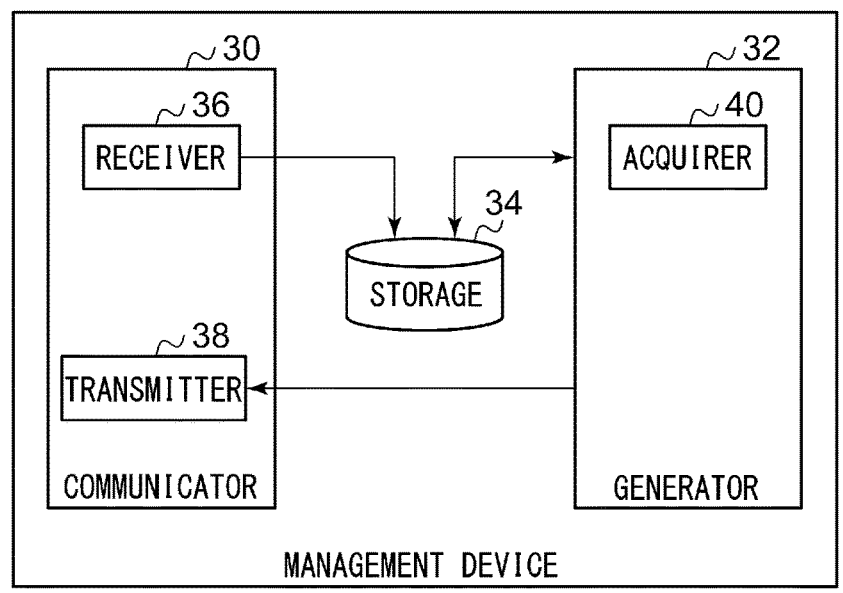
FIG. 2 is a diagram that illustrates the configuration of a management device illustrated in FIG. 1.

FIG. 2 illustrates the configuration of the management device 16. The management device 16 includes a communicator 30, a generator 32, and a storage 34. In addition, the communicator 30 includes a receiver 36 and a transmitter 38. The generator 32 includes an acquirer 40. The communicator 30 is connected to the base station device 12 through the network 14. The receiver 36 receives a position registration number from each base station device 12. The receiver 36 stores the position registration number in the storage 34.

The storage 34 stores databases illustrated in FIGS. 3A to 3C. FIGS. 3A to 3C illustrate the data structures of the databases stored in the storage 34. FIG. 3A is a database that represents a position registration number and an allowed value for each base station device 12. The position registration number is written by the receiver 36. On the other hand, the allowed value may be input in advance. FIG. 3B is a database in which base station devices 12 neighboring to each base station device 12 are represented. For example, a second base station device 12b and a third base station device 12c are neighboring to a first base station device 12a. FIG. 3C is a database in which a channel for each base station device 12 is represented. For example, a channel A is used in the first base station device 12a. The description will be continued by referring back to FIG. 2.

The acquirer 40 acquires the position registration number of each base station device 12, in other words, the number of terminal devices 10 registered in each base station device 12 from the database illustrated in FIG. 3A. For each of the plurality of base station devices 12, this position registration number is a parameter that can be used for predicting a channel shortage in the base station device 12. As illustrated in FIG. 3A, since the position registration number "140" of the first base station device 12a exceeds the allowed value "100", the generator 32 recognizes that there is a high possibility that a channel shortage may occur in the first base station device 12a. In addition, the generator 32 selects the second base station device 12b of which the position registration number is smallest out of the second base station device 12b (position registration number "50") and the third base station device 12c (position registration number "70") that are base station devices 12 neighboring to the first base station device 12a from the database illustrated in FIG. 3B. Furthermore, the generator 32 selects a channel B of the selected second base station device 12b from the database illustrated in FIG. 3C. Following this, the generator 32 generates a channel direction command in which the selected channel is included.

FIGS. 4A to 4C illustrate the formats of signals transmitted and received in the communication system 100. As illustrated therein, a signal is configured in order of "command", "parameter 1", and "parameter 2". In "command", information used for representing a type of signal is included, and, in "parameter 1" and "parameter 2", values corresponding to each command are included. FIG. 4A illustrates the format of the channel direction command. In "command", "priority channel designation" is included, and, in "parameter 1", a "priority level" is included. The priority level here is set as "1", in other words, "high". In "parameter 2", "channel B" is included. In addition, as illustrated in FIG. 4A, in a case where only one channel is designated, "parameter 1 (priority level)" may be omitted. In such a case, the designated channel is interpreted to have a priority level of "high".

FIG. 4B illustrates another format of the channel direction command. This represents that the third base station device 12c can be also used as a base station device 12 neighboring to the first base station device 12a in the example described above and is a case where such a use thereof is added. In the case of FIG. 4B, compared to the case of FIG. 4A, "parameter 3" and "parameter 4" are added. In "parameter 3", a "priority level" is included. The priority level here is set as "2", in other words, "middle". In "parameter 4", "channel C" is included.

FIG. 4C is a further another format of the channel direction command. This is, in the example described above, in a case where the terminal device 10 connected to the first base station device 12a is located in an area in which the terminal device 10 cannot be connected to the second base station device 12b and the third base station device 12c, for allowing the first base station device 12a to be continuously used. For this reason, the channel of the first base station device 12a is added. In the case of FIG. 4C, compared to the case of FIG. 4B, "parameter 5" and "parameter 6" are added. In "parameter 5", a "priority level" is included. The priority level here is set as "3", in other words, "low". In "parameter 6", "channel A" is included. The description will be continued by referring back to FIG. 2.

In this way, the generator 32 generates information relating to a priority level of a channel desired to be used by the terminal device 10 connected to one of the plurality of base station devices 12 in accordance with the position registration number that is the parameter acquired by the acquirer 40. Particularly, the generator 32 generates information relating to the priority level of the channel for the base station device 12 of which the position registration number is larger than the allowed value.

The transmitter 38 transmits the channel direction command generated by the generator 32 to the base station device 12. In the example described above, the channel direction command is transmitted to the first base station device 12a. The first base station device 12a transmits the channel direction command. As a result, the terminal device 10 connected to the first base station device 12a receives the channel direction command.

In addition, in a case where the management device 16 detects a failure of the first base station device 12a, the channel direction command illustrated in FIG. 4B may be transmitted from the second base station device 12b and the third base station device 12c. By performing such a process, the scan of the terminal device 10 for the channel of the first base station device 12a in which the failure occurs is avoided, whereby the efficiency of the channel scan is improved. In addition, in a case where the position registration number of the second base station device 12b or the third base station device 12c also exceeds the allowed value, in other words, in a case where the position registration numbers of all the base station devices 12 exceed the allowed value, the channel direction command illustrated in FIG. 4C is transmitted from each base station device 12. Also after the base station device 12 used by each terminal device 10 is changed, the base station device 12 can be continuously used, and accordingly, the communication of the terminal device 10 is not blocked.

In the description presented until now, while the priority level is set to be higher as the base station device 12 has a smaller position registration number, any other method may be used. For example, the generator 32 may set the priority level to be higher as a base station device 12 has a smaller value acquired by subtracting the allowed value from the position registration number, in other words, a smaller difference value (position registration number−allowed value) between the position registration number and the allowed value. In a case where the position registration number is smaller than the allowed value, the difference value is a negative value. In addition, the generator 32 may set the priority level to be higher as a base station device 12 has a smaller value acquired by dividing the position registration number by the allowed value, in other words, a smaller ratio (position registration number/allowed value) of the position registration number to the allowed value. For example, a case will be considered in which the position registration number of the first base station device 12a is "140", the position registration number of the second base station device 12b is "50", the position registration number of the third base station device 12c is "70", and the allowed values thereof are respectively "100", "60", and "100". The ratios of the position registration numbers to the allow values are respectively, "1.4", "0.83", and "0.7", and the priority level of the channel of the third base station device 12c is highest as "1", the priority level of the second base station device 12b is "2", and the priority level of the first base station device 12a is "3".

While the configuration of the management device 16 illustrated in FIG. 2 can be realized by a CPU, a memory, or any other LSI of an arbitrary computer as hardware or can be realized by a program loaded into a memory or the like as software, here, functional blocks realized by cooperation thereof are illustrated. Accordingly, it is understood by persons skilled in the art that such functional blocks can be realized in various forms by using only hardware, only software, or a combination thereof.

Figure 5:
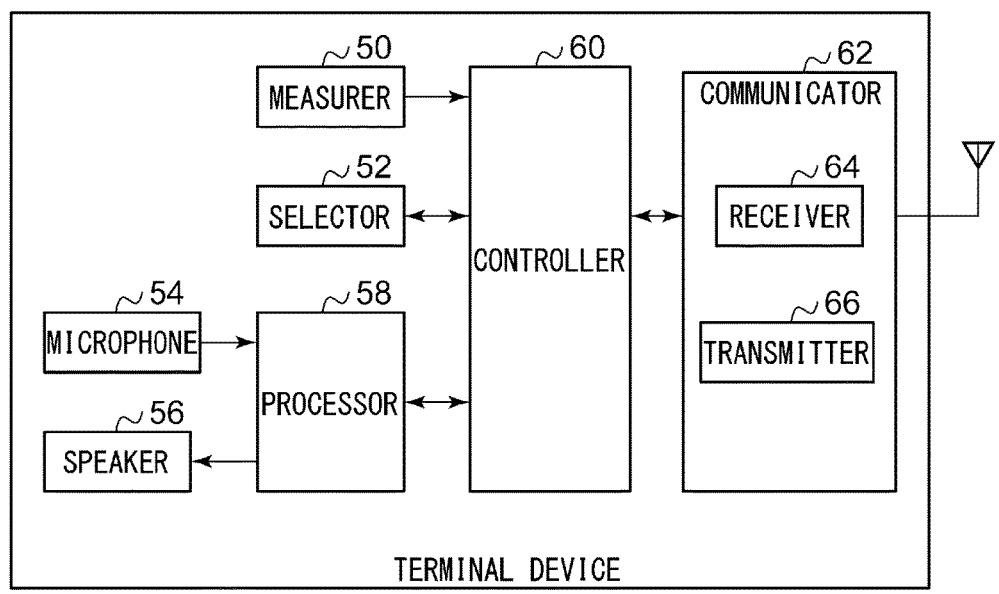
FIG. 5 is a diagram that illustrates the configuration of a terminal device illustrated in FIG. 1.

FIG. 5 illustrates the configuration of the terminal device 10. The terminal device 10 includes a positioner 50, a selector 52, a microphone 54, a speaker 56, a processor 58, a controller 60, and a communicator 62. The communicator 62 includes a receiver 64 and a transmitter 66. As described above, the terminal device 10 communicates with one base station device 12 among a plurality of base station devices 12 by using a channel.

The positioner 50 has a positioning function of a global positioning system (GPS) and performs positioning of the terminal device 10. Positional information that is a result of the positioning is represented using latitude and longitude. The positioner 50 outputs the positional information to the controller 60. The controller 60 causes the communicator 62 to transmit a position registration request to the base station device 12. At that time, the controller 60 may include the positional information input from the positioner 50 in the position registration request.

The microphone 54 receives a voice from a user and outputs the voice as an electric signal (hereinafter, referred to as an "audio signal") to the processor 58. The speaker 56 receives an electric signal (hereinafter, this will be referred to as an "audio signal" as well) in which a voice is represented from the processor 58 as an input and outputs the voice. For this reason, the microphone 54 and the speaker 56 correspond to interfaces used when a user performs a call. In addition, while buttons and the like used for accepting an operation from a user may be included as user interfaces, here, the description thereof will not be presented.

The processor 58 receives an audio signal from the microphone 54 as an input and outputs an audio signal to the speaker 56. The processor 58 performs audio signal processing for the audio signal. For the audio signal processing, a known technology may be used, and thus, the description thereof will not be presented. The processor 58 performs radio communication for a call together with the controller 60 and the communicator 62. For this reason, the communicator 62 transmits/receives signals to/from a base station device 12 not illustrated in the drawing.

The receiver 64 receives a channel direction command transmitted from the management device 16 through the network 14 and the base station device 12. As described above, the channel direction command is generated by the management device 16 and can be described as information relating to a priority level of a channel desired to be used by the terminal device 10. In addition, this channel direction command is generated according to a parameter that is a parameter for each of the plurality of base station devices 12 and can be used for predicting a channel shortage of each base station device 12. The receiver 64 outputs the channel direction command to the controller 60.

The controller 60 receives the channel direction command from the receiver 64 as an input. In addition, the controller 60 stores a list (hereinafter, referred to as a "scan channel list") in which priority levels of channels to be scanned by the selector 52 are represented and updates the scan channel list in response to the input channel direction command. FIGS. 6A to 6D illustrate the data structures of scan channel lists stored in the controller 60. FIG. 6A illustrates a scan channel list of a case where the terminal device 10 is connected to the first base station device 12a. Here, only the "channel A" that is a channel of the first base station device 12a is represented.

FIG. 6B illustrates a scan channel list updated in response to the channel direction command illustrated in FIG. 4A. The "channel A" illustrated in FIG. 6A is updated with "channel B". In addition, without erasing the "channel A" that is originally stored, the "channel A" may be maintained as a priority level "middle" that is a priority level lower than the newly-designated "channel B". FIG. 6C illustrates a scan channel list updated in response to the channel direction command illustrated in FIG. 4B. The "channel C" of a "priority level (middle)" is added to the case illustrated in FIG. 6B. FIG. 6D illustrates a scan channel list updated in response to the channel direction command illustrated in FIG. 4C. The "channel A" of a "priority level (low)" is added to the case illustrated in FIG. 6C. The description will be continued by referring back to FIG. 5.

The selector 52 performs a channel scan process based on the scan channel list stored in the controller 60. More specifically, the selector 52 sets a channel of which the priority level is high in the scan channel list with a priority. In a case where a signal transmitted from a base station device 12, for example, the second base station device 12b is received in the set channel, the selector 52 selects the channel of that time and reports the selected channel to the controller 60. When the report is received, the controller 60 transmits a position registration request to the second base station device 12b. Thereafter, the terminal device 10 communicates with the second base station device 12b while using the channel of the second base station device 12b. As a result, a terminal device 10 that has succeeded in the scan among a plurality of terminal devices 10 using the first base station device 12a performs communication by using the second base station device 12b in place of the first base station device 12a. For this reason, the possibility of the occurrence of a channel shortage of the first base station device 12a is reduced.

In addition, in a case where each of the channel direction commands illustrated in FIGS. 4B and 4C is received, the terminal device 10 may measure a reception state together with performing a channel scan and select a channel of which the reception state is best from the updated scan channel list. Alternatively, the terminal device 10 may perform a scan in order of highest to lowest priority level and select a first channel of which the reception state is larger than or equal to a predetermined threshold among the channels. According to such a process, the reception state of the terminal device 10 using the first base station device 12a is improved, and the quality of the call is also improved. The terminal device 10, based on the information (channel direction command) relating to the priority levels of resources, determines whether or not a resource having a high priority level can be actually used and performs an operation of selecting a resource to be used based on a result of the determination. Then, in a case where a resource having a high priority level cannot be actually used, a similar process is repeated for a resource having a priority level lower than that as a target, and an operation of selecting a resource to be used is performed.

The operation of the communication system 100 according to the configuration described above will be described. FIG. 7 is a sequence diagram that illustrates the sequence of updating a scan channel list in the communication system 100. The first terminal device 10a transmits a position registration request to the first base station device 12a (S10), and the first base station device 12a transmits Ack to the first terminal device 10a (S12). The first base station device 12a causes the management device 16 to increase the position registration number (S14). In the management device 16, the position registration number of the first base station device 12a becomes larger than the allowed value (S16).

The management device 16 transmits a channel direction command to the first base station device 12a (S18), and the first base station device 12a transmits Ack to the management device 16 (S20). The first base station device 12a transmits a channel direction command to the first terminal device 10a (S22). The first terminal device 10a updates the scan channel list (S24). The first terminal device 10a transmits Ack to the first base station device 12a (S26).

According to this embodiment, since the information relating to a priority level of a channel desired to be used by the terminal device is generated based on a parameter that can be used for predicting a channel shortage in each base station device, the priority level of a channel easily establishing communication can be set to be high. In addition, since the information relating to a priority level of a channel desired to be used by the terminal device is notified to the terminal device, an efficient channel scan that is in consideration of easiness of establishment of communication can be performed. In addition, since the effective channel scan that is in consideration of easiness of establishment of communication is performed, a time required for a channel scan can be shortened. Furthermore, since a parameter that can be used for predicting a channel shortage in each base station device is appropriately acquired, the information relating to a priority level of a channel desired to be used by the terminal device can be generated in accordance with a change in the environment.

In addition, since the information relating to a priority level of a channel is generated by using the position registration number of each base station device, the process can be simplified. Furthermore, since the information relating to a priority level of a channel is generated for each base station device of which the position registration number is larger than the allowed value, movement from a base station device having a high possibility of the occurrence of a channel shortage to another base station device can be performed. In addition, since the information relating to a priority level of a channel is generated according to a difference between the position registration number and the allowed value, the degree of freedom in the configuration can be improved. Furthermore, since the information relating to a priority level of a channel is generated according to the ratio of the position registration number to the allowed value, the degree of freedom in the configuration can be improved.

In addition, when the information relating to a priority level of a channel is received, the terminal device scans channels based on the received information, and thus, an efficient channel scan that is in consideration of easiness in establishment of communication can be performed. Furthermore, since the channel scan that is additionally in consideration of actual communication conditions and the like is performed, the communication can be easily established. In addition, since only the management device side may be set, an operation of collecting a terminal device and rewriting the data is unnecessary. Furthermore, the operation can be performed according to an actual situation. In addition, maintenance of the environments and the data can be performed without having an influence on the communication protocol between the terminal device and the communication system.

Embodiment 2

Next, Embodiment 2 will be described. Embodiment 2, similarly to Embodiment 1, relates to a communication system in which a plurality of base station devices are disposed, and a terminal device is connected to one thereof and performs radio communication. In addition, a management device generates a channel direction command and transmits the generated channel direction command to the terminal device through a base station device. In Embodiment 1, the channel direction command is generated according to a position registration number. On the other hand, in Embodiment 2, the channel direction command is generated according to a position registration number per channel of each base station device. The communication system 100, the management device 16, and the terminal device 10 according to Embodiment 2 are of types similar to those illustrated in FIGS. 1, 2, and 5. Here, differences from Embodiment 1 will be focused in the description.

The storage 34 illustrated in FIG. 2 stores a database illustrated in FIG. 8. FIG. 8 illustrates the data structure of the database stored in the storage 34. A position registration number is written by a receiver 36. The number of channels and the allowed value for each base station device 12 may be input in advance. For this reason, the position registration number per one channel is derived by dividing the position registration number by the number of channels of the base station device 12. The description will be continued by referring back to FIG. 2.

An acquirer 40 acquires a position registration number per one channel of each base station device 12 from the database illustrated in FIG. 8. For each of the plurality of base station devices 12, this position registration number per one channel is a parameter that can be used for predicting a channel shortage in the base station device 12. As illustrated in FIG. 8, since the position registration number per one channel for a second base station device 12b exceeds the allowed value, the generator 32 recognizes that there is a high possibility that a channel shortage may occur in the second base station device 12b. For this reason, the generator 32, similarly to Embodiment 1, generates a channel direction command and transmits the channel direction command from the second base station device 12b to the terminal device 10.

At that time, the generator 32 selects a first base station device 12a of which the position registration number per one channel is smallest among base station devices 12 neighboring to the second base station device 12b. In addition, the generator 32 sets priority levels of channels of the first base station device 12a to be the highest. Accordingly, the terminal device 10 connected to the second base station device 12b scans the channels of the first base station device 12a with a priority. As a result, the load of the second base station device 12b is reduced. In addition, the position registration number per one channel calculated for the whole communication system 100 may be used as the allowed value. In this way, the degrees of the loads of the base station devices 12 are approximately uniform.

In this way, the generator 32 generates information relating to priority levels of channels in accordance with each position registration number per one channel that is acquired by the acquirer 40. Particularly, the generator 32 generates information relating to priority levels of channels for a base station device 12 of which the position registration number per one channel acquired by the acquirer 40 is larger than the allowed value.

Until now, while the priority level is set to be higher as a base station device 12 has a smaller position registration number per one channel, any other method may be used. For example, the generator 32 may set the priority level to be higher as a base station device 12 has a value acquired by subtracting the allowed value from the position registration number per one channel, in other words, a difference value between the position registration number per one channel and the allowed value to be smaller. In addition, the generator 32 may set the priority level to be higher as a base station device 12 has a value acquired by dividing the position registration number per one channel by the allowed value, in other words, a ratio of the position registration number per one channel to the allowed value to be smaller.

According to this embodiment, since the information relating to priority levels of channels is generated by using the position registration number per one channel of each base station device, the accuracy of a prediction of a channel shortage can be improved. In addition, since the information relating to a priority level of channels is generated for each base station device of which the position registration number per one channel is larger than the allowed value, movement from a base station device having a high possibility of the occurrence of a channel shortage to another base station device can be performed. Furthermore, since the information relating to a priority level of channels is generated according to a difference between the position registration number per one channel and the allowed value, the degree of freedom in the configuration can be improved. In addition, since the information relating to a priority level of channels is generated according to the ratio of the position registration number per one channel to the allowed value, the degree of freedom in the configuration can be improved.

Embodiment 3

Next, Embodiment 3 will be described. Embodiment 3, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. In Embodiment 1, the channel direction command is generated according to a position registration number. On the other hand, in Embodiment 3, a channel direction command is generated according to a group registration number on the premise of a group call using terminal devices. The communication system 100, the management device 16, and the terminal device 10 according to Embodiment 3 are of types similar to those illustrated in FIGS. 1, 2, and 5. Here, differences from the embodiments described until now will be focused in the description.

In the configuration illustrated in FIG. 1, in a case where the communication system 100 corresponds to a business radio system, a group call that is one-to-many communication of the terminal device 10 is widely used. In a case where a signal is received from a base station device 12 through a channel scan process, the terminal device 10 transmits a group registration request to the base station device 12 together with a position registration request. In a case where the position registration request and the group registration request are received, the base station device 12 transmits a use permission including a group call to the terminal device 10 and maintains a position registration number and a group registration number. The base station device 12 transmits the position registration number and the group registration number to the management device 16 through a network 14.

The characteristic of a group call is that one channel is used by terminal devices 10 of a same group of one base station device 12. For this reason, in a case where the group registration number corresponding to a group using the base station device 12 is only one, only one channel is used. In addition, in a case where the group registration number of the base station device 12 is equal to or smaller than the number of channels of the base station device 12, even when the position registration number of terminal devices 10 included in each group is increased, the load of channels of the base station device 12 is not increased as that much. On the other hand, in a case where the group registration number of the base station device 12 is larger than the number of channels of the base station device 12, in accordance with an increase in the position registration number of the terminal devices 10 included in each group, a possibility of the occurrence of a channel shortage increases. In addition, in a case where the group registration number of the base station device 12 is increased, a possibility of the occurrence of a channel shortage in the base station device 12 increases. From this, the management device 16 maintains the group registration number and generates information relating to priority levels of channels by using the maintained group registration number.

The storage 34 illustrated in FIG. 2 stores a database illustrated in FIG. 9. FIG. 9 illustrates the data structure of the database stored in the storage 34. The group registration number is written by a receiver 36. In addition, an allowed value may be input in advance. The description will be continued by referring back to FIG. 2. An acquirer 40 acquires a group registration number from the database illustrated in FIG. 9. This group registration number is a parameter that, for each of a plurality of base station devices 12, can be used for predicting a channel shortage in the base station device 12.

As illustrated in FIG. 9, since the group registration number of a first base station device 12a exceeds the allowed value, the generator 32 recognizes that there is a high possibility that a channel shortage may occur in the first base station device 12a. For this reason, the generator 32, similarly to the embodiments described until now, generates a channel direction command and transmits the channel direction command from the first base station device 12a to the terminal device 10.

At that time, the generator 32 selects a second base station device 12b of which the group registration number is smallest among base station devices 12 neighboring to the first base station device 12a. In addition, the generator 32 sets a priority level of the channels of the second base station device 12b to be the highest. Accordingly, the terminal device 10 connected to the first base station device 12a scans the channels of the second base station device 12b with a priority. As a result, the load of the first base station device 12a is reduced. In addition, the allowed values illustrated in FIG. 9 may be arbitrarily determined and input by a system supervisor or be automatically changed according to a changing group registration number.

In this way, the generator 32 generates information relating to a priority level of channels in accordance with the group registration number acquired by the acquirer 40. Particularly, the generator 32 generates information relating to a priority level of channels for a base station device 12 of which the group registration number acquired by the acquirer 40 is larger than the allowed value.

Until now, while the priority level is set to be higher as a base station device 12 has a smaller group registration number, any other method may be used. For example, the generator 32 may set the priority level to be higher as a base station device 12 has a value acquired by subtracting the allowed value from the group registration number, in other words, a difference value between the group registration number and the allowed value to be smaller. In addition, the generator 32 may set the priority level to be higher as a base station device 12 has a value acquired by dividing the group registration number by the allowed value, in other words, a ratio of the group registration number to the allowed value to be smaller.

According to this embodiment, since the information relating to a priority level of channels is generated using the group registration number of each base station device, the accuracy of a prediction of a channel shortage in the group call can be improved. In other words, the accuracy of a prediction relating to the easiness in establishment of communication can be improved. In addition, since the information relating to a priority level of channels is generated for each base station device of which the group registration number is larger than the allowed value, movement from a base station device having a high possibility of the occurrence of a channel shortage to another base station device can be performed. Furthermore, since the information relating to a priority level of channels is generated according to a difference between the group registration number and the allowed value, the degree of freedom in the configuration can be improved. In addition, since the information relating to a priority level of channels is generated according to the ratio of the group registration number to the allowed value, the degree of freedom in the configuration can be improved.

Embodiment 4

Next, Embodiment 4 will be described. Embodiment 4, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. In Embodiment 3, a channel direction command is generated according to a group registration number. On the other hand, in Embodiment 4, a channel direction command is generated according to a group registration number per channel of the base station device. The communication system 100, the management device 16, and the terminal device 10 according to Embodiment 4 are of types similar to those illustrated in FIGS. 1, 2, and 5. Here, differences from the embodiments described until now will be focused in the description.

The storage 34 illustrated in FIG. 2 stores a database illustrated in FIG. 10. FIG. 10 illustrates the data structure of the database stored in the storage 34. The group registration number is written by a receiver 36. In addition, the number of channels and an allowed value for the base station device 12 may be input in advance. Here, the allowed value is assumed to be "7" as the whole communication system 100. The group registration number per one channel is derived by dividing the group registration number by the number of channels of the base station device 12. The description will be continued by referring back to FIG. 2.

An acquirer 40 acquires a group registration number per one channel of each base station device 12 from the database illustrated in FIG. 10. For each of the plurality of base station devices 12, this group registration number per one channel is a parameter that can be used for predicting a channel shortage in the base station device 12. As illustrated in FIG. 10, since the group registration number per one channel for a second base station device 12b exceeds the allowed value, the generator 32 recognizes that there is a high possibility that a channel shortage may occur in the second base station device 12b. For this reason, the generator 32, similarly to the description presented until now, generates a channel direction command and transmits the channel direction command from the second base station device 12b to the terminal device 10.

At that time, the generator 32 selects a first base station device 12a of which the group registration number per one channel is smallest among base station devices 12 neighboring to the second base station device 12b. In addition, the generator 32 sets priority levels of channels of the first base station device 12a to be the highest. Accordingly, the terminal device 10 connected to the second base station device 12b scans the channels of the first base station device 12a with a priority. As a result, the load of the second base station device 12b is reduced. In addition, the group registration number per one channel calculated for the whole communication system 100 may be used as the allowed value. In this way, the degrees of the loads of the base station devices 12 are approximately uniform.

In addition, in a case where the group registration numbers per one channel of the terminal devices 10 or the whole communication system 100 illustrated in FIG. 10 are the same as "1", the group registration number and the number of usable channels are the same. For this reason, in the base station device 12 or the communication system 100, a channel shortage does not occur. In a case where the group registration number per one channel of the whole communication system 100 is smaller than or equal to "1", the allowed value for each base station device 12 may be set to "1" or be automatically changed to "1". Accordingly, since a base station device 12 of which the group registration number per one channel exceeds the allowed value receives a channel direction command from the management device 16, the communication system 100 operates to be in a state in which a channel shortage does not occur as a whole.

In this way, the generator 32 generates the information relating to priority levels of channels in accordance with each group registration number per one channel that is acquired by the acquirer 40. Particularly, the generator 32 generates the information relating to priority levels of channels for a base station device 12 of which the group registration number per one channel acquired by the acquirer 40 is larger than the allowed value.

Until now, while the priority level is set to be higher as a base station device 12 has a smaller group registration number per one channel, any other method may be used. For example, the generator 32 may set the priority level to be higher as a base station device 12 has a value acquired by subtracting the allowed value from the group registration number per one channel, in other words, a difference value between the group registration number per one channel and the allowed value to be smaller. In addition, the generator 32 may set the priority level to be higher as a base station device 12 has a value acquired by dividing the group registration number per one channel by the allowed value, in other words, a ratio of the group registration number per one channel to the allowed value to be smaller.

According to this embodiment, since the information relating to priority levels of channels is generated by using the group registration number per one channel of each base station device, the accuracy of a prediction of a channel shortage in a group call can be further improved. In addition, since the information relating to a priority level of channels is generated for each base station device of which the group registration number per one channel is larger than the allowed value, movement from a base station device having a high possibility of the occurrence of a channel shortage to another base station device can be performed. Furthermore, since the information relating to a priority level of channels is generated according to a difference between the group registration number per one channel and the allowed value, the degree of freedom in the configuration can be improved. In addition, since the information relating to a priority level of channels is generated according to the ratio of the group registration number per one channel to the allowed value, the degree of freedom in the configuration can be improved.

Embodiment 5

Next, Embodiment 5 will be described. Embodiment 5, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. Until now, the channel direction command is generated according the position registration number, the group registration number, and the like. On the other hand, in Embodiment 5, an index representing the degree of congestion of a base station device is calculated, and a channel direction command is generated according to the index. The communication system 100 and the terminal device 10 according to Embodiment 5 are of types similar to those illustrated in FIGS. 1 and 5. Here, differences from the embodiments described until now will be focused in the description.

Figure 11:
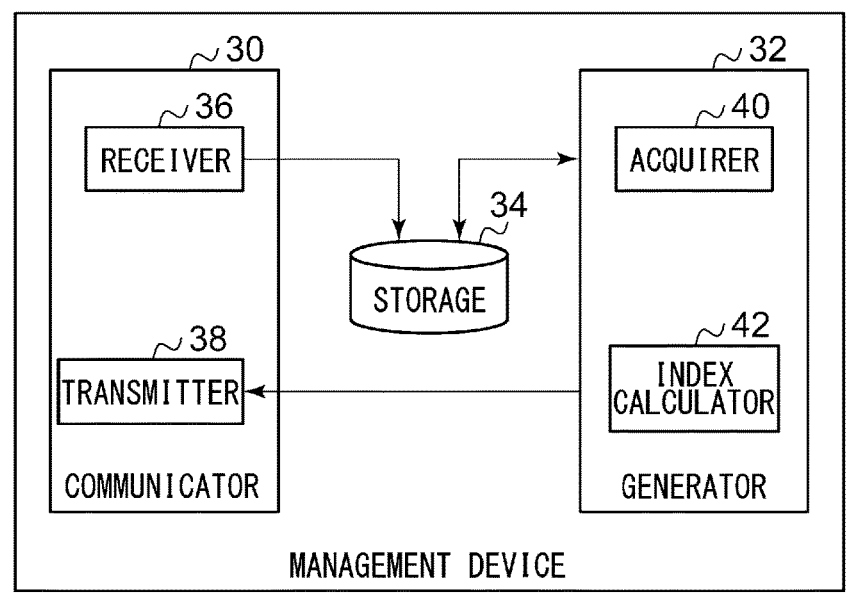
FIG. 11 is a diagram that illustrates the configuration of a management device according to Embodiment 5.

FIG. 11 illustrates the configuration of the management device 16 according to Embodiment 5. In the management device 16, an index calculator 42 is further included in a generator 32 having the configuration illustrated in FIG. 2. An acquirer 40 acquires a position registration number of the base station device 12, a group registration number of the base station device 12, and the number of channels of the base station device 12 from the databases illustrated in FIGS. 8 and 10. The index calculator 42 derives an index representing a degree of congestion based on acquired data for each base station device 12. The index calculator 42 calculates an index $Z[i]$ representing a degree of congestion of an i-th base station device $12i$ by using Equation (1) or Equation (2).

$$Z[i] = \alpha 1 \left(\frac{N[i]}{C[i]}\right)^{\gamma 1} + \alpha 2 \left(\frac{G[i]}{C[i]}\right)^{\gamma 2} \quad \text{[Numerical Expression 1]}$$

$$Z[i] = \left(\frac{N[i]}{C[i]}\right)^{\mu 1} \left(\frac{G[i]}{C[i]}\right)^{\mu 2} \quad \text{[Numerical Expression 2]}$$

In Equation (1), $N[i]$ represents a position registration number of the i-th base station device $12i$, $G[i]$ represents a group registration number of the i-th base station device $12i$, and $C[i]$ represents the number of channels of the i-th base station device $12i$. In addition, $\alpha 1$ and $\alpha 2$ are constants larger than or equal to "0", and at least one thereof is larger than "0". $\gamma 1$ and $\gamma 2$ are constants larger than "0". Equation (1) can be regarded as calculation of a weighted average of the position registration number per one channel and the group registration number per one channel using $\alpha 1$ and $\alpha 2$ as weighting factors. As the position registration number per one channel becomes larger, and the group registration number per one channel becomes larger, the degree of congestion $Z[i]$ has a larger value. In the case of a group call, basically, while the possibility of a channel shortage increases as the group registration number becomes larger, in a case where base station devices 12 having a same level of the group registration number are compared with each other, it can be stated that the possibility of a channel shortage increases as the position registration number becomes larger. Accordingly, by calculating the degree of congestion $Z[i]$, a channel shortage can be predicted with high accuracy. In addition, by adjusting $\gamma 1$ and $\gamma 2$, the influences of two elements including the position registration number and the group registration number on the degree of congestion can be adjusted. Furthermore, by setting $\gamma 1 = \gamma 2 = 1$, the power operation may be configured not to be performed.

In Equation (2), $\mu 1$ and $\mu 2$ are constants larger than or equal to "0", and at least one thereof is larger than "0". In addition, by adjusting $\mu 1$ and $\mu 2$, the influences of two elements including the position registration number and the group registration number on the degree of congestion can be adjusted. Furthermore, by setting $\mu 1 = \mu 2 = 1$, the power operation may be configured not to be performed.

When the degree of congestion $Z[i]$ is large, for example, in a case where the terminal device 10 originates a call, due to absence of an empty channel or the like, there is a high possibility that communication between the terminal device 10 and the base station device 12 is not established. On the other hand, as a base station device 12 of which the value of the degree of congestion $Z[i]$ has a smaller value, it can be stated that there is a higher possibility that communication between the terminal device 10 and the base station device 12 is established. For this reason, as the degree of congestion $Z[i]$ has a smaller value, the priority level of a channel scan for the channel of the i-th base station device $12i$ may be set to be higher. For this reason, the generator 32 generates information relating to a priority level of the channel in accordance with the index calculated by the index calculator 42. In this example, while the index calculator 42 has been described to calculate the index, any other method may be used. For example, it may be configured such that each base station device 12 or another device calculates an index representing the degree of congestion of each base station device 12, and the acquirer 40 acquires the index. In such a case, the index calculator 42 of the management device 16 can be omitted.

According to this embodiment, since an index representing the degree of congestion of each base station device is generated, the accuracy of a prediction of a channel shortage can be further improved. In other words, the accuracy of a prediction relating to the easiness of establishment of communication can be further improved. In addition, since the information relating to priority levels of channels is generated according to the index representing the degree of congestion of each base station device, the channels of the whole system can be effectively used, and a communication system easily establishing communication can be provided.

Embodiment 6

Next, Embodiment 6 will be described. Embodiment 6, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. In Embodiment 5, the index representing the degree of congestion of each base station device is calculated, and the channel direction command is generated according to the index. In Embodiment 6, the channel direction command is generated by using data relating to reception power of the terminal device 10. The communication system 100, the management device 16, and the terminal device 10 according to Embodiment 6 are of types similar to those illustrated in FIGS. 1, 11, and 5. Here, differences from the embodiments described until now will be focused in the description.

Figure 12:
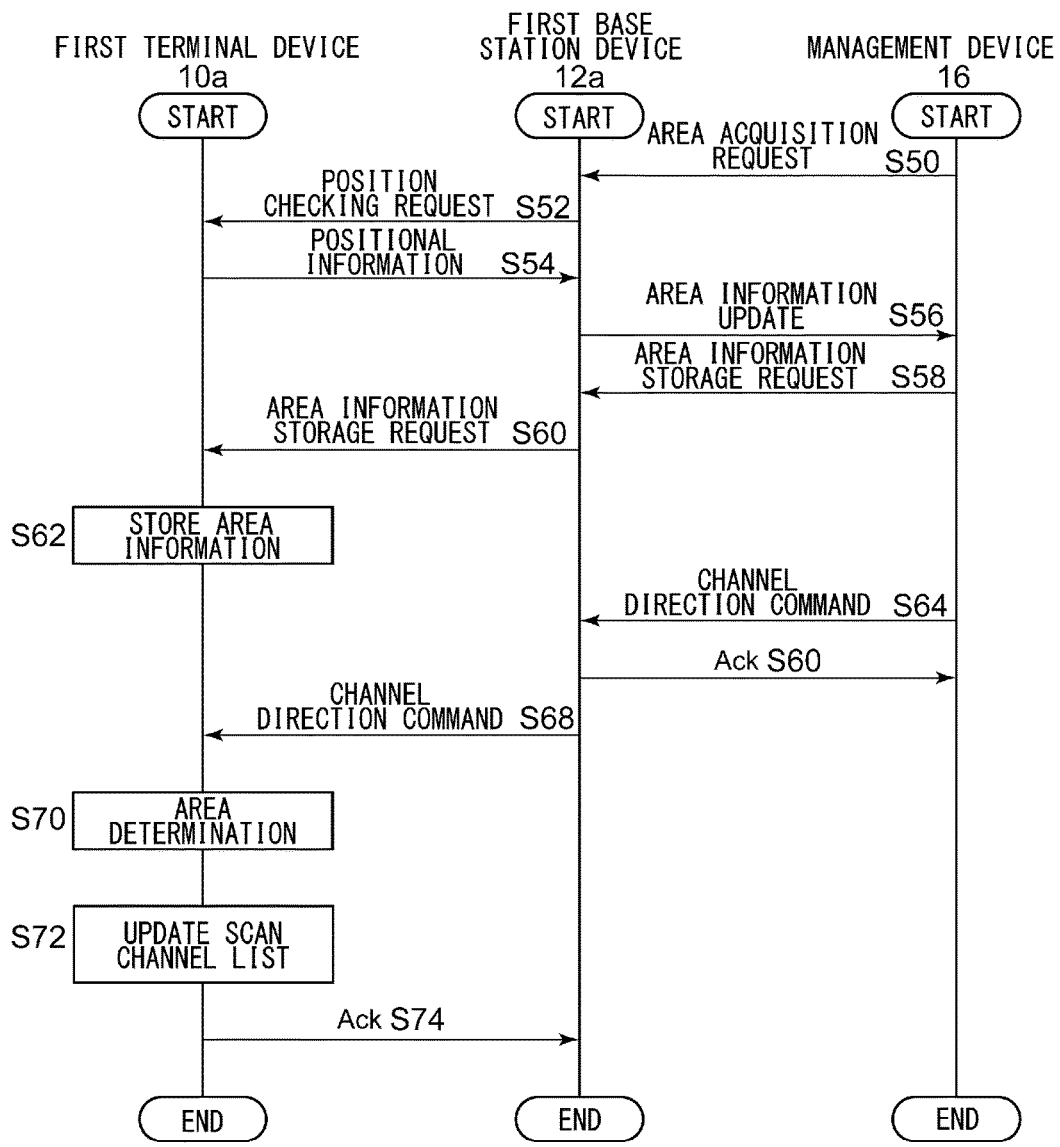
FIG. 12 is a sequence diagram that illustrates the sequence of updating a scan channel list in a communication system according to Embodiment 6.

The processing sequences of the terminal device 10, the base station device 12, and the management device 16 according to Embodiment 6 are different from those described until now, and thus, here, the operations will be described before the configurations. FIG. 12 is a sequence diagram that illustrates the sequence of updating a scan channel list in the communication system 100. The management device 16 transmits an area acquisition request to a first base station device 12a (S50), and the first base station device 12a transmits the area acquisition request to a first terminal device 10a (S52). Here, an area is an area that is defined to be smaller than the communicable area 20 described until now, and details thereof will be described later.

The first terminal device 10a transmits positional information to the first base station device 12a (S54), and the first base station device 12a transmits an area information update to the management device 16 (S56). The management device 16, in order to store information relating to an area in which the first terminal device 10a is present in the first terminal device 10a, transmits an area information storage request to the first base station device 12a (S58), and the first base station device 12a transmits the area information storage request to the first terminal device 10a (S60). The first terminal device 10a stores area information (S62).

The management device 16 transmits a channel direction command to the first base station device 12a (S64), and the first base station device 12a transmits Ack to the management device 16 (S66). The first base station device 12a transmits a channel direction command to the first terminal device 10a (S68). The first terminal device 10a determines an area (S70) and updates the scan channel list (S72). The first terminal device 10a transmits Ack to the first base station device 12a (S74).

In such an operation, when the positional information is transmitted, the terminal device 10 transmits the positional information in combination with a reception channel and a reception state (the intensity of the electric field, the reception power, and the like) to the base station device 12. The base station device 12 or the management device 16 stores the positional information, the channel, and the reception state transmitted from the terminal device 10 in a database. FIG. 13 illustrates the data structure of the database stored in the storage 34. As illustrated in the drawing, the positional information, the channel, and the reception state are stored in association with date and time and an area code. In addition, instead of generating a database based on the information received from the terminal device 10, the database may be generated by performing measurements in advance. Furthermore, the database may be generated by estimating the intensity of the electric field or the reception power at each site through a simulation such as ray tracing that is in consideration of a distance from the base station device 12 and topography instead of performing actual measurements.

Figure 14:
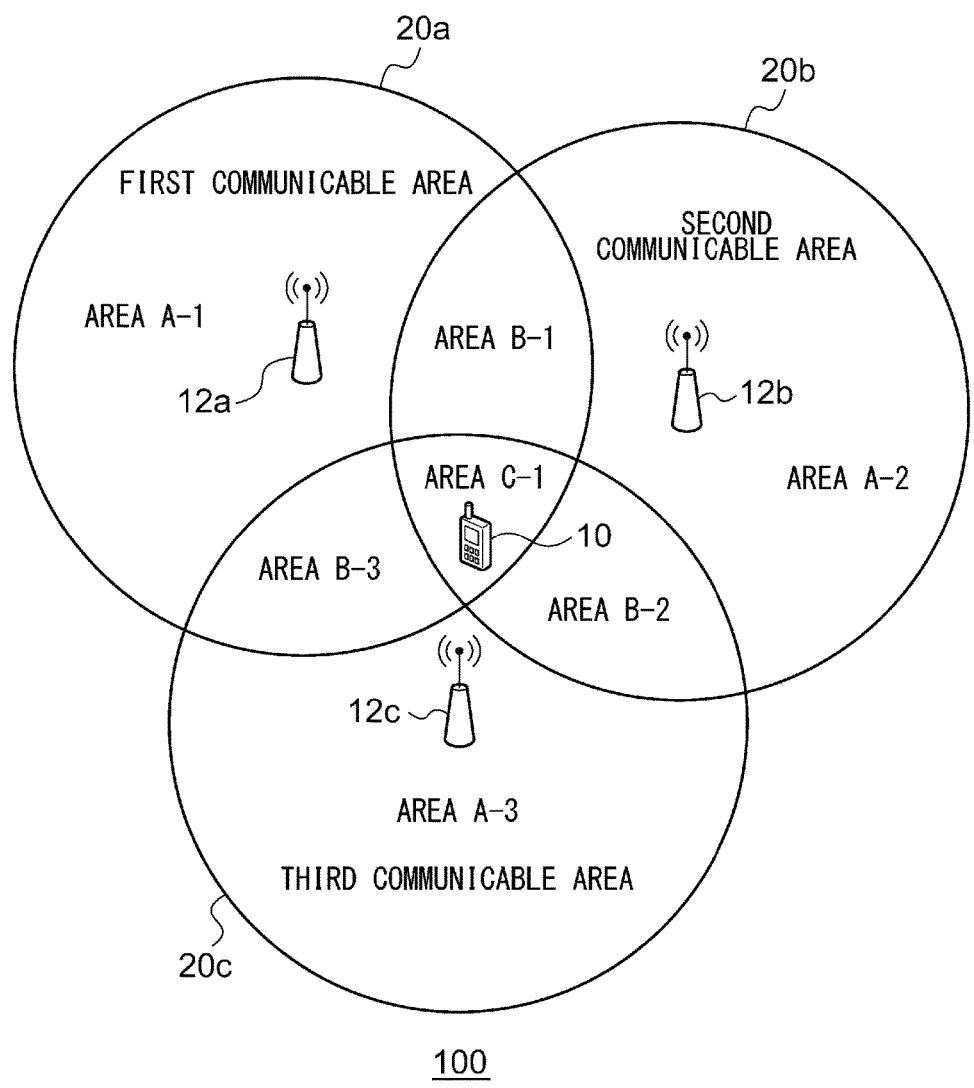
FIG. 14 is a diagram that illustrates the configuration of an area defined by a management device according to Embodiment 6.

The area code illustrated in FIG. 13 is a code used for identifying an area described above. FIG. 14 illustrates the configuration of areas defined by the management device 16. Inside the first communicable area 20a to the third communicable area 20c described above, areas such as an "area A-1" and the like are defined. In other words, the areas can be regarded as areas acquired by subdividing the communicable area 20. Here, "A-1" included in the "area A-1" corresponds to an area code.

In the sequence illustrated in FIG. 12, the first terminal device 10a transmits positional information to the first base station device 12a, and the first base station device 12a transmits the positional information and area information (area code) to the management device 16. The index calculator 42 of the management device 16 selects rows in which the area code matches the received area code by referring to the database illustrated in FIG. 13 and calculates an average value of the reception power of each channel for such data. In addition, the generator 32 sets priority levels of the channels in order of largest to smallest average value of the reception power. In other words, a priority level of a channel for which the average value of the reception power is largest is set as "1", and a priority level of a channel for which the average value of the reception power is second largest is set as "2".

Here, such a process will be further described with reference to FIG. 14. In the case illustrated in FIG. 14, the terminal device 10 is located in an area C-1 and can use three base station devices 12. In addition, in the database illustrated in FIG. 13, three pieces of data are stored for the area C-1. In this case, since only one piece of data is present for each of channels A, B, and C, an average value of reception power is a value included in the database, and the channel A has an average value of "−115", the channel B has an average value of "−120", and the channel has an average value of "−100". The generator 32 selects the channel C for which the reception power is maximum as a first priority channel and generates a channel direction command in which the first priority channel is stored. In addition, it may be configured such that the channel A for which the reception power is second maximum is selected as a second priority channel, and a channel direction command in which the first priority channel and the second priority channel are stored is generated. FIGS. 15A and 15B illustrate the formats of signals transmitted and received in the communication system 100. FIGS. 15A and 15B respectively correspond to FIGS. 4A and 4B.

Hereinafter, a method of determining priority levels of channels by using the reception power and the degree of congestion according to Embodiment 5 will be described. For example, in a case where a terminal device 10 is located in the area C-1, the index calculator 42 calculates degrees of congestion $Z[i]$ ($i=1$ to 3) of the first base station device 12a to the third base station device 12c corresponding to the channels A, B, and C by using the method described in Embodiment 5. Next, similarly to the description presented above, the index calculator 42 calculates an average value of reception power for each channel. In addition, in this embodiment, for simple description, it is assumed that one channel corresponds to one base station device 12, an average value of the reception power of the channel of the i-th base station device 12i is denoted by $P[i]$, the value of $P[i]$ is constantly negative, and the reception power is higher as the absolute value thereof is smaller. The index calculator 42, by using the degree of congestion and the reception power, calculates an index S[i] relating to the i-th base station device 12$i$ (channel i) using Equation (3) or Equation (4).

$$S[i]=\beta 1(Z[i])^{\lambda 1}+\beta 2(-P[i])^{\lambda 2} \qquad \text{[Numerical Expression 3]}$$

$$S[i]=(Z[i])^{\theta 1}(-P[i])^{\theta 2} \qquad \text{[Numerical Expression 4]}$$

In other words, an index calculated by the index calculator 42 is an index on which the reception power at the terminal device 10 is reflected. Here, in Equation (3), β1 and β2 are constants larger than or equal to "0", and at least one thereof is larger than "0". In addition, λ1 and λ2 are constants larger than "0". According to Equation (3), as the degree of congestion is smaller and as the reception power is larger, the index S[i] has a smaller value. In Equation (4), θ1 and θ2 are constants larger than or equal to "0", and at least one thereof is larger than "0". According to Equation (4), as the degree of congestion is smaller, and as the reception power is larger, the index S[i] has a smaller value. In addition, in order of smallest to largest index S[i], the priority level of the channel is set to be higher. In other words, a priority level of a channel having a smallest index S[i] is set as "1", and a priority level of a channel having a second smallest index is set as "2". In this embodiment, while the index calculator 42 calculates the index, any other method may be used. For example, it may be configured such that each base station device or another device calculates an index representing the degree of congestion of each base station device, and the acquirer 40 acquires the index. In such a case, the index calculator 42 of the management device 16 may be omitted.

According to this embodiment, since the reception power at the terminal device is also reflected on the index, the accuracy of a prediction of the easiness of establishment of communication can be further improved. In addition, since the information relating to priority levels of channels is generated according to the index on which the reception power is also reflected, the channels of the whole system can be effectively used, and a communication system easily establishing communication can be provided.

Embodiment 7

Next, Embodiment 7 will be described. Embodiment 7, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. Embodiment 7 corresponds to a modified example of Embodiment 1. In Embodiment 1, the channel direction command is generated according to the position registration number. On the other hand, in Embodiment 7, the channel direction command is generated according to a Busy number.

Such Embodiment 7 has the following problems. In the channel assignment according to a distance, a case cannot be considered in which, in accordance with an increase in the number of terminal devices using a base station device, a channel shortage in the base station device occurs. Meanwhile, in a case where information is included in the terminal device, when the arrangement or the like of the base station device is changed, it is necessary to update the data of the terminal device. In other words, while a probability of establishment between a terminal device and a base station device dynamically changes according to the situation from time to time, conventionally, an effective channel scan that is in sufficient consideration of the easiness in establishment of communication is not performed. In addition, when a state having many calls is continued in a certain base station device, and many channels of the base station device are used, in a case where there is an additional call request from another terminal device, a state (hereinafter, referred to as "busy") occurs in which a call channel cannot be assigned according to a channel shortage in the base station device. In such a case, while there is also a case where the terminal device can use a neighboring base station device, an efficient channel scan that is in sufficient consideration of the easiness in establishment of communication is not performed, and accordingly, the terminal device falls into a state in which a call cannot be made. In Embodiment 7, differences from Embodiment 1 will be focused in the description.

The communication system 100 according to Embodiment 7 is similar to that illustrated in FIG. 1. In a case where a potion registration request is received from a terminal device 10, the base station device 12 transmits a use permission to the terminal device 10. Accordingly, for example, a first terminal device 10$a$ and a first base station device 12$a$ are connected, and a channel set to the first base station device 12$a$ is used by the first terminal device 10$a$ and the first base station device 12$a$. On the other hand, even when a call request is received from a terminal device 10, in a case where a channel to be used by the terminal device 10 for a call is insufficient, the base station device 12 transmits a use non-permission to the terminal device 10. At that time, the base station device 12 counts the channel shortage as an occurrence of "Busy". The number (hereinafter, referred to as a "Busy occurrence number") of times of the occurrence of Busy may be maintained by the management device 16.

The management device 16, for a base station device 12 exceeding the allowed value for the Busy occurrence number per unit time, selects a channel of another base station device 12 having a Busy occurrence number not exceeding the allowed value for the Busy occurrence number per unit time and having a smallest Busy occurrence number per unit time among other base station devices 12 neighboring to the base station device 12. In addition, the management device 16 transmits a channel direction command for changing the channel of the terminal device 10 to the selected channel to the base station device 12. The terminal device 10 that has received the channel direction command performs a channel scan in response to the channel direction command.

The management device 16 according to Embodiment 7 is similar to that illustrated in FIG. 2. A receiver 36 receives a Busy occurrence number from each base station device 12. The receiver 36 stores the Busy occurrence number in a storage 34. The storage 34 stores a database illustrated in FIG. 16 instead of that illustrated in FIG. 3A. In addition, the storage 34 also stores the databases illustrated in FIGS. 3B and 3C. FIG. 16 is a diagram that illustrates the data structure of the database stored in the storage 34 according to Embodiment 7. FIG. 16 is a database that illustrates a Busy occurrence number per unit time (for example, one hour) and an allowed value for each base station device 12. The Busy occurrence number per unit time changes in accompaniment with the number of channels of each base station device 12 and a call frequency of the terminal device 10 using each base station device 12. The Busy occurrence number per unit time is written by the receiver 36. Meanwhile, the allowed value corresponds to an upper limit threshold of the Busy occurrence number per unit time. The description will be continued by referring back to FIG. 2.

An acquirer 40 acquires a Busy occurrence number of each base station device 12 from the database illustrated in FIG. 16. As illustrated in FIG. 16, since the Busy occurrence number of "10" of the first base station device 12a exceeds the allowed value for "5", a generator 32 recognizes a channel shortage in the first base station device 12a. In addition, the generator 32, from the database illustrated in FIG. 3B, selects a second base station device 12b in which the Busy occurrence number is smallest out of the second base station device 12b (Busy occurrence number of "2") and a third base station device 12c (Busy occurrence number of "5") that are base station devices 12 neighboring to the first base station device 12a. In addition, the generator 32, from the database illustrated in FIG. 3C, selects a channel B of the selected second base station device 12b. Following this, the generator 32 generates a channel direction command in which the selected channel is included.

In this way, the generator 32 generates information relating to a priority level of a channel desired to be used by a terminal device 10 connected to one of the plurality of base station devices 12 in accordance with the Busy occurrence number that is a parameter acquired by the acquirer 40. Particularly, the generator 32 generates information relating to a priority level of a channel for a base station device 12 of which the position registration number is larger than the allowed value. Here, the Busy occurrence number is also called a busy number and corresponds to the number of times of not establishing communication in each base station device 12.

In the description until now, while the priority level is set to be higher as a base station device 12 has a smaller Busy occurrence number, any other method may be used. For example, the generator 32 may set the priority level to be higher as a base station device 12 has a smaller value that is acquired by subtracting the allowed value from the Busy occurrence number, in other words, a difference value (Busy occurrence number−allowed value) between the Busy occurrence number and the allowed value. In a case where the Busy occurrence number is smaller than the allowed value, this difference value is a negative value. In addition, the generator 32 may set the priority level to be higher as a base station device 12 has a smaller value that is acquired by dividing the Busy occurrence number by the allowed value, in other words, a ratio (Busy occurrence number/allowed value) of the Busy occurrence number to the allowed value. For example, in a case where the Busy occurrence number of the first base station device 12a is 10, the Busy occurrence number of the second base station device 12b is 5, and the Busy occurrence number of the third base station device 12c is 7, and the allowed values thereof are respectively 5, 3, and 6, the ratios of the Busy occurrence numbers to the allowed values of the Busy occurrence numbers are respectively "2", "1.67", and "1.17". As a result, the priority level of the channel of the third base station device 12c is the highest as "1", and the priority level of the second base station device 12b is "2", and the priority level of the first base station device 12a is "3".

In addition, in a case where the busy occurrence number exceeds the allowed value not only in the first base station device 12a but also in the second base station device 12b or the third base station device 12c, a channel shortage occurs in most of the base station devices 12 or all the base station devices 12. Also in a case where all the base station devices 12 exceed the allowed values, a channel shortage occurs in most of the base station devices 12 or all the base station devices 12. The priority channel of each base station device 12 that is selected according to the difference value between the Busy occurrence number and the allowed value or the ratio of the Busy occurrence number to the allowed value described above may be notified as a direction command corresponding to the channel direction command as illustrated in FIG. 4C.

In addition, in the description presented above, while the channel direction command in the form of designating a priority level for each channel has been used, a channel direction command of any other form may be used. For example, by using a scan channel list set in the terminal device 10 as the reference, a channel direction command designating a relative change in the priority level may be used. FIGS. 17A to 17C illustrate the formats of signals transmitted and received in the communication system 100 according to Embodiment 7.

For example, a case will be assumed in which a command illustrated in FIG. 17A is received in a state in which a scan channel list set in the terminal device 10 is "first priority=channel B, second priority=channel C, and third priority=channel A". In such a case, the order of the channel A of the third priority is raised by one in a priority level increasing direction, and "first priority=channel B, second priority=channel A, and third priority=channel C". In addition, in a case where two channels (second priority=channel A and channel C) are ranked in the same order, by employing a channel (channel A) designated by the channel direction command, the order of the other channel is lowered.

In the state described above, in a case where a command illustrated in FIG. 17B is received, the order of the channel B of the first priority is lowered by one in a priority level lowering direction, the order of the channel C that is designated as the second priority, which is the movement destination thereof, is raised by one, and "first priority=channel C, second priority=channel B, and third priority=channel A". In the state described above, in a case where a command illustrated in FIG. 17C is received, the order of the channel B of the first priority is lowered by two, the order of the channel A of the third priority is raised by two, and "first priority=channel A, second priority=channel C, and third priority=channel B". In other words, by using the channel scan priority level set in the terminal device 10 as the reference, a channel direction command directing a relative change therefrom is used.

In addition, according to this embodiment, since the information relating to priority levels of channels is generated by using the Busy occurrence number in each base station device, the accuracy of the information relating to priority levels of channels can be improved. In addition, since the information relating to priority levels of channels is generated by using the Busy occurrence number in each base station device, the process can be simplified. Furthermore, since the information relating to priority levels of channels is generated for each base station device in which the Busy occurrence number is larger than the allowed value, movement from a base station device having a high possibility of the occurrence of a channel shortage to another base station device can be performed. In addition, since the information relating to priority levels of channels is generated according to a difference between the Busy occurrence number and the allowed value, the degree of freedom in the configuration can be improved. Furthermore, since the information relating to priority levels of channels is generated according to the ratio of the Busy occurrence number to the allowed value, the degree of freedom in the configuration can be improved. In addition, by using the channel scan priority level set in the terminal device as the reference, since the channel direction command directing a relative change therefrom is used, the degree of freedom in the configuration can be improved.

Embodiment 8

Next, Embodiment 8 will be described. Embodiment 8, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. Embodiment 8 corresponds to a modified example of Embodiment 2. In Embodiment 2, the channel direction command is generated according to the position registration number per channel of the base station device. On the other hand, in Embodiment 8, the channel direction command is generated according to an average Busy occurrence number per one channel for a unit time. In Embodiment 8, difference from Embodiment 2 will be focused in the description.

The storage 34 illustrated in FIG. 2 stores a database illustrated in FIG. 18. FIG. 18 illustrates the data structure of the database stored in a storage 34 according to Embodiment 8. A Busy occurrence number per unit time is written by a receiver 36. The number of channels and the allowed value for each base station device 12 may be input in advance. The average Busy occurrence number per one channel is derived by dividing a Busy occurrence number per unit time by the number of channels of the base station device 12. In addition, the allowed value that is an upper limit threshold of the Busy occurrence number per unit time may be arbitrarily determined and input by a system supervisor or be automatically changed according to a changing Busy occurrence number. The description will be continued by referring back to FIG. 2.

An acquirer 40 acquires an average Busy occurrence number per one channel of each base station device 12 from the database illustrated in FIG. 18. As illustrated in FIG. 18, since the average Busy occurrence number per one channel for a second base station device 12b exceeds the allowed value, the generator 32 recognizes that the possibility of the occurrence of a channel shortage in the second base station device 12b is high. For this reason, the generator 32 generates a channel direction command and transmits the generated channel direction command from the second base station device 12b to the terminal device 10.

At that time, the generator 32 selects a first base station device 12a in which the average Busy occurrence number per one channel is smallest among base station devices 12 neighboring to the second base station device 12b. In addition, the generator 32 sets priority levels of channels of the first base station device 12a to be the highest. Accordingly, the terminal device 10 connected to the second base station device 12b scans the channels of the first base station device 12a with a priority. As a result, the load of the second base station device 12b is reduced. In addition, the average Busy occurrence number per one channel calculated for the whole communication system 100 may be used as the allowed value. In this way, the degrees of the loads of the base station devices 12 are approximately uniform.

In this way, the generator 32 generates information relating to priority levels of channels in accordance with each Busy occurrence number per one channel that is acquired by the acquirer 40. Particularly, the generator 32 generates information relating to priority levels of channels for a base station device 12 in which the Busy occurrence number per one channel acquired by the acquirer 40 is larger than the allowed value.

Until now, while the priority level is set to be higher as a base station device 12 has a smaller average Busy occurrence number per one channel, any other method may be used. For example, the generator 32 may set the priority level to be higher as a base station device 12 has a value acquired by subtracting the allowed value from the average Busy occurrence number per one channel, in other words, a difference value between the average Busy occurrence number per one channel and the allowed value to be smaller. In addition, the generator 32 may set the priority level to be higher as a base station device 12 has a value acquired by dividing the average Busy occurrence number per one channel by the allowed value, in other words, a ratio of the average Busy occurrence number per one channel to the allowed value to be smaller.

According to this embodiment, since the information relating to priority levels of channels is generated by using the average Busy occurrence number per one channel of each base station device, the accuracy of a prediction of a channel shortage can be improved. In addition, since the information relating to a priority level of channels is generated for each base station device in which average Busy occurrence number per one channel is larger than the allowed value, movement from a base station device having a high possibility of the occurrence of a channel shortage to another base station device can be performed. Furthermore, since the information relating to a priority level of channels is generated according to a difference between the average Busy occurrence number per one channel and the allowed value, the degree of freedom in the configuration can be improved. In addition, since the information relating to a priority level of channels is generated according to the ratio of the average Busy occurrence number per one channel to the allowed value, the degree of freedom in the configuration can be improved.

Embodiment 9

Next, Embodiment 9 will be described. Embodiment 9, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. Embodiment 9 corresponds to a modified example of Embodiment 5. In Embodiment 5, an index representing the degree of congestion of a base station device is calculated while using the position registration number, and a channel direction command is generated according to the index. On the other hand, in Embodiment 9, an index representing the degree of congestion of each base station device is calculated while using the Busy occurrence number, and a channel direction command is generated according to the index. In Embodiment 9, differences from Embodiment 5 will be focused in the description.

The management device 16 according to Embodiment 9 is as illustrated in FIG. 11. An acquirer 40 acquires the Busy occurrence number of the base station device 12, the position registration number of the base station device 12, and the number of channels of the base station device 12 from databases illustrated in FIGS. 18 and 8. An index calculator 42 derives an index representing the degree of congestion for each base station device 12 based on the acquired data. The index calculator 42 calculates an index Z[i] representing the degree of congestion of the i-th base station device 12i by using Equation (5) or Equation (6).

$$Z[i] = \alpha 1 \left(\frac{B[i]}{C[i]}\right)^{\gamma 1} + \alpha 2 \left(\frac{D[i]}{C[i]}\right)^{\gamma 2} \quad \text{[Numerical Expression 5]}$$

$$Z[i] = \left(\frac{B[i]}{C[i]}\right)^{\mu 1} \left(\frac{D[i]}{C[i]}\right)^{\mu 2} \quad \text{[Numerical Expression 6]}$$

In Equation (5), B[i] is the Busy occurrence number per unit time of the i-th base station device 12i, D[i] is the number of terminal devices 10 registered in the i-th base station device 12i, and C[i] is the number of channels of the i-th base station device 12i. Equation (5) can be regarded as calculation of a weighted average of the Busy occurrence number per one channel and the position registration number per one channel using α1 and α2 as weighting factors. As the Busy occurrence number per one channel becomes larger, and the position registration number per one channel becomes larger, the degree of congestion Z[i] has a larger value. In addition, by adjusting γ1 and γ2, the influences of two elements including the Busy occurrence number and the position registration number on the degree of congestion can be adjusted. Equation (6) is similar to Equation (5).

In addition, in Equation (5) and Equation (6), instead of D[i], the number of terminal devices 10 registered in the i-th base station device 12i, G[i], the number of groups registered in the i-th base station device 12i may be used. In such a case, as the Busy occurrence number per one channel becomes larger, and the number of groups per one channel becomes larger, the degree of congestion Z[i] has a larger value. In a radio system in which there are many group calls, the number of groups G[i] may be used. In addition, the degree of congestion may be calculated using three elements including the Busy occurrence number per one channel, the position registration number per one channel, and the number of groups per one channel. Similarly to Equation (5), a weighted sum value of the three elements may be calculated. In addition, similarly to Equation (6), a multiplication value of the three elements may be calculated.

In addition, the priority levels of channels may be determined in consideration of the intensity of the electric field at the position of the terminal device 10 or the reception power of the terminal device 10. For example, as the intensity of the electric field at the position of the terminal device 10 that is a candidate to be moved among the base station devices 12 is higher, an index having a larger value is calculated for each base station device 12. Then, as the index is larger, the priority level of the channel is set to be higher. For example, a case will be considered in which a first terminal device 10a and a second terminal device 10b registered in a first base station device 12a are moved to a second base station device 12b or a third base station device 12c. In order to clarify the description, here, the first terminal device 10a will be represented as a terminal device A, and the second terminal device 10b will be represented as a terminal device B.

The intensity of the electric field of the second base station device 12b at the position of the terminal device A will be denoted by E(2, A), and the intensity of the electric field of the third base station device 12c will be denoted by E(3, A). In addition, the intensity of the electric field of the second base station device 12b at the position of the terminal device B will be denoted by E(2, B), and the intensity of the electric field of the third base station device 12c will be denoted by E(3, B). A sum of the intensities of electric fields of the terminal device 10 that is a movement candidate is calculated for each base station device 12 and is used as an index. The index S[2] of the second base station device 12b is S[2]=E(2, A)+E(2, B), and the index S[3] of the third base station device 12c is S[3]=E(3, A)+E(3, B). In addition, instead of calculating a sum of the intensities (reception power) of electric fields at the position of each terminal device 10, a representative value such as an average value or a median value may be calculated, and an index may be calculated using the representative value. In other words, a value aggregating the intensities (reception power) of electric fields at the positions of a plurality of terminal devices 10 may be calculated, and an index may be calculated using the value. In addition, a value corresponding to a minimum value of intensities (reception power) of electric fields of the terminal device 10 that is a movement target or a value corresponding to lowest X % thereof may be calculated for each base station device 12, and an index may be calculated using the value.

Here, the value corresponding to lowest X % is the intensity of the electric field of a terminal device 10 corresponding to the order of lowest X % in a case where terminal devices 10 are sorted in order of highest to lowest intensity of the electric field. In a case where a minimum value is used, when E(2, A)<E(2, B), S[2]=E(2, A). In addition, when E(3, A)>E(3, B), S[3]=E(3, B). Then, in a case where S[2]>S[3], the channel scan priority level of the second base station device 12b is set to be higher than that of the third base station device 12c. In addition, as data of the intensity (reception power) of the electric field at each position, positional information and information of reception power may be sequentially received from the terminal device 10, and the information may be used. Alternatively, it may be configured such that information received from a measurement device such as the terminal device 10 in the past is accumulated, a database representing the intensity of an electric field at each site is generated, and the database is used. In addition, a database representing the radio wave conditions at each site may be generated by estimating the intensity of the electric field or reception power at each site not through actual measurements but through a simulation that is in consideration of a distance from the base station device 12 or the topography.

In addition, an index that is inconsideration of both the degree of congestion and the intensity of the electric field is calculated, and the priority level of a channel may be determined according to the index. For example, an index S[i] having a larger value as the degree of congestion Z[i] is lower, and as the intensity of the electric field at the position of the terminal device 10 that is a movement candidate is larger is calculated for each base station device 12 that is a movement destination candidate to which the terminal device 10 is moved. In addition, the priority level of a channel may be set to be higher as the index S[i] is larger.

According to this embodiment, since an index representing the degree of congestion of each base station device is generated while using the Busy occurrence number, the accuracy of a prediction of a channel shortage can be further improved. In other words, the accuracy of a prediction relating to the easiness in establishment of communication can be further improved. In addition, since the information relating to priority levels of channels is generated according to the index representing the degree of congestion of each base station device, the channels of the whole system can be effectively used, and a communication system easily establishing communication can be provided.

Embodiment 10

Next, Embodiment 10 will be described. Embodiment 10, similarly to the embodiments described until now, relates to a communication system in which a plurality of base station devices are disposed, and a terminal device is connected to one thereof and performs radio communication. In addition, a management device generates a channel direction command and transmits the generated channel direction command to the terminal device through a base station device. Embodiment 10 corresponds to a modified example of Embodiment 6. In Embodiment 6, a channel direction command is generated using the index representing the degree of congestion using the position registration number and the reception power. On the other hand, in Embodiment 10, a channel direction command is generated using the index representing the degree of congestion using the Busy occurrence number and the reception power. In Embodiment 10, differences from Embodiment 6 will be focused in the description.

Similarly to Embodiment 6, an index calculator 42 calculates an index S[i] relating to the i-th base station device 12i (channel i) using the degree of congestion and the reception power by using Equation (3) or Equation (4). Here, on the degree of congestion, similarly to Embodiment 9, the Busy occurrence number is reflected.

According to this embodiment, since the information relating to priority levels of channels is generated according to the index on which the reception power is also reflected, the channels of the whole system can be effectively used, and a communication system easily establishing communication can be provided.

Embodiment 11

In a communication system relating to Embodiment 11, a group call is executed. The group call is a one-to-many call within a group formed in a plurality of terminal devices. In the group call, a plurality of terminal devices within a same group that are connected to one base station device use a common channel. For this reason, in the group call, the channels are used more efficiently than those of individual calls executed as one-to-one calls. In accordance with an increase in the number of terminal devices connected to each base station device, the number of terminal devices included in one group tends to be increased. In a case where the number of terminal devices included in one group is increased, a call generation probability of each group may increase. For this reason, in each base station device, in a group in which the number of terminal devices is large, the call generation probability increases, and there is a possibility that a time occupying a channel becomes long. This is one factor causing a channel shortage. Under such a status, in order to perform an efficient channel scan in consideration of the easiness in establishment of communication, the following process is performed in this embodiment.

The management device is connected to a base station device through a network. The management device also stores a database in which the number of terminal devices for each group in each base station device is represented together with a database in which a relation between a base station device and a channel is represented. The management device specifies a group in which the number of terminal devices is large in one base station device as a group that may cause a channel shortage. In addition, the management device generates information (hereinafter, referred to as a "channel direction command") relating to a priority level of a channel desired to be used by terminal devices included in the group specified in the one base station device at the time of performing a channel scan. In addition, the management device transmits the channel direction command to the specified group through the one base station device. Each of the terminal devices included in the group performs a channel scan in accordance with the channel direction command.

The communication system 100 according to Embodiment 11 is of a type similar to that illustrated in FIG. 1. Here, differences will be focused in the description. The terminal device 10 is connected to the base station device 12 in compliance with a radio communication system. Examples of the radio communication system include a business radio system, a mobile telephone system, and the like. However, these are known technologies, and thus, the description thereof will not be presented here. Each of the plurality of base station devices 12 can be connected to the terminal device 10 on one end side in compliance with the same radio communication system as that of the terminal device 10. In addition, each base station device 12 can be connected to the network 14 on the other end side. Here, each base station device 12 operates in one of a plurality of channels defined in the communication system 100. For example, mutually-different channels are set to two or more base station devices 12 arranged to be neighboring to each other.

The base station device 12 is connected to the management device 16 through the network 14. The network 14 transmits/receives data among various devices. The network 14 may be an arbitrary network and, for example, may be a wired network, a wireless network, or a combination thereof. According to such a configuration, the terminal device 10 can communicate with a communication device not illustrated in the drawing through the base station device 12 and the network 14. The communication device not illustrated in the drawing may be a device that is directly connected to the network 14 or another terminal device 10 that is connected to the base station device 12. Here, the communication is a call or data communication. The management device 16 communicates with the terminal device 10 through the network 14 and the base station device 12. The management device 16 may be included in one of the base station devices 12.

In the communication system 100, an individual call that is one-to-one call using the terminal device 10 is performed, and a group call that is a one-to-many call using the terminal device 10 is also performed. In this embodiment, while the group call will be described, before the description, an overview of the individual call that is a premise thereof will be described. In a case where the terminal device 10 enters a communicable area 20 and receives a signal in a channel of a base station device 12 forming the communicable area 20, the terminal device 10 transmits a position registration request to the base station device 12. In a case where the position registration request is received from the terminal device 10, the base station device 12 transmits a use permission to the terminal device 10. As a result, as illustrated in the drawing, the first terminal device 10a and the first base station device 12a are connected, and a channel set in the first base station device 12a is used for communication between the first terminal device 10a and the first base station device 12a. In other words, in the base station device 12, channels corresponding to the number of the terminal devices 10 performing individual calls are used.

The characteristic of a group call is that one channel is used by terminal devices 10 of a same group of one base station device 12. For this reason, in a case where the group registration number corresponding to a group using the base station device 12 is only one, only one channel is used. In addition, in a case where the group registration number of the base station device 12 is equal to or smaller than the number of channels of the base station device 12, even when the position registration number of terminal devices 10 included in each group is increased, the load of channels of the base station device 12 is not increased as that much. On the other hand, in a case where the group registration number of the base station device 12 is larger than the number of channels of the base station device 12, in accordance with an increase in the position registration number of the terminal devices 10 included in each group, a possibility of the occurrence of a channel shortage increases. In addition, in a case where the group registration number of the base station device 12 is increased, a possibility of the occurrence of a channel shortage in the base station device 12 increases.

In order to suppress the occurrence of a channel shortage in a group call, the terminal device 10, in a case where a signal in a channel of a base station device 12 is received, transmits a group registration request to the base station device 12 together with a position registration request. In a case where the position registration request and the group registration request are received, the base station device 12 transmits a use permission including a group call to the terminal device 10 and maintains a position registration number of each group. The base station device 12 transmits the position registration number of each group to the management device 16 through the network 14.

The management device 16 receives the position registration number of each group from the base station device 12 through the network 14 and maintains the position registration number of each group for each base station device 12. The position registration number of each group is changed according to the movement of the terminal device 10 using each base station device 12. In addition, the management device 16 maintains an allowed value for the position registration number of each group for each base station device 12 and maintains information of neighboring base station devices 12 and information of channels for each base station device 12.

The management device 16 compares the position registration number and the allowed value for each group for each base station device 12 and specifies a group of which the position registration number 12 is larger than the allowed value in one base station device 12. In addition, the management device 16 selects a channel of another base station device 12 of which the position registration number of the specified group is the smallest among other base station devices 12 neighboring to the one base station device 12. Furthermore, the management device 16 generates a channel direction command used for changing the channel of the terminal device 10 included in the group specified by the one base station device 12. The one base station device 12 transmits the channel direction command to the specified group. The terminal device 10 that has received the channel direction command performs a channel scan in response to the channel direction command.

Figure 19:
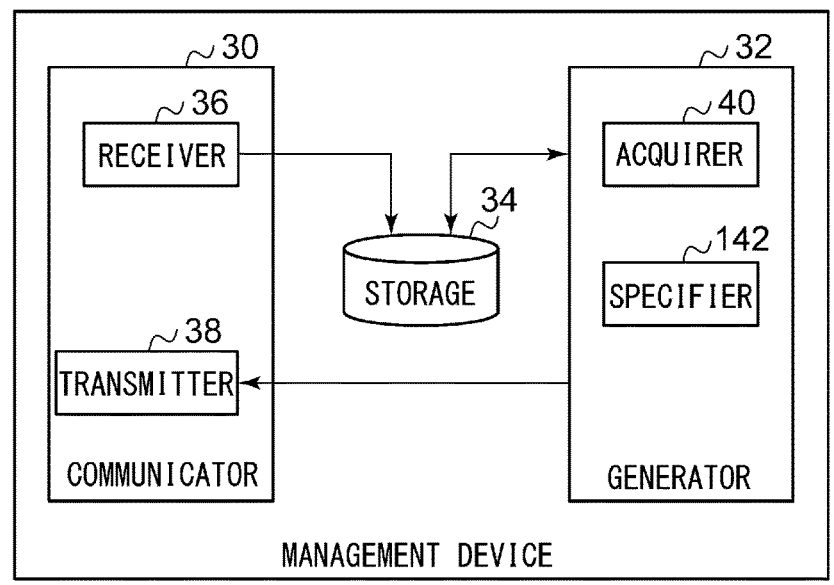
FIG. 19 is a diagram that illustrates the configuration of the management device illustrated in FIG. 1.

FIG. 19 illustrates the configuration of the management device 16. The management device 16 includes a communicator 30, a generator 32, and a storage 34. In addition, the communicator 30 includes a receiver 36 and a transmitter 38. The generator 32 includes an acquirer 40 and a specifier 142. The communicator 30 is connected to the base station device 12 through the network 14. The receiver 36 receives a position registration number of each group from each base station device 12. The receiver 36 stores the position registration number of each group in the storage 34.

The storage 34 stores databases illustrated in FIGS. 20A to 20C. FIGS. 20A to 20C illustrate the data structures of the databases stored in the storage 34. FIG. 20A is a database that represents a group number of each base station device 12 and a position registration number and an allowed value for each group. The group number is assigned so as to identify each group. In the example illustrated in the drawing, three groups are registered in the first base station device 12a, four groups are registered in the second base station device 12b, and four groups are registered in the third base station device 12c. In other words, in the database illustrated in FIG. 20A, information of the group registration number of each base station device 12 is also recorded. In addition, the position registration number of each group is associated with a group number. Here, terminal devices 10 to which a same group number is assigned are in a same group even in a case where the terminal devices are connected to mutually-different base station devices 12 and thus, can perform a group call.

For example, a terminal device 10 having a group number of "1" connected to the first base station device 12a and a terminal device 10 having a group number of "1" connected to the third base station device 12c can perform a group call. In the description presented below, a group having the group number of "1" may be also referred to as a "group 1". This similarly applies to a group having another group number. Here, the group number and the position registration number of each group is received by the receiver 36. On the other hand, the allowed value may be input in advance.

FIG. 20B is a database in which base station devices 12 neighboring to each base station device 12 are represented. For example, the second base station device 12b and the third base station device 12c are neighboring to the first base station device 12a. FIG. 20C is a database in which a channel of each base station device 12 is represented. For example, in the first base station device 12a, a channel A is used. For the clarification of the description, in this embodiment, the number of channel of each base station device 12 will be described as "1". However, the number of channels is not limited thereto, but the number of channels included in each base station device 12 may be an arbitrary number. In addition, in a database illustrated in FIG. 20C, information of the number of channels included in each base station device 12 is recorded. The description will be continued by referring back to FIG. 19.

An acquirer 40 acquires a group number and a position registration number of each group for each base station device 12 from the database illustrated in FIG. 20A. The group number and the position registration number of each group are parameters that can be used, for each of the plurality of base station devices 12, for predicting a channel shortage in the base station device 12. The specifier 142 compares a position registration number and an allowed value for each group acquired by the acquirer 40 and specifies a group number and a base station device 12 corresponding to a position registration number exceeding the allowed value. In other words, the specifier 142 specifies a group in accordance with the number of terminal devices 10 of each group. For example, in the case illustrated in FIG. 20A, the position registration number "50" of a "group 1" of the first base station device 12a and the position registration number "30" of a "group 2" of the second base station device 12b exceed the allowed value "20". For this reason, the specifier 142 specifies the "group 1" of the first base station device 12a and the "group 2" of the second base station device 12b.

The generator 32 determines priority levels of the channels for each group specified by the specifier 142. For example, the generator 32, for other base station devices 12 of which the position registration numbers of the specified group are smaller than or equal to the allowed value, compares the position registration numbers of the group with each other and sets the priority levels to be higher in order of smallest to largest position registration number. As described above, in the case illustrated in FIG. 20A, the group 1 of the first base station device 12a is specified. In such a case, the generator 32 compares the position registration number of the group 1 in the second base station device 12b with the position registration number of the group 1 in the third base station device 12c. Since the position registration number of the second base station device 12b is "0", and the position registration number of the third base station device 12c is "10", the generator 32 sets the priority level of the second base station device 12b as "1" that is the highest. In addition, the generator 32 sets the priority level of the third base station device 12c as "2". In addition, in the case illustrated in FIG. 20A, the group 2 of the second base station device 12b is specified. In such a case, the generator 32 compares the position registration numbers of the group 2 in the first base station device 12a and the third base station device 12c and sets the priority level of the third base station device 12c as "1" and sets the priority level of the first base station device 12a as "2".

In addition, the generator 32 selects a channel corresponding to the base station device 12 of which the priority level is set from a database illustrated in FIG. 20C. Following this, the generator 32 generates a channel direction command in which the selected channel is included. FIGS. 21A and 21B illustrate the format of signals transmitted and received in the communication system 100. As illustrated in these, a signal is configured in order of "command", "target group", "parameter 1", and "parameter 2". In the "command", information representing the type of signal is included. In the "target group", a group number that is a reception target for the channel direction command is included. In the "parameter 1" and the "parameter 2", values corresponding to each command are included.

FIG. 21A illustrates a channel direction command for the group 1 described above, and this channel direction command is output to the first base station device 12a. In the "command", "priority channel designation" is included, and, in the "parameter 1", a "priority level" is included. Here, the priority level is set as "1", in other words, "high". In the "parameter 2", "channel B" is included. In addition, FIG. 21B illustrates a channel direction command for the group 2 described above, and this channel direction command is output to the second base station device 12b. While "command" and "parameter 1" are similar to those illustrated in FIG. 21A, in "parameter 2", a "channel C" is included. In addition, as illustrated in FIGS. 21A and 21B, in a case where only one channel is designated, the "parameter 1 (priority level)" may be omitted. In such a case, the designated channel is interpreted to have the priority level of "high".

FIGS. 22A and 22B illustrate other formats of signals transmitted and received in the communication system 100. FIG. 22A illustrates another format of the channel direction command. This is a case where, in the example described above, the third base station device 12c can be also used as a base station device 12 neighboring to the first base station device 12a and is added. In FIG. 22A, compared to FIG. 21A, "parameter 3" and "parameter 4" are added. In the "parameter 3", a "priority level" is included. Here, the priority level is set as "2", in other words, "middle". In the "parameter 4", a "channel C" is included.

FIG. 22B illustrates further another format of the channel direction command. This is, in the example described above, in a case where the terminal device 10 connected to the first base station device 12a is located in an area not connectable to the second base station device 12b and the third base station device 12c, for continuously using the first base station device 12a. For this reason, the channel of the first base station device 12a is added. In FIG. 22B, compared to FIG. 22A, "parameter 5" and "parameter 6" are added. In the "parameter 5", a "priority level" is included. Here, the priority level is set as "3", in other words, "low". In the "parameter 6", a "channel A" is included. The description will be continued by referring back to FIG. 19.

In this way, the generator 32 generates information relating to priority levels of channels desired to be used by the terminal device 10 belonging to the group specified by the specifier 142. At that time, the generator 32 sets the priority level of a channel used by a base station device 12 other than a base station device 12 (a base station device 12 of which the position registration number of the group exceeds the allowed value) that is a processing target to be high. Particularly, the generator 32 sets the priority level of a channel used by another base station device 12 to be higher as the another base station device 12 has a smaller number of the terminal devices 10 belonging to the group specified by the specifier 142. In addition, the generator 32 includes identification information used for identifying the group specified by the specifier 142 in the channel direction command.

In order to transmit the channel direction command generated by the generator 32 to the terminal device 10 belonging to the group specified by the specifier 142, the transmitter 38 transmits the channel direction command to the base station device 12 to which the specified group is connected. In the case described above, the first base station device 12a and the second base station device 12b transmit channel direction commands. As a result, the terminal device 10 of the group 1 connected to the first base station device 12a and the terminal device 10 of the group 2 connected to the second base station device 12b receive the channel direction command.

In the description presented above, while the priority level is set to be higher as a base station device 12 has a smaller position registration number of the group that is the processing target, any other method may be used. For example, an example will be described in which the generator 32 determines a priority level in accordance with the position registration number of each base station device 12 by using the database illustrated in FIG. 20A. First, the second base station device 12b and the third base station device 12c of which the position registration numbers are smaller than or equal to the allowed value for the group 1 are specified as base station devices 12 that are processing targets. A sum of the position registration numbers of the second base station device 12b is "30+20+10+5=65", and a sum of the position registration numbers of the third base station device 12c is "10+10+10+15=45". For this reason, the priority level of the third base station device 12c of which the position registration number is the smallest is set as "1", and the priority level of the second base station device 12b of which the position registration number is second smallest is set as "2". In other words, as another base station device 12 has a smaller number of registered terminal devices 10, the generator 32 sets the priority level of a channel used by the another base station device 12 to be higher. In addition, similarly, as another base station device 12 has a smaller number of terminal devices 10 per one channel, the generator 32 may set the priority level of a channel used by the another base station device 12 to be higher.

While this configuration can be realized by a CPU, a memory, or any other LSI of an arbitrary computer as hardware or can be realized by a program loaded into a memory or the like as software, here, functional blocks realized by cooperation thereof are illustrated. Accordingly, it is understood by persons skilled in the art that such functional blocks can be realized in various forms by using only hardware, only software, or a combination thereof.

The terminal device 10 according to Embodiment 11 is of a type similar to that illustrated in FIG. 5. Here, differences will be focused in the description. The positioner 50 has a positioning function of a global positioning system (GPS) and performs positioning of the terminal device 10. Positional information that is a result of the positioning is represented using latitude and longitude. The positioner 50 outputs the positional information to the controller 60. The controller 60 causes the communicator 62 to transmit a position registration request and a group registration request to the base station device 12. At that time, the controller 60 may include the positional information input from the positioner 50 in the position registration request.

The controller 60 receives a channel direction command from the receiver 64 as an input. In a case where a target group included in the channel direction command has a group number matching a group number to which the terminal device 10 belongs, the controller 60 takes the channel direction command therein. On the other hand, in a case where a target group included in the channel direction command has a group number that is different from the group number to which the terminal device 10 belongs, the controller 60 discards the channel direction command. In addition, the controller 60 stores a list (hereinafter, referred to as a "scan channel list") in which the priority levels of channels to be scanned by the selector 52 are represented and updates the scan channel list in response to the channel direction command that has been taken in.

The data structure of the scan channel list stored in the controller 60 is the same as that illustrated in FIGS. 6A to 6D, and the description thereof will not be presented here.

The selector 52 performs a channel scan process based on the scan channel list stored in the controller 60. More specifically, the selector 52 sets a channel of which the priority level is high in the scan channel list with a priority. In a case where a signal transmitted from a base station device 12, for example, the second base station device 12b is received in the set channel, the selector 52 selects the channel of that time and reports the selected channel to the controller 60. When the report is received, the controller 60 transmits a position registration request and a group registration request to the second base station device 12b. As a result, the terminal device 10 communicates with the second base station device 12b while using the channel of the second base station device 12b. As a result, a terminal device 10 that has succeeded in the scan among a plurality of terminal devices 10 of the group 1 using the first base station device 12a performs communication by using the second base station device 12b in place of the first base station device 12a. For this reason, the possibility of the occurrence of a channel shortage of the first base station device 12a is reduced.

Figure 23:
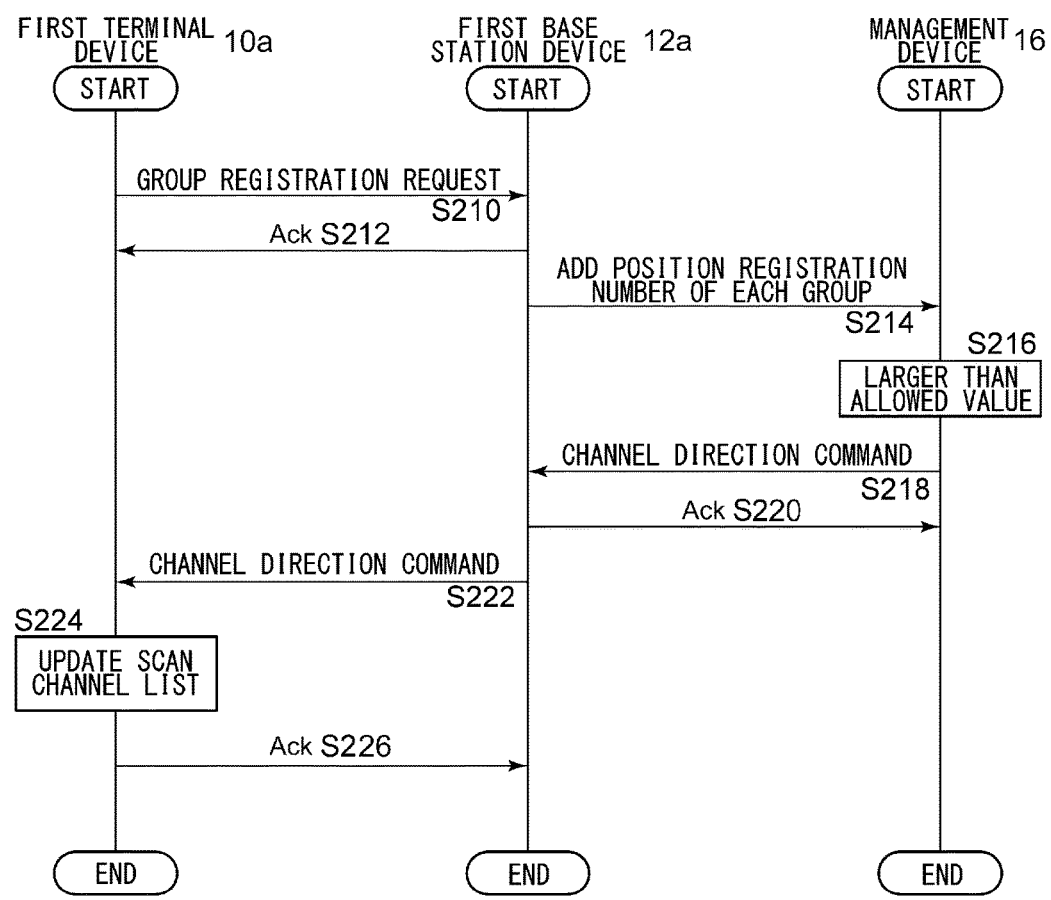
FIG. 23 is a sequence diagram that illustrates the sequence of updating a scan channel list in the communication system illustrated in FIG. 1.

The operation of the communication system 100 according to the configuration described above will be described. FIG. 23 is a sequence diagram that illustrates the sequence of updating a scan channel list in the communication system 100. The first terminal device 10a transmits a group registration request to the first base station device 12a (S210), and the first base station device 12a transmits Ack to the first terminal device 10a (S212). The first base station device 12a adds the position registration number of each group to the management device 16 (S214). The management device 16 specifies a group of which the position registration number is larger than the allowed value in the first base station device 12a (S216).

The management device 16 transmits a channel direction command addressed to the specified group to the first base station device 12a (S218), and the first base station device 12a transmits Ack to the management device 16 (S220). The first base station device 12a transmits a channel direction command to the first terminal device 10a included in the specified group (S222). The first terminal device 10a updates the scan channel list (S224). The first terminal device 10a transmits Ack to the first base station device 12a (S226). In S218, while the channel direction command is transmitted from the management device 16 to the first base station device 12a, in a case where the management device 16 and the base station device 12 are configured as one body, the channel direction command may be directly transmitted from the management device 16 to the first terminal device 10a.

According to this embodiment, since the channel direction command is transmitted with a group designated, a group having a high call generation probability can be moved to another base station device. In addition, since the group having a high call generation probability is moved to another base station device, a possibility of lengthening a channel occupancy time can decrease. In addition, since the possibility of lengthening a channel occupancy time decreases, the occurrence of a channel shortage can be suppressed. In addition, since the channel direction command is transmitted with a group designated, an efficient channel scan that is in consideration of the easiness in the establishment of communication can be performed.

In addition, since the information relating to a priority level of a channel is generated by using the position registration number of each group in each base station device, the process can be simplified. Furthermore, since the information relating to a priority level of a channel is generated for a group of which the position registration number is larger than the allowed value, a group that can cause a channel shortage can be moved to another base station device. In addition, as another base station device has a smaller number of terminals belonging to a specified group, the priority level of the channel used by the another base station device is set to be higher, and accordingly, the group can be moved to another base station device in which a channel shortage cannot easily occur. Furthermore, since the priority level of the channel used by another base station device is set to be higher as the another base station device has a smaller number of registered terminal devices or the number of terminal devices per one channel, the degree of freedom in the configuration can be improved. In addition, since the identification information used for identifying a specified group is included in the channel direction command, the group can be designated.

In addition, when the information relating to a priority level of a channel for the group to which the terminal device belongs is received, the terminal device scans channels based on the received information, and thus, an efficient channel scan that is in consideration of easiness in establishment of communication can be performed. Furthermore, since the channel scan that is additionally in consideration of actual communication conditions and the like is performed, the communication can be easily established. In addition, since only the management device side may be set, an operation of collecting a terminal device and rewriting the data is unnecessary. Furthermore, the operation can be performed according to an actual situation. In addition, maintenance of the environments and the data can be performed without having an influence on the communication protocol between the terminal device and the communication system.

Embodiment 12

Next, Embodiment 12 will be described. Embodiment 12, similarly to Embodiment 11, relates to a communication system in which a plurality of base station devices are disposed, and a terminal device is connected to one thereof and performs radio communication. In addition, a management device generates a channel direction command for a specified group and transmits the generated channel direction command to the terminal device included in the specified group through the base station device. In Embodiment 11, a channel direction command is generated in accordance with a position registration number of each group for each base station device. On the other hand, in Embodiment 12, a channel direction command is generated such that the number of base station devices to which terminal devices of the specified group are connected is small. The communication system 100, the management device 16, and the terminal device 10 according to Embodiment 12 are of types similar to those illustrated in FIGS. 1, 19, and 5. Here, differences from Embodiment 11 will be focused in the description.

The characteristic of a group call is that one channel is used by terminal devices 10 of a same group of one base station device 12. For this reason, in a case where the number of the groups using the base station device 12 is only one, only one channel is used for the call. However, there are also cases where a group call is across a plurality of base station devices 12. In a case where a group call across the plurality of base station devices 12 is generated, two or more channels are used in one group.

Figure 24:
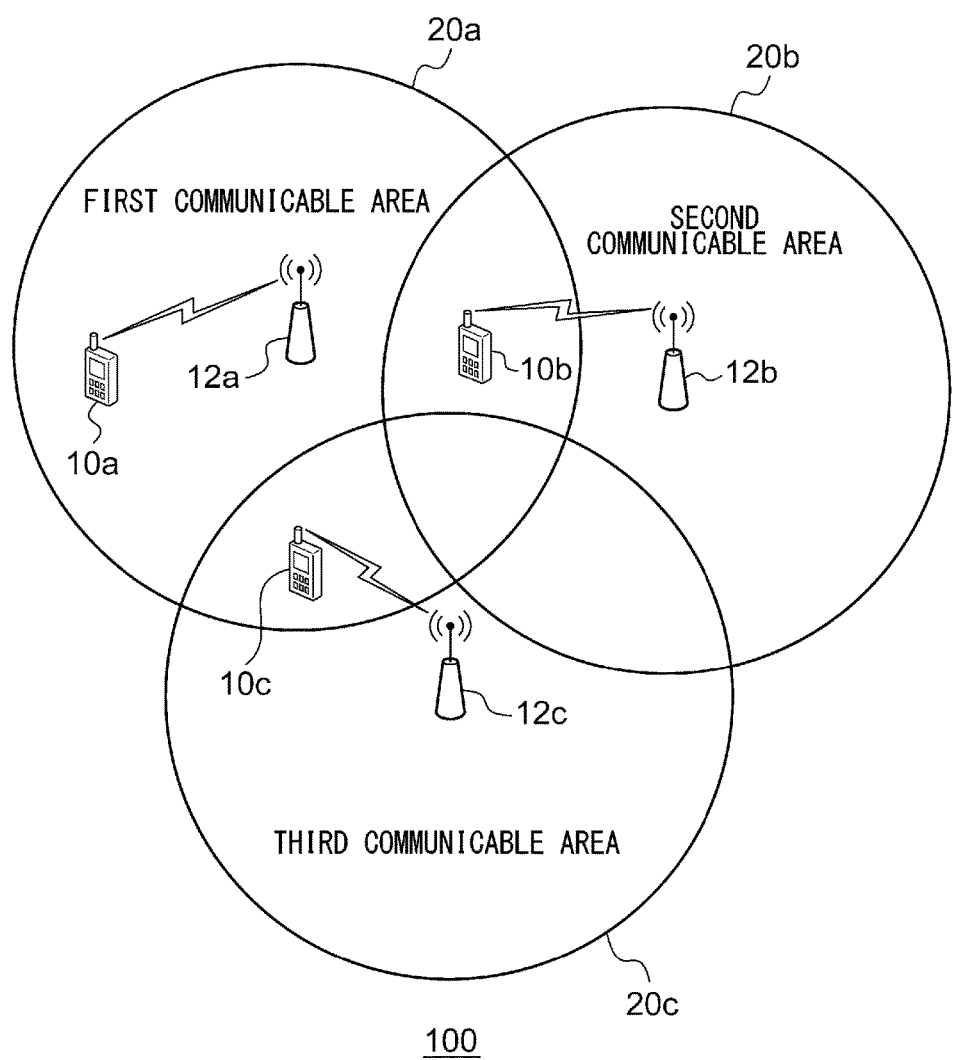
FIG. 24 is a diagram that illustrates an example of a group call performed by a communication system according to Embodiment 12.

FIG. 24 illustrates an example of a group call performed by the communication system 100. Here, a first terminal device 10a, a second terminal device 10b, and a third terminal device 10c are included in a same group. In addition, the first terminal device 10a is connected to a first base station device 12a, the second terminal device 10b is connected to a second base station device 12b, and the third terminal device 10c is connected to a third base station device 12c. For this reason, for this group, three channels are used. In addition, the first terminal device 10a to the third terminal device 10c are located in a first communicable area 20a. In this situation, in a case where a channel direction command is transmitted such that all the terminal devices 10 are connected to the first base station device 12a, a state in which one channel is used is formed from the state in which three channels are used. As a result, a channel shortage is reduced.

The storage 34 illustrated in FIG. 19 stores a database illustrated in FIG. 25. FIG. 25 illustrates the data structure of the database stored in the storage 34. "Used base station device number" represents the number of base station devices 12 used by a group represented by a "group number". An "allowed value" represents an upper limit of the number of base station devices 12 that can be used in a group call. The description will be continued by referring back to FIG. 19. The specifier 142, by referring to a database illustrated in FIG. 25, specifies a group registered in a plurality of base station devices 12, particularly, a group of which the value of the "used base station device number" exceeds the "allowed value". In the case illustrated in FIG. 25, a group 1 and a group 3 are specified.

The generator 32, by referring to the database illustrated in FIG. 20A, searches for base station devices 12 used by a group specified by the specifier 142. In addition, the generator 32 selects a base station device 12 of which terminal devices 10 are desired to be collected based on a result of the search. The generator 32 generates a channel direction command to be transmitted to base station devices 12 other than the selected base station device 12 among a plurality of base station devices 12 included in the result of the search. The formats of the channel direction command are as illustrated in FIGS. 21A and 21B and 22A and 22B. At that time, in the example illustrated in FIG. 25, as the "target group", "1" or "3" is input. The transmitter 38 transmits the channel direction command to the base station devices 12 other than the selected base station device 12. The base station device 12 transmits the channel direction command to terminal devices 10 included in the specified group. In addition, in a case where the format illustrated in FIG. 22B is used, a terminal device 10 that cannot use base station devices other than the connected first base station device 12a continuously uses the first base station device 12a.

In order to move a specific group registered in a predetermined base station device 12 to another base station device 12, the generator 32 determines priority levels as below. In the case illustrated in FIG. 25, the number of used base station devices of a group 1 is "3". Here, it is assumed that the group 1 uses three base station devices including the first base station device 12a, the second base station device 12b, and the third base station device 12c, and the position registration numbers of the group 1 in the base station devices 12 are respectively "20", "5", and "10". In order to decrease the number of used base station devices 12 of the group 1, the generator 32 specifies the second base station device 12b in which the position registration number of the group 1 is the smallest as a base station device 12 that is a movement source. In addition, the generator 32 selects base station devices 12 other than the second base station device 12b as movement destination candidates. Furthermore, in order to change terminal devices 10 of the group 1 registered in the second base station device 12b to be registered in the first base station device 12a or the third base station device 12c, the generator 32 generates a channel direction command.

In a first method for determining the priority levels of a channel scan, for the movement destination candidates, the priority level is set to be high in order of largest to smallest position registration number of the group 1. For example, the generator 32 sets the priority level of the first base station device 12a in which the position registration number of the group 1 is the largest as "1", and sets the priority level of the third terminal device 10c in which the position registration number of the group 1 is the second largest as "2". This method is appropriate for a case where there is relative room in the channels of the whole communication system 100 or the channels of the base station device 12 that is the movement destination.

In a second method for determining the priority levels, for the movement destination candidates, the priority level is set to be high in order of smallest to largest position registration number of the group 1. For example, the generator 32 sets the priority level of the third base station device 12*c* in which the position registration number of the group 1 is the smallest as "1", and sets the priority level of the first base station device 12*a* in which the position registration number of the group 1 is the second smallest as "2". This method is appropriate for a case where there is small room in the channels of the whole communication system 100 or the channels of the base station device 12 that is the movement destination.

In a third method for determining the priority levels, for the movement destination candidates, the priority level is set according to the position registration number of each base station device 12. For example, it is assumed that, as movement destination candidates, the position registration number of the first base station device 12*a* is "50", and the position registration number of the third base station device 12*c* is "20". The generator 32 sets the priority level of the third base station device 12*c* of which the position registration number is the smallest as "1" and sets the priority level of the first base station device 12*a* of which the position registration number is the second smallest as "2".

In addition, other than the first method to the third method for determining priority levels described above, the priority levels may be determined using a predetermined rule set for each group. For example, a case will be considered in which the group 1 uses three base station devices including the first base station device 12*a*, the second base station device 12*b*, and the third base station device 12*c*, and the number of the used base station devices is desired to be decreased to two. In such a case, the generator 32 may set a rule such as "for the group 1, the first base station device 12*a* is set to a priority level of "1", and the second base station device 12*b* is set to a priority level of "2"" and generate a channel direction command based on the rule. In this way, the generator 32 generates the information relating to priority levels of channels such that the number of base station devices 12 in which the group specified by the specifier 142 is registered is decreased.

In addition, in the example described above, while the allowed value illustrated in FIG. 25 is "2", it is apparent that any other value may be used. For example, in a case where the allowed value is "1", in the database illustrated in FIG. 27, in addition to the second base station device 12*b*, the third base station device 12*c* of which the position registration number is the second smallest is specified as the base station device 12 that is the movement source. Then, a channel direction command used for changing the registration to registration into the first base station device 12*a* is transmitted to the terminal device 10 of the group 1 registered in the second base station device 12*b*, and a channel direction command used for changing the registration to registration into the first base station device 12*a* is transmitted to the terminal device 10 of the group 1 registered in the third base station device 12*c*. By performing such a process, in a case where all the terminal devices 10 of the group 1 are located in the first communicable area 20*a*, the number of the used base station device 12 of the group 1 can be configured as one.

According to this embodiment, since the information relating to priority levels of channels is generated such that the number of base station devices in which the group is registered is decreased, the number of channels used by the whole communication system can be decreased. In addition, since the number of channels used by the whole communication system is decreased, the probability of the occurrence of a channel shortage can decrease. Furthermore, since the information relating to priority levels of channels is generated such that the number of base station devices in which the group is registered is decreased, the channels can be efficiently used.

Embodiment 13

Next, Embodiment 13 will be described. Embodiment 13, similarly to the embodiments described until now, relates to a communication system in which a plurality of base station devices are disposed, and a terminal device is connected to one thereof and performs radio communication. In addition, a management device generates a channel direction command for a specified group and transmits the generated channel direction command to terminal devices included in a specified group through a base station device. In the description presented until now, a channel direction command for a specified group is generated. On the other hand, in Embodiment 13, a channel direction command for terminal devices present in a designated area among the specified group is generated. The communication system 100, the management device 16, and the terminal device 10 according to Embodiment 13 are of types similar to those illustrated in FIGS. 1, 19, and 5. Here, differences from the description presented until now will be focused in the description.

In a group call, in a case where many terminal devices 10 use one channel, the number of the used channel is the smallest. Accordingly, by collecting terminal devices 10 included in a same group scattering within the communication system 100 into a base station device 12 in which many terminal devices 10 included in the same group are registered as possibly as can, the number of used channels by the whole communication system 100 is decreased.

Figure 26:
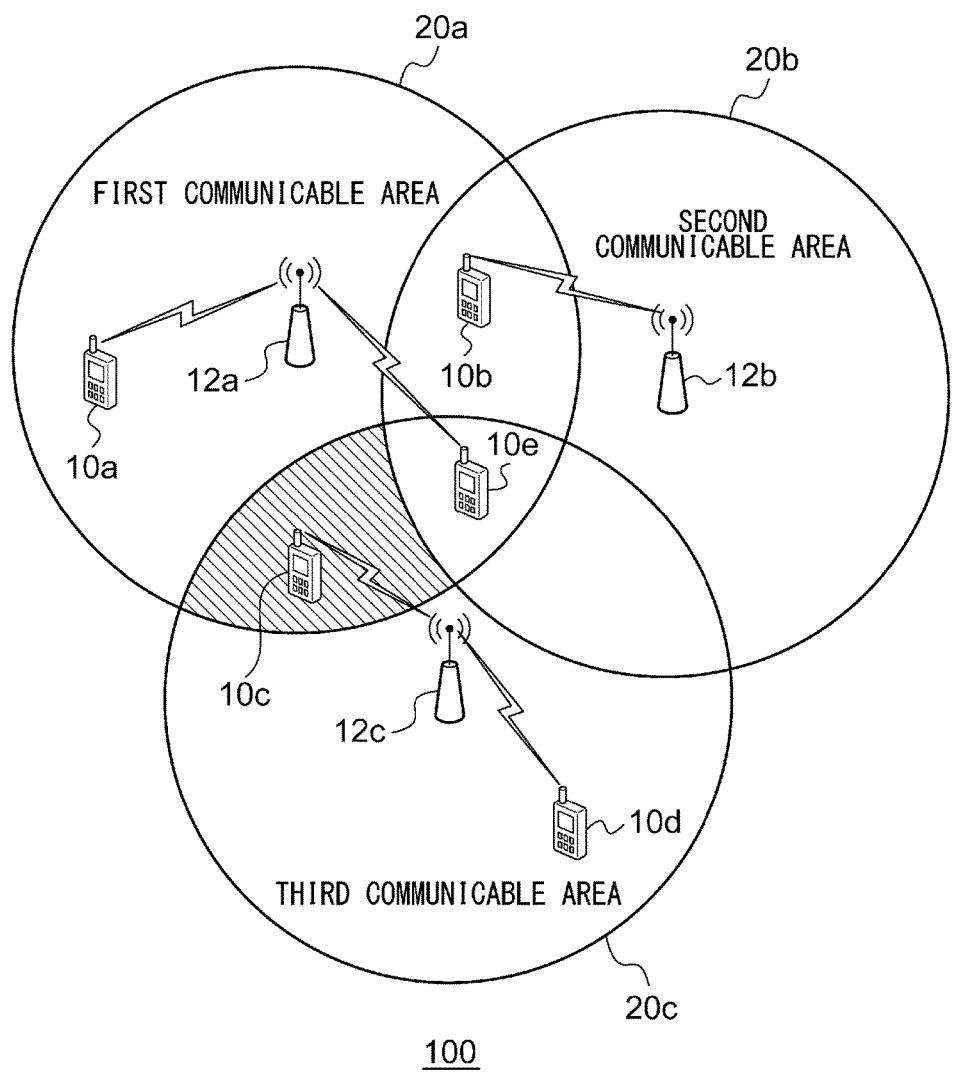
FIG. 26 is a diagram that illustrates an example of a group call performed by a communication system according to Embodiment 13.
Figure 28:
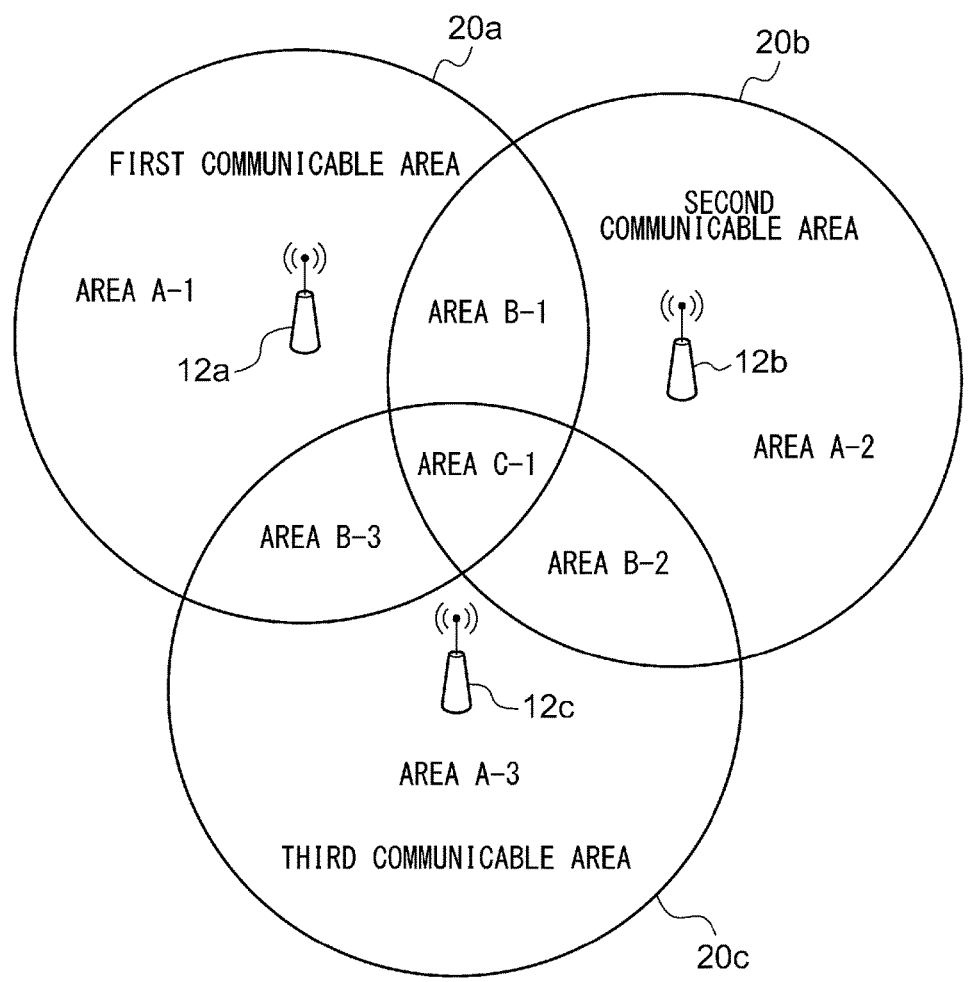
FIG. 28 is a diagram that illustrates the configuration of an area defined in a management device according to Embodiment 13.

FIG. 26 illustrates an example of a group call performed by the communication system 100. Here, a first terminal device 10*a*, a second terminal device 10*b*, a third terminal device 10*c*, a fourth terminal device 10*d*, and a fifth terminal device 10*e* are included in a same group (group 1). In this embodiment, the management device 16 maintains a map of each area as illustrated in FIG. 28. FIG. 28 illustrates the configuration of areas defined in the management device 16. In the first communicable area 20*a* to the third communicable area 20*c*, areas such as an "area A-1" and the like are defined. In other words, the areas can be regarded as subdivided areas of the communicable area 20.

FIG. 29 illustrates the data structure of another database stored in the storage 34. This is a diagram that illustrates channels used by terminal devices 10 located in the areas illustrated in FIG. 28 in an initial state. For example, while a channel A is used in the "area A-1", a channel B is used in an "area A-2". The database representing a correspondence relation between each area and each channel may be different for each group or be common to all the groups. For this reason, in the initial state, as illustrated in FIG. 26, the first terminal device 10*a* (area A-1) is connected to the first base station device 12*a*, the second terminal device 10*b* (area A-2) is connected to the second base station device 12*b*, the third terminal device 10*c* (area B-3) is connected to the third base station device 12*c*, the fourth terminal device 10*d* (area A-3) is connected to the third base station device 12*c*, and the fifth terminal device 10*e* (area C-1) is connected to the first base station device 12*a*. In addition the first terminal device 10*a*, the second terminal device 10*b*, the third terminal device 10c, and the fifth terminal device 10e are located in the first communicable area 20a.

The storage 34 illustrated in FIG. 19, in addition to the database illustrated in FIG. 25, also stores a database illustrated in FIG. 27. FIG. 27 illustrates the data structure of the database stored in the storage 34. This illustrates the position registration number of the group 1 in each base station device 12.

In this embodiment, it is assumed that the allowed value for the number of the used base station device of group 1 is "1". For this reason, terminal devices 10 of the group scattering in three base station devices 12 are attempted to be collected into one base station device 12. By using the method described in Embodiment 12, in the case illustrated in FIG. 27, the generator 32 generates channel direction commands to the terminal devices 10 using the second base station device 12b and the third base station device 12c so as to use the first base station device 12a that is a base station device 12 in which the position registration number of the group 1 is the largest. In addition, the transmitter 38 transmits the channel direction commands to the terminal devices 10 using the second base station device 12b and the third base station device 12c. Thus, four terminal devices 10 (the first terminal device 10a, the second terminal device 10b, the third terminal device 10c, and the fifth terminal device 10e) located in the first communicable area 20a use the first base station device 12a as a result of the channel scan process. However, the fourth terminal device 10d is not located in the first communicable area 20a and thus continuously uses the third base station device 12c. As a result, a state in which the group 1 uses three channels is changed to a state in which the group 1 uses two channels. In such a series of processes, it can be stated that the fourth terminal device 10d performs a useless channel scan operation.

Figure 30:
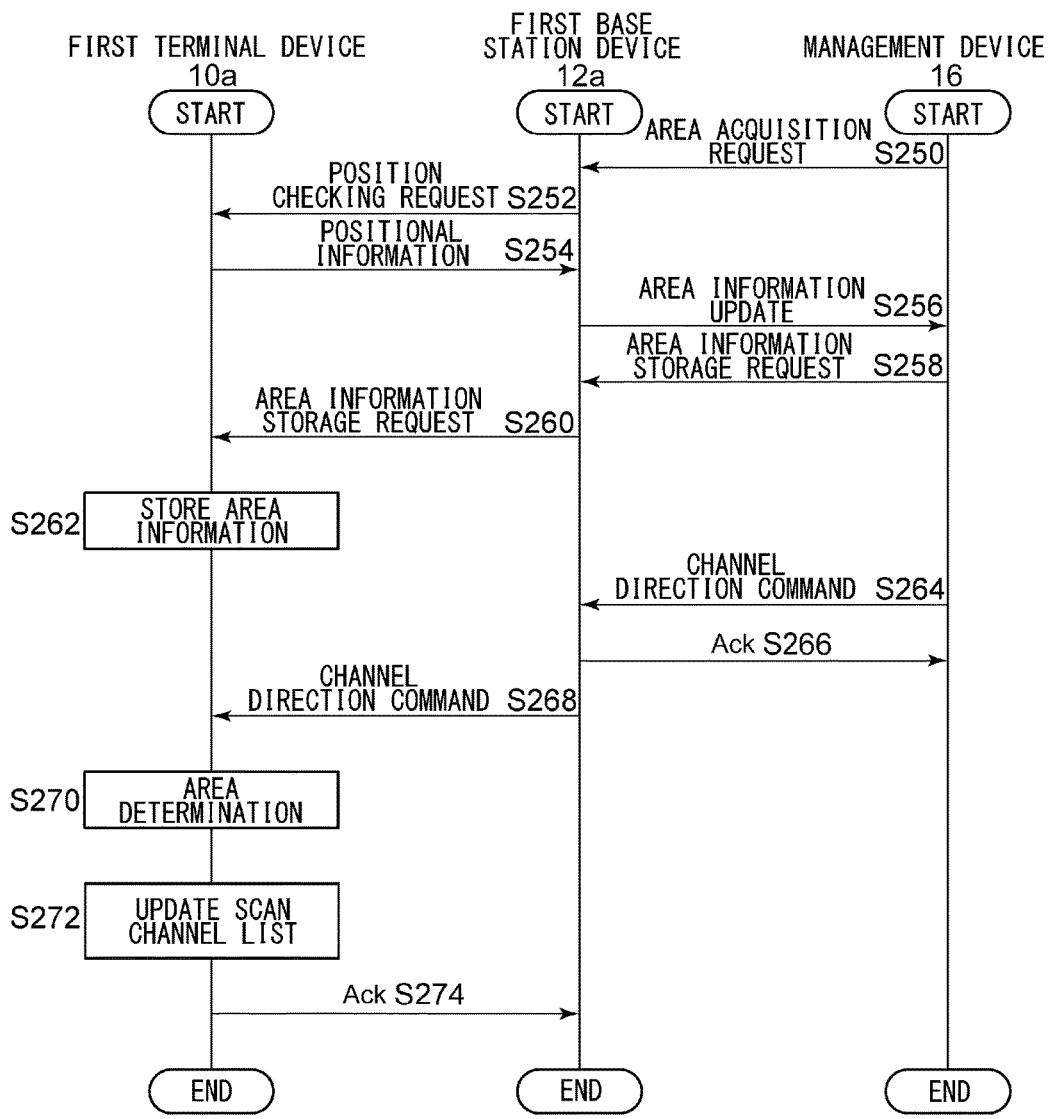
FIG. 30 is a sequence diagram that illustrates the sequence of updating a scan channel list in the communication system according to Embodiment 13.

In this embodiment, the management device 16 checks an area in which each terminal device 10 is located and generates a channel direction command designating a group and an area. FIG. 30 is a sequence diagram that illustrates the sequence of updating a scan channel list in the communication system 100. The management device 16 transmits an area acquisition request to the first base station device 12a (S250), and the first base station device 12a transmits a position checking request to the first terminal device 10a (S252).

The first terminal device 10a transmits positional information to the first base station device 12a (S254), and the first base station device 12a transmits an area information update to the management device 16 (S256). By receiving the area information update, the management device 16 acquires positional information (latitude, longitude, and the like) from the terminal device 10 and determines the area of the terminal device 10. In addition, the management device 16 maintains information of the determined area. Furthermore, instead of transmitting the area acquisition request from the management device 16, the terminal device 10 may regularly transmit the positional information to the base station device 12. In order to store information relating to an area in which the first terminal device 10a is present in the first terminal device 10a, the management device 16 transmits an area information storage request to the first base station device 12a (S258), and the first base station device 12a transmits the area information storage request to the first terminal device 10a (S260). Here, the information relating to an area in which the first terminal device 10a is present corresponds to maintained area information (for example, information of the area "B-3"). The first terminal device 10a stores the area information (S262).

The management device 16 transmits a channel direction command to the first base station device 12a (S264), and the first base station device 12a transmits Ack to the management device 16 (S266). The first base station device 12a transmits the channel direction command to the first terminal device 10a (S268). The first terminal device 10a determines whether or not the stored area and the area included in the channel direction command coincide with each other (S270) and updates the scan channel list in the case of coincidence (S272). The first terminal device 10a transmits Ack to the first base station device 12a (S274).

In addition, the determination of the area of the terminal device 10 in the management device 16 is performed by the specifier 142. In other words, the specifier 142, based on the positional information transmitted from the terminal device 10 and the map illustrated in FIG. 28, also specifies an area in which the terminal device 10 belonging to the group specified by the specifier 142 is located.

An example of the channel direction command generated by the generator 32 will be described with reference to FIGS. 31A and 31B. FIGS. 31A and 31B illustrate the formats of signals transmitted and received in the communication system 100. As illustrated in FIG. 31A, in addition to a "target group" of the channel direction command, a "target area" is designated. In other words, the generator 32 generates information relating to priority levels of channels desired to be used by a terminal device 10 that belongs to the group specified by the specifier 142 and is located in an area specified by the specifier 142. When the channel direction command is generated, the management device 16 considers a relation among a communicable area 20, a target area, and a designated priority channel. For example, in a case where the target area is one of "A-1", "B-1", "C-1", and "B-3" included in the first communicable area 20a, a channel direction command designating the channel A used by the first base station device 12a as a priority channel is generated. On the other hand, in a case where the target area is one of the other areas, a channel direction command designating the channel A as a priority channel is not generated.

The terminal device 10 that has received such a channel direction command updates the scan channel list in a case where the terminal is included in the "target group" and is located in the "target area". On the other hand, in a case where the terminal device 10 does not correspond to the "target group" or the "target area", the terminal device 10 does not update the scan channel list. Here, whether or not the terminal device is located in the corresponding area is determined based on whether the target area included in the channel direction command in consideration of the group and the area coincides with the area information that is stored according to the reception of an "area information storage request" message. By performing such a process, the four terminal devices 10 (the first terminal device 10a, the second terminal device 10b, the third terminal device 10c, and the fifth terminal device 10e) located in the first communicable area 20a can be caused to use the first base station device 12a. Meanwhile, since a channel direction command designating the area A-3 in which the fourth terminal device 10d is located is not generated, a problem that the fourth terminal device 10d performs a useless channel scan operation is resolved.

FIG. 31B illustrates a format in a case where the following candidate is added to FIG. 31A. The terminal device 10 may measure reception states of several channels included in the channel direction command and select a channel having a best reception state. Alternatively, the terminal device 10 may scan channels in order of highest to lowest priority level and select a first channel of which the reception sensitivity is larger than or equal to a threshold from among the channels. In practical environments, a case where the reception state changes from time to time may be also considered, and, by causing the terminal device 10 to determine environments that cannot be acquired by the management device 16, movement to an optimal communication environment can be performed.

Until now, according to the sequence illustrated in FIG. 30, while area information (area number) in which the terminal device 10 is located is notified from the base station device 12 to the terminal device 10, and the area information is stored in the terminal device 10, any other method may be used. For example, the management device 16 reports the information of the area map illustrated in FIG. 28 to the terminal device 10 at appropriate timing. As the information of the area map, for example, by approximating each area into one rectangular area or a combination of a plurality of rectangular areas, the coordinates values (latitude and longitude) of vertexes of each rectangular area may be used. The terminal device 10 stores an area number of each area and a combination of coordinate values corresponding to each area in an internal storage in association with each other. When a channel direction command is received, the terminal device 10 may read coordinate values of a rectangular area corresponding to the area number of the target area included in the command and determine whether or not the positional information (latitude and longitude) acquired from an GPS acquirer disposed inside the terminal device 10 is included in any one of the rectangular areas corresponding to the area number.

According to this embodiment, in addition to the specified group, a specified area is also included in the channel direction command, and accordingly, the area can be also designated in addition to the group. In addition, since the area is designated in addition to the group, a target to which the information relating to priority levels of channels is notified can be restricted. For this reason, it can be prevented that a terminal device located at a place at which the used base station device cannot be changed performs a useless channel scan operation. In addition, for example, in a case where an unexpected disaster or the like occurs in an area, by setting the area as a target area and generating a channel direction command using groups other than a group used by disaster restoration-related staffs as a target group, groups not relating to the restoration of the disaster or the like can be easily moved to another base station device of which the communication environment is not good more or less. For this reason, a satisfactory communication environment can be provided for restoration-related staffs of the disaster or the like who are in need of communication most. In this way, depending on the situation from time to time, a group having a high degree of emergency or necessity of communication is prioritized, and the distribution of used channels of the whole system can be optimized. In addition, since a target to which the information relating to priority levels of channels is notified can be delicately controlled, not only the channels of the communication system but also the resources of the whole system including the operations of the terminal devices can be efficiently used.

Embodiment 14

Next, Embodiment 14 will be described. Embodiment 14, similarly to the embodiments described until now, relates to a communication system in which a plurality of base station devices are disposed, and a terminal device is connected to one thereof and performs radio communication. The management device described until now generates a channel direction command for a specified group and transmits the generated channel direction command to terminal devices included in the specified group through a base station device. On the other hand, in Embodiment 14, a channel direction command is generated for a specified terminal device 10, and the generated channel direction command is transmitted to the terminal device through a base station device. Instead of the channel direction command for a specific group, since a channel direction command for a specific terminal device 10 is used, channels used by the whole communication system 100 can be further delicately controlled. The communication system 100, the management device 16, and the terminal device 10 according to Embodiment 14 are of types similar to those illustrated in FIGS. 1, 19, and 5. Here, differences from the description presented until now will be focused in the description. In this embodiment, similarly to the example used in Embodiment 13, an example will be described in which terminal devices 10 of the group 1 are moved to the first base station device 12a as possibly as can.

In the sequence illustrated in FIG. 30, the management device 16, after receiving an area information update from the terminal device 10, maintains area information of an area in which the terminal device 10 is located in the storage 34. FIG. 32 illustrates the data structure of a database stored in the storage 34. As illustrated in the drawing, for example, a terminal device number used for identifying the terminal device 10 included in the group 1 and the area information are stored in association with each other. In addition, instead of the area information, latitude and longitude may be stored.

The generator 32 illustrated in FIG. 19 includes not a target group but a terminal device number in the channel direction command. In other words, the generator 32 includes a terminal device number used for identifying a specific terminal device 10 belonging to a group specified by the specifier 142 in the channel direction command. FIGS. 33A and 33B illustrate examples of the channel direction command that is transmitted to a first terminal device 10a located in a first communicable area 20a. In the case illustrated in FIG. 33A, compared to the case illustrated in FIG. 21A, instead of the "target group", a "terminal device number" is included. FIG. 33B illustrates a format of a case where a next candidate is added to the case illustrated in FIG. 33A. A channel direction command similar to that illustrated in FIG. 33 is transmitted to another terminal device 10 located in the first communicable area 20a although the terminal device number is different from that illustrated in FIG. 33.

The terminal device 10 that has received such a channel direction command may measure reception states of several channels included in the channel direction command and select a channel having a best reception state. Alternatively, the terminal device 10 may scan channels in order of highest to lowest priority level and select a first channel of which the reception sensitivity is larger than or equal to a threshold from among the channels. In practical environments, a case where the reception state changes from time to time may be also considered, and, by causing the terminal device 10 to determine environments that cannot be acquired by the management device 16, movement to an optimal communication environment can be performed.

In the example illustrated in FIG. 26, the management device 16 determines that the fourth terminal device 10d is present at a position at which a channel of the first base station device 12a is difficult to use and does not transmit a channel direction command illustrated in FIGS. 33A and 33B to the fourth terminal device 10d. For this reason, the fourth terminal device 10d does not change the base station device 12.

According to the method described in Embodiment 13, a same channel direction command is uniformly applied to all the terminal devices 10 of a same group that are located in a same area. On the other hand, according to the method of this embodiment, mutually-different channel direction commands can be applied to terminal devices 10 of a same group that are located in a same area. For example, a situation will be considered in which a plurality of terminal devices 10 of the group 1 are present in the area B-3, all the terminal devices 10 are connected to the third base station device 12c, the number of terminal devices 10 connected to the third base station device 12c including the other groups is increased, and accordingly, it is difficult to establish communication with the third base station device 12c. Similarly to Embodiment 13, while all the terminal devices 10 of the group 1 that are located in the area B-3 may be moved to the first base station device 12a with which communication can be relatively easily established, only a part of the terminal devices 10 can be moved to the first base station device 12a. For example, among the group 1, a terminal device 10 used by a user (a supervisor, a commander, or the like) having a significant role is specified, and a channel direction command for moving the terminal device 10 to the first base station device 12a may be applied. In such a case, in the storage 34 of the management device 16, a database in which a terminal device number (an identifier of a terminal device) and the degree of significance of a user using each terminal device 10 are associated with each other is stored. By performing such a process, also in a situation in which the channels of the whole system are insufficient, channels can be used by the terminal device 10 so as to decrease the influence on the direction command system of the group as possibly as can.

Alternatively, a channel direction command may be generated according to the transmitting capability/receiving capability of the terminal device 10. For example, it is assumed that a plurality of terminal devices 10 of the group 1 are present in the area B-3, all the terminal devices 10 are connected to the third base station device 12c, and the intensity of the electric field of the third base station device 12c is stronger than the intensity of the electric field of the first base station device 12a in the area B-3. In addition, it is assumed that, for electric waves transmitted from the area B-3, the receiving capability of the third base station device 12c is higher than the receiving capability of the first base station device 12a. In addition, it is assumed that the terminal devices 10 of the group 1 are not of one type, but a plurality of models having mutually-different receiving capabilities (lowest reception sensitivity or the like) or mutually-different transmitting capabilities (transmission output value or the like) are present together. In such a situation, from the viewpoint of optimization of the whole system, in a case where some of the terminal devices 10 of the group 1 located in the area B-3 need to be moved to the first base station device 12a, a channel direction command for selecting terminal devices 10 having relatively high receiving capabilities from among such terminal devices 10 and moving the selected terminal devices to the first base station device 12a may be applied. Similarly, a channel direction command for moving terminal devices 10 having relatively high transmitting capabilities to the first base station device 12a may be applied.

Alternatively, the management device 16 may collect information (radio wave conditions) relating to the electric wave of the base station device 12 that can be received by each terminal device 10 through the base station device 12 and generate a channel direction command in accordance with the collected information. Similarly to the example described above, in a case where some of the terminal devices 10 of the group 1 that are located in the area B-3 are changed to use the first base station device 12a, a channel direction command for specifying terminal devices 10 of which the signal intensity of the electric wave received from the first base station device 12a is higher than a predetermined value and causing the specified terminal devices 10 to use the first base station device 12a may be applied. In addition, a channel direction command for specifying terminal devices 10 of a predetermined number in order of highest to lowest signal intensity of the electric wave received from the first base station device 12a among the group 1 located in the area B-3 and causing the specified terminal devices 10 to use the first base station device 12a may be applied. Furthermore, a channel direction command for calculating a difference between an actually-measured signal intensity and the lowest reception sensitivity of the terminal device 10 or a magnification of an actually-measured signal intensity with respect to the lowest reception sensitivity and causing the terminal device 10 of which the value is larger to use the first base station device 12a with a priority may be applied.

In addition, by combining two or more of the position of the terminal device 10 described above, a user using the terminal device 10, the receiving capability of the terminal device 10, the transmitting capability of the terminal device 10, the radio wave conditions at the terminal device 10, and the like, a terminal device 10 that is a target for the channel direction command may be comprehensively specified. For example, an index may be calculated using an arbitrary combination thereof, and the terminal device 10 that is a target for the channel direction command may be specified based on the magnitude of the index.

According to this embodiment, since the identification information used for identifying a terminal device belonging to a specified group is included in the channel direction command, the terminal device can be designated. In addition, since the terminal device is designated, the target to which the information relating to priority levels of channels is notified can be restricted. For example, the information relating to priority levels of channels may be notified only to terminal devices that are predicted to have no adverse influence on the easiness in the establishment of communication even in a case where the used base station device is changed. In addition, a terminal device located at a place at which the used base station device cannot be changed and terminal devices not having a receiving capability/transmitting capability that is necessary in accordance with a change in the base station device are specified and are not set as targets to which the information relating to the priority level of the channel is notified, and accordingly, a useless channel scan operation of a terminal device can be prevented. In addition, since the targets to which the information relating to priority levels of channels is notified can be controlled in accordance with the degree of significance (degree of significance in the group) of a user using the terminal device, also in a case where the resources of the whole system are restricted, the resources can be distributed and be used by the terminal device so as not to influence on the direction command system inside the group. For this reason, communication of the group and the operation of the organization can be smoothly performed. In addition, since a target to which the information relating to priority levels of channels is notified can be delicately controlled, not only the channels of the communication system but also the resources of the whole system including the operations of the terminal devices can be efficiently used. Furthermore, since the positional information of the terminal device is managed by the management device, storage of the area information and the area determination process are unnecessary in each terminal device.

Embodiment 15

Next, Embodiment 15 will be described. Embodiment 15, similarly to the embodiments described until now, relates to a communication system in which a plurality of base station devices are disposed, and a terminal device is connected to one thereof and performs radio communication. In addition, a management device generates a channel direction command for the specified group and transmits the generated channel direction command to the terminal device included in the specified group through a base station device. Embodiment 15 corresponds to a modified example of Embodiment 11. In Embodiment 11, the channel direction command is generated according to the position registration number of each group for each base station device. On the other hand, in Embodiment 15, the channel direction command is generated according to a Busy number of each group for each base station device.

The problems in such Embodiment 15 are as below. In accordance with an increase in the position registration number of the terminal device in each base station device or in the whole communication system, the number of terminal devices within the group is increased, and there is a possibility that the call generation probability of each group increases. In addition, in a case where the call generation probability increases, the channels of the base station device are occupied, and, according to a channel shortage of the base station device, the probability of the occurrence of a state (hereinafter, referred to as "Busy") in which a call channel cannot be assigned increases. In the base station device 12 in which Busy actually occurs, a situation is formed in which it is difficult to establish communication. In Embodiment 15, differences from Embodiment 11 will be focused in the description.

The communication system 100 according to Embodiment 15 is similar to that illustrated in FIG. 1. In a case where the position registration request and the group registration request are received, the base station device 12 transmits a use permission including a group call to the terminal device 10. In a case where the position registration request is received from the terminal device 10, the base station device 12 transmits a use permission to the terminal device 10. Accordingly, for example, the first terminal device 10a and the first base station device 12a are connected, and, in the first base station device 12a, a channel set for the group in which the first terminal device 10a is included is used by the first terminal device 10a and the first base station device 12a. Meanwhile, when a call request is received from the terminal device 10, in a case where a channel used by the terminal device 10 for a call is insufficient, the base station device 12 transmits a use non-permission to the terminal device 10. At that time, the base station device 12 counts the channel insufficiency for the group in which the first terminal device 10a is included as the occurrence of Busy. The Busy occurrence number of times (hereinafter, referred to as a "Busy occurrence number") may be maintained by the management device 16. The base station device 12 transmits a Busy occurrence number of each group to the management device 16 through the network 14.

The management device 16 receives the Busy occurrence number of each group from the base station device 12 through the network 14 and maintains the Busy occurrence number of each group for each base station device 12. The Busy occurrence number of each group is changed according to the movement of the terminal device 10 using each base station device 12. In addition, the management device 16 maintains an allowed value for the Busy occurrence number of each group for each base station device 12 and maintains information of neighboring base station devices 12 and information of channels for each base station device 12.

The management device 16 compares the Busy occurrence number and the allowed value for each group for each base station device 12 and specifies a group of which the Busy occurrence number is larger than the allowed value in one base station device 12. In addition, the management device 16 selects a channel of another base station device 12 of which the Busy occurrence number of the specified group is the smallest among other base station devices 12 neighboring to the one base station device 12. Furthermore, the management device 16 generates a channel direction command used for changing the channel of the terminal device 10 included in the group specified by the one base station device 12. The one base station device 12 transmits the channel direction command to the specified group. The terminal device 10 that has received the channel direction command performs a channel scan in response to the channel direction command.

The management device 16 according to Embodiment 15 is similar to that illustrated in FIG. 19. The receiver 36 receives a Busy occurrence number of each group from each base station device 12. The receiver 36 stores the Busy occurrence number of each group in the storage 34. The storage 34 stores a database illustrated in FIG. 34 instead of that illustrated in FIG. 20A. In addition, the storage 34 also stores the databases illustrated in FIGS. 20B and 20C. FIG. 34 illustrates the data structure of the database stored in the storage 34 according to Embodiment 15. FIG. 34 is a database that represents a group number in each base station device 12, a Busy occurrence number of each group per unit time (for example, one hour) for each base station device 12, and the allowed value. The group number and the Busy occurrence number of each group are written by the receiver 36. Meanwhile, the allowed value corresponds to an upper limit threshold of the Busy occurrence of each group per unit time. In addition, in the database illustrated in FIG. 34, information of the group registration number of each base station device 12 is also recorded. The description will be continued by referring back to FIG. 19.

The acquirer 40, from the database illustrated in FIG. 34, acquires a group number and a Busy occurrence number of each group for each base station device 12. The specifier 142 compares a Busy occurrence number and an allowed value for each group acquired by the acquirer 40 and specifies a group number and a base station device 12 corresponding to a Busy occurrence number exceeding the allowed value. In other words, the specifier 142 specifies a group in accordance with the Busy occurrence number of each group registered in the base station device 12 communicating with the terminal device 10 by using a channel. For example, in the case illustrated in FIG. 34, the Busy occurrence number "5" of a "group 1" of the first base station device 12a and the Busy occurrence number "3" of a "group 2" of the second base station device 12b exceed the allowed value "2". For this reason, the specifier 142 specifies the "group 1" of the first base station device 12a and the "group 2" of the second base station device 12b.

The generator 32 determines priority levels of the channels for each group specified by the specifier 142. For example, the generator 32, for other base station devices 12 of which the Busy occurrence numbers of the specified group are smaller than or equal to the allowed value, compares the Busy occurrence numbers of the group with each other and sets the priority levels to be higher in order of smallest to largest Busy occurrence number. As described above, in the case illustrated in FIG. 34, the group 1 of the first base station device 12a is specified. In such a case, the generator 32 compares the Busy occurrence number of the group 1 in the second base station device 12b with the Busy occurrence number of the group 1 in the third base station device 12c. Since the Busy occurrence number of the second base station device 12b is "0", and the Busy occurrence number of the third base station device 12c is "1", the generator 32 sets the priority level of the second base station device 12b as "1" that is the highest. In addition, the generator 32 sets the priority level of the third base station device 12c as "2". In addition, in the case illustrated in FIG. 34, the group 2 of the second base station device 12b is specified. In such a case, the generator 32 compares the Busy occurrence numbers of the group 2 in the first base station device 12a and the third base station device 12c and sets the priority level of the third base station device 12c as "1" and sets the priority level of the first base station device 12a as "2".

In this way, the generator 32 generates information relating to priority levels of channels desired to be used by the terminal device 10 belonging to the group specified by the specifier 142. At that time, the generator 32 sets the priority level of a channel used by a base station device 12 other than a base station device 12 (a base station device 12 of which the Busy occurrence number of the group exceeds the allowed value) that is a processing target to be high. Particularly, the generator 32 sets the priority level of a channel used by another base station device 12 to be higher as the another base station device 12 has a smaller number of the terminal devices 10 belonging to the group specified by the specifier 142. In addition, the generator 32 includes identification information used for identifying the group specified by the specifier 142 in the channel direction command. Here, the Busy occurrence number is also called a busy number and corresponds to the number of times of not establishing communication in each base station device 12.

In the description until now, while the priority level is set to be higher as a base station device 12 has a smaller Busy occurrence number of the group that is a processing target, any other method may be used. For example, an example will be described in which the generator 32 determines a priority level in accordance with the Busy occurrence number of each base station device 12 by using the database illustrated in FIG. 34. First, the second base station device 12b and the third base station device 12c of which the Busy occurrence numbers are smaller than or equal to the allowed value for the group 1 are specified as base station devices 12 that are processing targets. A sum of the Busy occurrence numbers of the second base station device 12b is "0+3+2+1+1=7", and a sum of the Busy occurrence numbers of the third base station device 12c is "1+1+1+1=4". For this reason, the priority level of the third base station device 12c of which the Busy occurrence number is the smallest is set as "1", and the priority level of the second base station device 12b of which the Busy occurrence number is second smallest is set as "2". In other words, as another base station device 12 has a smaller number of the Busy number of each base station device 12, the generator 32 sets the priority level of a channel used by the another base station device 12 to be higher.

In addition, the priority level may be determined in accordance with the number of groups registered in the base station device 12. In the example illustrated in FIG. 34, the second base station device 12b and the third base station device 12c of which the Busy occurrence numbers are smaller than or equal to the allowed value for the group 1 are specified as base station devices 12 that are processing targets. The number of groups registered in the second base station device 12b is "5", and the number of groups registered in the third base station device 12c is "4". In a communication system performing a group call, in a case where the number of channels included in two base station devices 12 are almost the same, basically, a base station device 12 having a larger number of groups has a high possibility of having more Busy occurrence number, and accordingly, the priority level is set to be higher as a base station device 12 has a smaller number of groups. In addition, the registration group number per one channel of the base station device 12 is calculated, and the priority level may be set to be higher as the base station device 12 has a smaller value thereof. In other words, the generator 32 sets the priority level of the channel used by another base station device 12 to be higher as the another base station device 12 has a smaller number of groups registered in the base station device 12 or a smaller number of groups per one channel.

In addition, according to this embodiment, since the information relating to priority levels of channels is generated by using the Busy occurrence number of each group in each base station device, the accuracy of the information relating to priority levels of channels can be improved. In addition, since the information relating to priority levels of channels is generated by using the Busy occurrence number of each group in each base station device, the process can be simplified. Furthermore, since the information relating to priority levels of channels is generated for a group of which the Busy occurrence number is larger than the allowed value, movement of a group that may cause a channel shortage can be moved to another base station device. In addition, as another base station device has a smaller number of terminal devices belonging to the specified group, the priority of the channels used by the another base station device are set to be higher, and accordingly, the group can be moved to another base station device in which a channel shortage cannot be easily generated. In addition, as another base station device has a smaller number of registered terminals or a smaller number of terminal devices per one channel, the priority level of the channels used by the another base station device is set to be higher, and accordingly, the degree of freedom in the configuration can be improved.

Embodiment 16

Next, Embodiment 16 will be described. Embodiment 16, similarly to the embodiments described until now, relates to a communication system in which a plurality of base station devices are disposed, and a terminal device is connected to one thereof and performs radio communication. In addition, a management device generates a channel direction command for a specified group and transmits the generated channel direction command to terminal devices included in the specified group through a base station device. Embodiment 16 corresponds to a modified example of Embodiment 12. In Embodiment 12, the channel direction command is generated such that the number of base station devices to which the terminal devices of the group specified based on the position registration number are connected is small. On the other hand, in Embodiment 16, a channel direction command is generated such that the number of base station devices to which terminal devices of a group specified based on the average Busy occurrence number per one channel for a unit time is small. In Embodiment 16, differences from Embodiment 12 will be focused in the description.

In order to move a specific group registered in a predetermined base station device 12 to another base station device 12, the generator 32 determines priority levels as below. In the case illustrated in FIG. 25, the number of used base station devices of a group 1 is "3". Here, it is assumed that the group 1 uses three base station devices including the first base station device 12a, the second base station device 12b, and the third base station device 12c, and the Busy occurrence numbers of the group 1 in the base station devices 12 are respectively "20, "5", and "10". In order to decrease the number of used base station devices 12 of the group 1, the generator 32 specifies the first base station device 12a in which the Busy occurrence number of the group 1 is the largest as a base station device 12 that is a movement source. Alternatively, a base station device 12 of which the Busy occurrence number per channel, the Busy occurrence ratio (occurrence probability), the degree of congestion, or the like is the largest may be specified. In addition, the generator 32 selects base station devices 12 other than the second base station device 12b as movement destination candidates. Furthermore, in order to change terminal devices 10 of the group 1 registered in the second base station device 12b to be registered in the first base station device 12a or the third base station device 12c, the generator 32 generates a channel direction command.

As the priority level of a channel scan, for example, for the movement destination candidates, the priority level is set to be high in order of smallest to largest Busy occurrence number of the group 1. For example, the priority level of the second base station device 12b in which the Busy occurrence number of the group 1 is the smallest is set as "1", and the priority level of the third base station device 12c in which the Busy occurrence number of the group 1 is the second smallest is set as "2". In addition, the channel direction command may be transmitted with the priority level of the second base station device 12b set as "1", the priority level of the third base station device 12c set as "2", and the priority level of the first base station device 12a set as "3".

In addition, the priority levels may be determined using a predetermined rule set for each group. For example, a situation will be considered in which the group 1 uses three base station devices including the first base station device 12a, the second base station device 12b, and the third base station device 12c. In such a case, in a case where the number of the base station devices 12 is desired to be decreased to two, a rule such as "for the group 1, the first base station device 12a is set to a priority level of "1", and the second base station device 12b is set to a priority level of "2"" may be set, a channel direction command may be transmitted based on the rule.

A group call has a characteristic in which, in a case where a terminal device 10 belonging to a group originates a call, the call is received by all the other terminal devices 10 belonging to the group. For this reason, terminal devices 10 belonging to one group in a group call system can be regarded as a set of a combination of terminal devices 10 having a high possibility of a communication connection therebetween. The process described in this embodiment can be regarded as a process of specifying a combination (a set of terminal devices 10) of terminal devices 10 having a high possibility of establishment of a communication connection therebetween and arranging the set of the specified terminal devices 10 in a small number of base station devices 12 as possibly as can. In other words, the process of detecting a combination of terminal devices 10 having a high possibility of establishment of a communication connection therebetween and arranging the terminals in a same base station device 12 or in a small number of base station devices 12 as possibly as can is not limited to a group call but may be applied to another form of a call.

According to this embodiment, based on the Busy occurrence number, the information relating to priority levels of channels is generated such that the number of base station devices in which the group is registered is decreased, and accordingly, the number of channels used by the whole communication system can be decreased. In addition, since the number of channels used by the whole communication system is small, the probability of the occurrence of a channel shortage can be decreased. In addition, since the information relating to priority levels of channels is generated such that the number of base station devices in which the group is registered is decreased, the channels can be efficiently used.

Embodiment 17

Next, Embodiment 17 will be described. Embodiment 17, similarly to the embodiments described until now, relates to a communication system in which a plurality of base station devices are disposed, and a terminal device is connected to one thereof and performs radio communication. In addition, a management device generates a channel direction command for a specified group and transmits the generated channel direction command to terminal devices included in the specified group through a base station device. Embodiment 17 corresponds to a modified example of Embodiment 13. In Embodiment 13, the channel direction command for terminal devices present in a designated area among the specified group is generated. On the other hand, in Embodiment 17, a channel direction command for collecting a specific group registered in a base station device 12 into a base station device of which the Busy occurrence number is small is generated by using the positional information of the terminal device. In Embodiment 17, differences from Embodiment 13 will be focused in the description.

Figure 35:
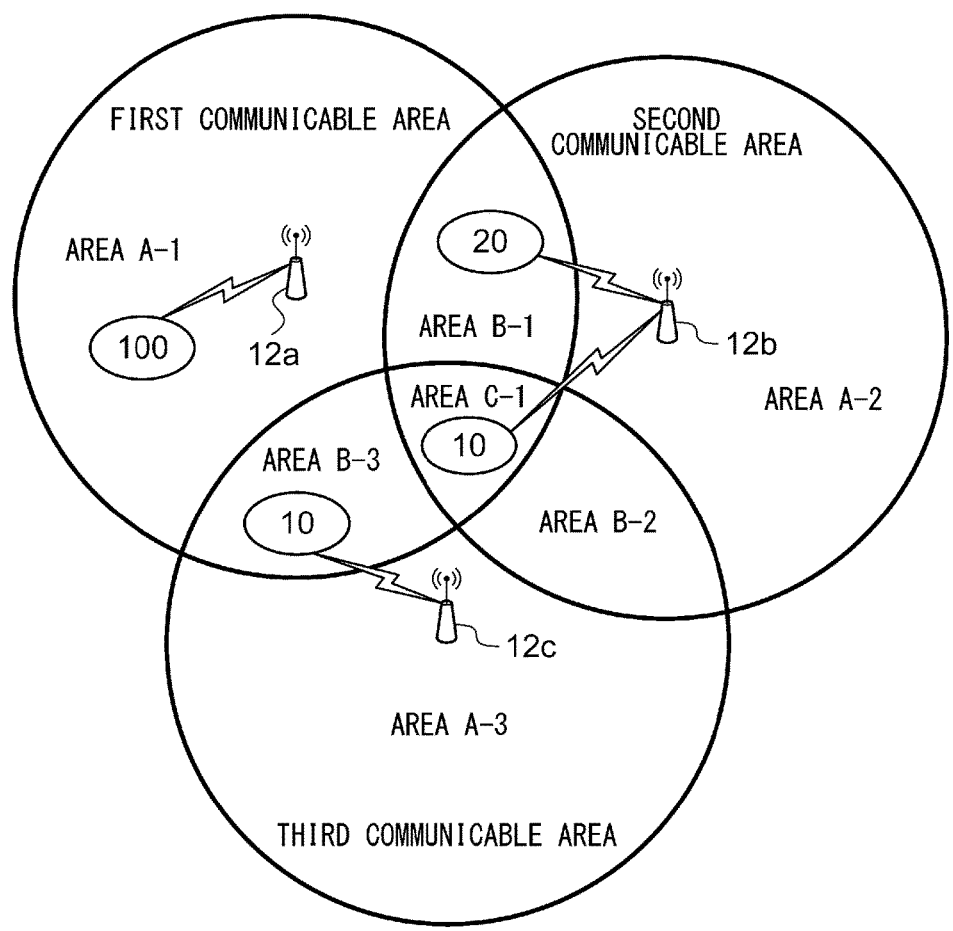
FIG. 35 is a diagram that illustrates an example of a group call performed by a communication system according to Embodiment 17.

As illustrated in FIG. 35, it is assumed that areas A-1 to A-3, B-1 to B-3, and C-1 are set according to an area covered by each base station device 12. FIG. 35 illustrates an example of a group call using the communication system 100 according to Embodiment 17. Here, a state is illustrated in which the terminal device 10 of the group 1 uses the first base station device 12a, the second base station device 12b, and the third base station device 12c. In the drawing, a number enclosed by a circle of each area represents the number of terminal devices 10 of the group 1 located in the area. 100 terminal devices 10 are located in the area A-1, 20 terminal devices 10 are located in the area B-1, 10 terminal devices 10 are located in the area B-3, and 10 terminal devices 10 are located in the area C-1. Since a relation between the areas and the base station devices 12 are as described above in the initial state, 100 terminal devices are registered in the first base station device 12a, 30 terminal devices are registered in the second base station device 12b, and 10 terminal devices are registered in the third base station device 12c.

In such a situation, the storage 34 illustrated in FIG. 19 also stores a database illustrated in FIG. 36. FIG. 36 illustrates the data structure of the database stored in the storage 34 according to Embodiment 17. This illustrates the Busy occurrence number of the group 1 in each base station device 12.

As described above, in the management device 16 according to Embodiment 16, the upper limit of the number of used base station devices of the group 1 is "2", and accordingly, the terminal devices 10 of the group 1 scattering in three base station devices 12 are aggregated into higher-rank two base station devices 12 of which the Busy occurrence numbers are small. More specifically, the management device 16 directs the second base station device 12b to transmit a channel direction command in which the first base station device 12a or the third base station device 12c is represented to be used. As a result of the transmission of the channel direction command to the terminal device 10 using the second base station device 12b, a state is formed in which the group 1 uses the first base station device 12a and the third base station device 12c, and a state in which two channels are used is formed from the state in which three channels are used. In this embodiment, the priority levels of the movement destination candidates are determined in consideration of not only the Busy number but also the position registration number. More specifically, the management device 16 determines whether or not the position registration number of the group registered in the base station device 12 satisfies a predetermined condition (for example, 15 terminal devices or less) and, in a case where the predetermined condition is satisfied, determines the priority levels of a channel scan using a method different from that according to Embodiment 16. In this way, the number of the used base station devices 12 of the group can be decreased to be less than that according to the method of Embodiment 16. In other words, the number of used resources of the radio system can be further decreased.

Figure 37:
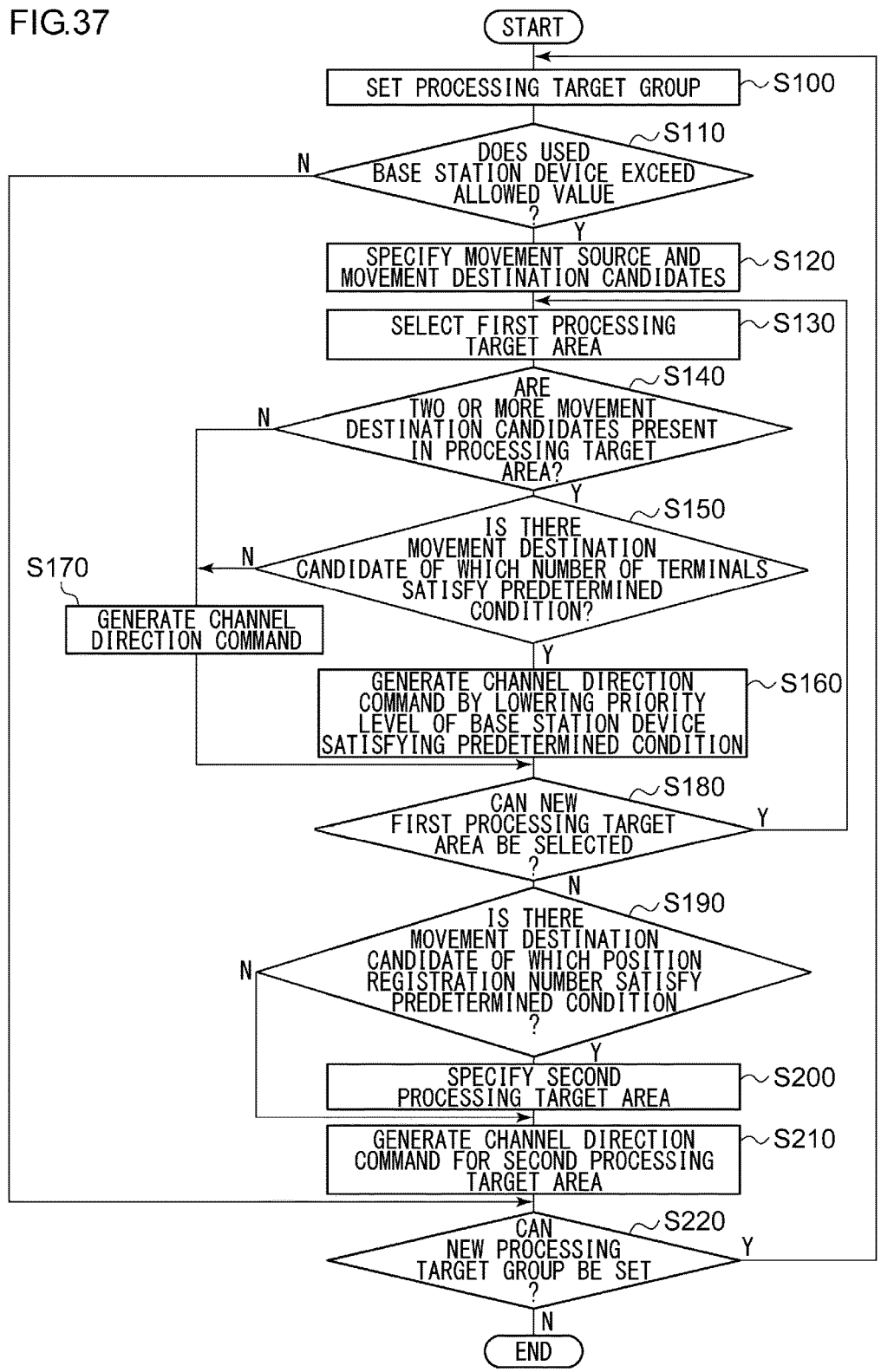
FIG. 37 is a flowchart that illustrates the sequence of generating a channel direction command performed by a management device according to Embodiment 17.

Next, a channel direction command generating process performed by the management device 16 will be described with reference to a flowchart illustrated in FIG. 37. FIG. 37 is a flowchart that illustrates the sequence of generating a channel direction command performed by the management device 16 according to Embodiment 17. First, in step S100, the specifier 142 sets a group that is a processing target. Among all the groups using the communication system 100, sequentially, one group may be selected and set as a processing target group. Next, in step S110, the generator 32 determines whether or not the number of base station devices used by the processing target group exceeds the allowed value. In a case where the number of the base station devices 12 exceeds the allowed value, the process proceeds to step S120. On the other hand, in a case where the number of the base station devices 12 does not exceed the allowed value, the process proceeds to step S220. In the example illustrated in FIG. 25, since the number "3" of the used base station devices 12 of the group 1 exceeds the allowed value "2", in a case where the processing target group is the group 1, the process proceeds to step S120.

In step S120, among the base station devices 12 used by the processing target group, a base station device 12 that is a movement source and base station devices 12 that are movement destination candidates are specified. As described above, a base station device 12 of which the Busy occurrence number, the Busy occurrence per channel, or the like is the largest may be selected. In a case where the determination is made based on the Busy occurrence number, in the example illustrated in FIG. 36, the base station device 12 that is the movement source is the second base station device 12b. In addition, the base station device 12 that is the movement destination candidates are the first base station device 12a and the third base station device 12c. In step S130, from the area corresponding to the base station device 12 that is the movement source, one processing target area (first processing target area) is selected. In the case illustrated in FIG. 35, areas corresponding to the second base station device 12b are an area A-2, an area B-1, an area B-2, and an area C-1. Among these, sequentially, one area is selected at one time.

In step S140, in the processing target area, it is determined whether or not two or more base station devices 12 can be used out of the base station devices 12 that are the movement destination candidates. In a case where two or more base station devices that are the movement destination candidates can be used, the process proceeds to step S150. Otherwise, the process proceeds to step S170. In the area C-1 in which the third terminal device 10c is located, both the first base station device 12a and the third base station device 12c can be used. Accordingly, in a case where the processing target area is the area C-1, the process proceeds to step S150. In step S150, it is determined whether or not a base station device 12 of which the position registration number belonging to the processing target group satisfies a predetermined condition is present among the base station devices 12 that are movement destination candidates that can be used in the processing target area. As the predetermined condition, for example, a condition that the position registration number is smaller than or equal to a predetermined number (for example, 15 or less) may be used. In a case where a base station device 12 satisfying the predetermined condition is present, the process proceeds to step S160. On the other hand, in a case where the base station device 12 satisfying the predetermined condition is not present, the process proceeds to step S170. In the example illustrated in FIG. 36, in a case where the position registration number of the group 1 in the third base station device 12c is 10, and the predetermined condition is "15 or less", the predetermined condition is satisfied, and accordingly, the process proceeds to step S160.

In step S160, the priority of the channel corresponding to the base station device 12 satisfying the predetermined condition in step S150 is lowered more than that of the case of Embodiment 16, and a channel direction command is generated for each area. Described more specifically, in the generation of a channel direction command for the area C-1, in a case where the method according to Embodiment 16 is used, out of the two movement destination candidates, the priority level of the third base station device 12c of which the busy number is smaller is higher than the priority level of the first base station device 12a. On the other hand, in this embodiment, the priority level of the base station device 12 satisfying the predetermined condition in step S150 is lowered to be lower than the priority level of the base station device 12 not satisfying the predetermined condition. Since the third base station device 12c satisfies the predetermined condition, and the first base station device 12a does not satisfy the predetermined condition, the priority level of the first base station device 12a is higher than the priority level of the third base station device 12c. An example of such a channel direction command is illustrated in FIGS. 38A and 38B. FIGS. 38A and 38B illustrate signals transmitted and received in the communication system 100 according to Embodiment 17. By performing such a process, the terminal device 10 that is located in the area C-1 and has the position registered in the second base station device 12b can be moved to the first base station device 12a. In addition, in the case illustrated in FIG. 38B, a priority channel that is a next candidate is added to the channel direction command. The process proceeds from step S160 illustrated in FIG. 37 to step S180.

In step S170, similarly to Embodiment 16, a channel direction command is generated for each area. For the area A-2, the area B-1, and the area B-2, the process of step S170 is performed, and, similarly to Embodiment 16, the channel direction command is generated. The process proceeds from step S170 to step S180. In step S180, it is determined whether or not a new (unprocessed) processing target area can be selected. In a case where the new processing target area can be selected, the process is returned to step S130, and the process is repeated. On the other hand, in a case where a new processing target area cannot be selected, the process proceeds to step S190. In step S190, it is determined whether or not a base station device 12 of which the position registration number belonging to the processing target group satisfies a predetermined condition is present out of the base station devices 12 that are movement destination candidates specified in step S120. As the predetermined condition, a same condition as that used in step S150 may be used. In a case where the base station device 12 satisfying the predetermined condition is present, the process proceeds to step S200. On the other hand, in a case where such a base station device 12 is not present, the process proceeds to step S210. In the example illustrated in FIG. 36, the position registration number of the group 1 of the third base station device 12c is "10" and, in a case where the predetermined condition is "15 or less", the predetermined condition is satisfied, and the process proceeds to step S200.

In step S200, by using a result of the determination of step S190, an area (a second processing target area) that corresponds to the base station device 12 satisfying the predetermined condition but does not corresponds to the base station device 12 that is the movement source and is covered by a plurality of base station devices 12 is specified. Described more specifically, areas corresponding to the third base station device 12c satisfying the predetermined condition are an area A-3, an area B-2, an area B-3, and an area C-1. Among these, the area B-2 and the area C-1 correspond to the base station device 12 that is the movement source and are excluded, and the area A-3 only corresponds to one base station device 12 and is excluded. As a result, the area B-3 is specified. The process proceeds from step S200 to step S210.

In step S210, for the second processing target area specified in step S200, a channel direction command is generated. At this time, the priority level of the base station device 12 satisfying the predetermined condition in step S190 is lowered to be lower than the priority level of the base station device 12 not satisfying the predetermined condition. Since the third base station device 12c satisfies the predetermined condition, and the first base station device 12a does not satisfy the predetermined condition, the priority level of the first base station device 12a is higher than the priority level of the third base station device 12c. Examples of such a channel direction command are illustrated in FIGS. 39A and 39B. FIGS. 39A and 39B illustrate other signals transmitted and received in the communication system 100 according to Embodiment 17. By using these, the terminal device 10 that is located in the area B-3 and has the position registered in the third base station device 12c can be moved to the first base station device 12a. In step S220 illustrated in FIG. 37, it is determined whether or not a new (unprocessed) processing target group can be set. In a case where a new processing target group can be set, the process is returned to step S100, and the process is repeated. On the other hand, in a case where a new processing target group cannot be set, the process ends. The management device 16 generates a channel direction command for each area through the process described above, and the channel direction commands are stored in the storage.

According to this embodiment, by using the positional information of the terminal device, a specific group registered in a certain base station device is aggregated in a base station device 12 of which the Busy occurrence number is small, and accordingly, the occurrence of a channel shortage can be suppressed.

Embodiment 18

Next, Embodiment 18 will be described. Embodiment 18, similarly to the embodiments described until now, relates to a communication system in which a plurality of base station devices are disposed, and a terminal device is connected to one thereof and performs radio communication. Embodiment 18 corresponds to a modified example of Embodiment 14. In Embodiment 14, a channel direction command is generated for a specified terminal device and is transmitted to a terminal device through a base station device. Since the channel direction command for a specific terminal device is used instead of the channel direction command for a specific group, the channels used by the whole communication system can be controlled more delicately. In Embodiment 18, in a process similar to that of Embodiment 14, similarly to Embodiment 17, the priority level of the movement destination candidate is determined in consideration of not only the Busy number but also the position registration number. In other words, Embodiment 18 corresponds to a configuration acquired by combining Embodiment 14 with Embodiment 17.

In addition, by using the positional information of the terminal device 10, a group of which a used base station device 12 is moved may be determined. For example, a group satisfying conditions (1) to (3) represented below is specified, and, for the group, by using the techniques described in Embodiment 16 to Embodiment 18, the process of changing the used base station device 12 can be performed.

(1) Among terminal devices 10 of the whole group, terminal devices 10 of a predetermined number or more or terminal devices 10 of a predetermined ratio or more are registered in a base station device 12 (one or more base station devices 12 that are movement destination candidates) of which the degree of congestion is relatively low.

(2) A terminal device 10 that is located in an area covered by the base station devices 12 that are movement destination candidates and is registered in another base station device 12 is present.

(3) The number of terminal devices 10 located in an area not covered by the base station devices 12 that are movement destination candidates is small (terminal devices 10 of a predetermined number or less or a predetermined ratio or less).

The management device 16 detects a group satisfying the conditions (1) and (2) or a group satisfying the conditions (1) to (3), generates a channel direction command for the group by using the techniques of Embodiment 16 to Embodiment 18, and transmits the generated channel direction command to the base station device 12. By performing such a process, the channel use amount of the whole system can be efficiently decreased. In addition, at that time, instead of using the allowed value illustrated in FIG. 25, for a group in which the number of used base station devices 12 of the group is two or more, the process may be performed by detecting a group satisfying the condition.

In addition, by using the positional information of the terminal device 10, a channel direction command among the following (1) to (3) to be used may be determined.
(1) A channel direction command designating a target group as illustrated in FIGS. 21A and 21B and FIGS. 22A and 22B
(2) A channel direction command designating a target group as illustrated in FIGS. 38A and 38B and FIGS. 39A and 39B and an area
(3) A channel direction command designating a target terminal device 10 as illustrated in FIGS. 33A and 33B For example, a terminal device 10 of a certain group registered in a base station device 12 is located in one area, (1) may be used. In addition, in a case where, among a plurality of terminal devices 10 located in a same area, a channel direction command is desired to be transmitted to some of the terminal devices 10, (3) may be used.

According to this embodiment, since the priority levels of the movement destination candidates are determined in consideration of not only a Busy number but also a position registration number, and a channel direction command for a specific terminal device is used, the resources used by the whole system can be controlled more delicately.

Embodiment 19

Next, Embodiment 19 will be described. Embodiment 19, relates to a communication system in which a plurality of base station devices are disposed, and a terminal device is connected to one thereof and performs radio communication. At that time, the management device generates a channel direction command and transmits the generated channel direction command to at least one of the terminal devices belonging to a given group through a base station device. Particularly, in Embodiment 19, an index representing a degree of congestion of the base station device is calculated, and a channel direction command is generated according to the index. Here, differences from the description presented until now will be focused in the description.

Figure 40:
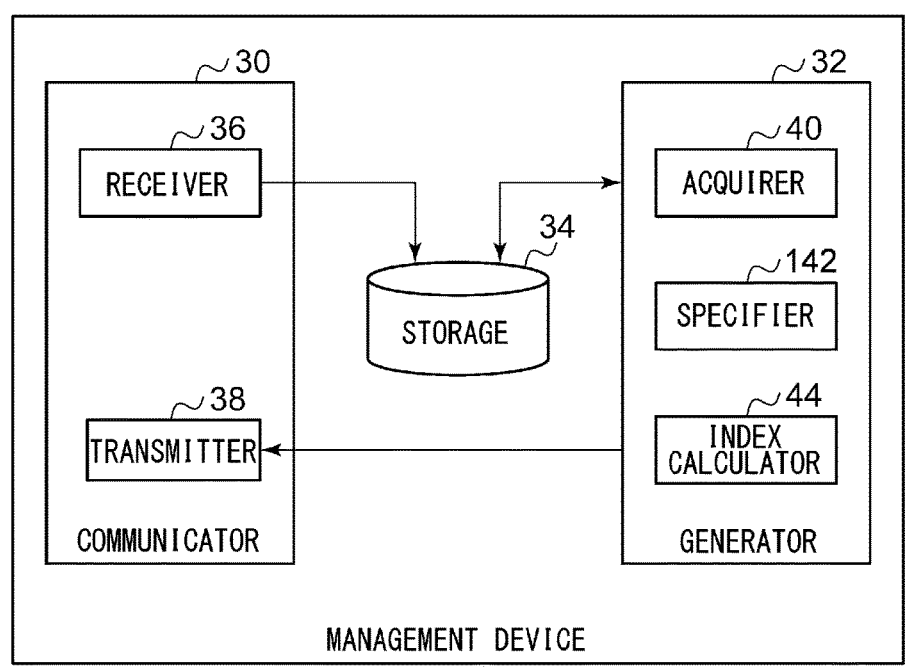
FIG. 40 is a diagram that illustrates the configuration of a management device according to Embodiment 19.

FIG. 40 illustrates the configuration of the management device 16 according to Embodiment 19. In the management device 16, an index calculator 44 is further included in the generator 32 in the configuration illustrated in FIG. 19. An acquirer 40 acquires the position registration number of the base station device 12, the group registration of the base station device 12, and the number of channels of the base station device 12 from the database illustrated in FIG. 20. The index calculator 44 derives an index representing the degree of congestion for each base station device 12 based on the acquired data. The index calculator 44 calculates an index $Z[i]$ representing the degree of congestion of the i-th base station device $12i$ by using Equation (1) or Equation (2) described above.

When the degree of congestion $Z[i]$ is large, for example, in a case where the terminal device 10 originates a call, due to absence of an empty channel or the like, there is a high possibility that communication between the terminal device 10 and the base station device 12 is not established. On the other hand, as a base station device 12 of which the value of the degree of congestion $Z[i]$ has a smaller value, it can be stated that there is a higher possibility that communication between the terminal device 10 and the base station device 12 is established. For this reason, as the degree of congestion $Z[i]$ has a smaller value, the priority level of a channel scan for the channel of the i-th base station device $12i$ may be set to be higher. For this reason, the generator 32 generates information relating to a priority level of the channel in accordance with the index calculated by the index calculator 44. In this example, while the index calculator 44 has been described to calculate the index, any other method may be used. For example, it may be configured such that each base station device 12 or another device calculates an index representing the degree of congestion of each base station device 12, and the acquirer 40 acquires the index. In such a case, the index calculator 44 of the management device 16 can be omitted.

In addition, as a modified example, the index calculator 44 may calculate an index $Z[i]$ representing the degree of congestion of the i-th base station device $12i$ by using Equation (5) or Equation (6) described above.

In addition, in Equation (5) and Equation (6), instead of $D[i]$, the number of terminal devices 10 registered in the i-th base station device $12i$, $G[i]$, the number of groups registered in the i-th base station device $12i$ may be used. In such a case, as the Busy occurrence number per one channel becomes larger, and the number of groups per one channel becomes larger, the degree of congestion $Z[i]$ has a larger value. In a radio system in which there are many group calls, the number of groups $G[i]$ may be used. In addition, the degree of congestion may be calculated using three elements including the Busy occurrence number per one channel, the position registration number per one channel, and the number of groups per one channel. Similarly to Equation (5), a weighted sum value of the three elements may be calculated. In addition, similarly to Equation (6), a multiplication value of the three elements may be calculated.

In addition, the priority levels of channels may be determined in consideration of the intensity of the electric field at the position of the terminal device 10 or the reception power of the terminal device 10. For example, as the intensity of the electric field at the position of the terminal device 10 that is a candidate to be moved among the base station devices 12 is higher, an index having a larger value is calculated for each base station device 12. Then, as the index is larger, the priority level of the channel is set to be higher. For example, a case will be considered in which a first terminal device $10a$ and a second terminal device $10b$ of the group 1 registered in a first base station device $12a$ are moved to a second base station device $12b$ or a third base station device $12c$. In order to clarify the description, here, the first terminal device $10a$ will be represented as a terminal device A, and the second terminal device $10b$ will be represented as a terminal device B.

The intensity of the electric field of the second base station device $12b$ at the position of the terminal device A will be denoted by $E(2, A)$, and the intensity of the electric field of the third base station device $12c$ will be denoted by $E(3, A)$. In addition, the intensity of the electric field of the second base station device $12b$ at the position of the terminal device B will be denoted by $E(2, B)$, and the intensity of the electric field of the third base station device $12c$ will be denoted by $E(3, B)$. A sum of the intensities of electric fields of the terminal device 10 that is a movement candidate is calculated for each base station device 12 and is used as an index. The index $S[2]$ of the second base station device $12b$ is $S[2]=E(2, A)+E(2, B)$, and the index $S[3]$ of the third base station device 12c is S[3]=E(3, A)+E(3, B). In addition, instead of calculating a sum of the intensities (reception power) of electric fields at the position of each terminal device 10, a representative value such as an average value or a median value may be calculated, and an index may be calculated using the representative value. In other words, a value aggregating the intensities (reception power) of electric fields at the positions of a plurality of terminal devices 10 may be calculated, and an index may be calculated using the value. In addition, a value corresponding to a minimum value of intensities (reception power) of electric fields of the terminal device 10 that is a movement target or a value corresponding to lowest X % thereof may be calculated for each base station device 12, and an index may be calculated using the value.

Here, the value corresponding to lowest X % is the intensity of the electric field of a terminal device 10 corresponding to the order of lowest X % in a case where terminal devices 10 are sorted in order of highest to lowest intensity of the electric field. In a case where a minimum value is used, when E(2, A)<E(2, B), S[2]=E(2, A). In addition, when E(3, A)>E(3, B), S[3]=E(3, B). Then, in a case where S[2]>S[3], the channel scan priority level of the second base station device 12b is set to be higher than that of the third base station device 12c. In addition, as data of the intensity (reception power) of the electric field at each position, positional information and information of reception power may be sequentially received from the terminal device 10, and the information may be used. Alternatively, it may be configured such that information received from a measurement device such as the terminal device 10 in the past is accumulated, a database representing the intensity of an electric field at each site is generated, and the database is used. In addition, a database representing the radio wave conditions at each site may be generated by estimating the intensity of the electric field or reception power at each site not through actual measurements but through a simulation that is in consideration of a distance from the base station device 12 or the topography.

In addition, an index that is inconsideration of both the degree of congestion and the intensity of the electric field is calculated, and the priority level of a channel may be determined according to the index. For example, an index S[i] having a larger value as the degree of congestion Z[i] is lower, and as the intensity of the electric field at the position of the terminal device 10 that is a movement candidate is larger is calculated for each base station device 12 that is a movement destination candidate to which the terminal device 10 belonging to a given group is moved. In addition, the priority level of a channel may be set to be higher as the index S[i] is larger.

According to this embodiment, since an index representing the degree of congestion of each base station device is generated while using the position registration number, the accuracy of a prediction of a channel shortage can be further improved. In other words, the accuracy of a prediction relating to the easiness in establishment of communication can be further improved. In addition, since the information relating to priority levels of channels is generated according to the index representing the degree of congestion of each base station device, the channels of the whole system can be effectively used, and a communication system easily establishing communication can be provided. In addition, since the index representing the degree of congestion of each base station device is generated while using the Busy occurrence number, the accuracy of a prediction of a channel shortage can be further improved.

As above, the present invention has been described based on the embodiments. The embodiments are examples, and it is understood by a person skilled in the art that various modified examples can be made in each constituent element thereof and a combination of processing processes, and such modified examples belong to the scope of the present invention.

In these Embodiments 1 to 19, a channel is used as the resource. However, the resource is not limited thereto, but the resource may be hardware or software for configuring and operating a computer system. According to this modified example, the degree of freedom in the configuration can be improved.

What is claimed is:

1. A management device connected to a plurality of base station devices via a network, the management device comprising:
   an acquirer that acquires, from each of the plurality of base station devices, parameters that correspond to each of the plurality of base station devices and can be used for predicting a shortage of a channel used for communication between each of the plurality of base station devices and a terminal device;
   a generator that generates information that shows a channel in which the terminal device should measure a signal in priority when performing a channel scan operation for selecting a channel used by the terminal device for communication with a base station device of the plurality of base station devices in accordance with the parameters acquired by the acquirer; and
   a transmitter that transmits the information generated by the generator to the terminal device directly or through the base station device.

2. The management device according to claim 1,
   wherein the information generated in the generator shows that, in priority to a signal in a channel used by the base station device in which the terminal device is currently registered, a signal in a channel used by another base station device should be measured by the terminal device.

3. The management device according to claim 1,
   wherein the parameters acquired by the acquirer are a number of terminal devices registered in the plurality of base station devices, and the acquirer acquires a number of terminal devices registered in a first base station device as a first parameter and acquires a number of terminal devices registered in a second base station device as a second parameter, and
   wherein the generator generates the information that show that a signal in a channel used by the second base station device should be measured in priority when a value of the first parameter is larger than a value of the second parameter.

4. The management device according to claim 1,
   wherein the parameters acquired by the acquirer are a number of terminal devices per one channel in the plurality of base station devices, and the acquirer acquires a number of terminal devices per one channel in a first base station device as a first parameter and acquires a number of terminal devices per one channel in a second base station device as a second parameter, and
   wherein the generator generates the information that shows that a signal in a channel used by the second base station device should be measured in priority when a value of the first parameter is larger than a value of the second parameter.

5. The management device according to claim 1,
wherein the parameters acquired by the acquirer are a number of groups registered in the plurality of base station devices, each group being formed by three or more terminal devices to perform one-to-many communication within a group, and the acquirer acquires a number of groups registered in a first base station device as a first parameter and acquires a number of groups registered in a second base station device as a second parameter, and
wherein the generator generates the information that shows that a signal in a channel used by the second base station device should be measured in priority when a value of the first parameter is larger than a value of the second parameter.

6. The management device according to claim 1,
wherein the parameters acquired by the acquirer are a number of groups per one channel in the plurality of base station devices, each group being formed by three or more terminal devices to perform one-to-many communication within a group, and the acquirer acquires a number of groups per one channel in a first base station device as a first parameter and acquires a number of groups per one channel in a second base station device as a second parameter, and
wherein the generator generates the information that shows that a signal in a channel used by the second base station device should be measured in priority when a value of the first parameter acquired by the acquirer is larger than a value of the second parameter.

7. The management device according to claim 1,
wherein the parameters acquired by the acquirer are busy numbers relating to a number of times of not establishing communication in the plurality of base station devices, and the acquirer acquires the busy number relating a number of times of not establishing communication in a first base station device as a first parameter and acquires the busy number relating to a number of times of not establishing communication in a second base station device as a second parameter, and
wherein the generator generates the information that shows that a signal in a channel used by the second base station device should be measured in priority to a signal in a channel used by the first base station device when a value of the first parameter acquired by the acquirer is larger than value of the second parameter.

8. The management device according to claim 1,
wherein the parameters acquired by the acquirer are values acquired by dividing busy numbers relating to a number of times of not establishing communication in the plurality of base station devices by a number of channels in the plurality of station devices, and the acquirer acquires a value acquired by dividing the busy number in a first base station device by a number of channels in the first base station device as a first parameter and acquires a value acquired by dividing the busy number in a second base station device by a number of channels in the second base station device as a second parameter, and
wherein the generator generates the information that shows that a signal in a channel used by the second base station device should be measured in priority when a value of the first parameter is larger than a value of the second parameter.

9. The management device according to claim 1, further comprising:

an index calculator that calculates indexes representing degrees of congestion of the plurality of base station devices based on the parameters acquired by the acquirer,
wherein the generator generates the information that shows that a signal in a channel used by the second base station device should be measured in priority when an index for the first base station device calculated by the index calculator is larger than an index for the second base station.

10. The management device according to claim 1,
wherein the acquirer that acquires a first parameter used to predict a shortage of a channel used in a first base station device and acquires a second parameter used to predict a shortage of a channel used in a second base station device, and
wherein the generator generates information that shows that a signal in a channel used by the second base station device should be measured in priority when a likelihood of the shortage of the channel used in the first base station device shown by the first parameter is higher than the likelihood of the shortage of the channel used in the second base station device shown by the second parameter.

11. A terminal device that communicates with one base station device among a plurality of base station devices by using a channel, the terminal device comprising:
a receiver that receives information that shows a priority channel that should be used by the terminal device in priority, the information being generated in accordance with parameters that correspond to each of the plurality of base station devices and can be used for predicting a shortage of the priority channel in the plurality of base station devices; and
a selector that measures a signal in the priority channel shown by the information received by the receiver in priority to a signal in another channel, and selects the priority channel as a channel used for communication with a base station device of the plurality of base station devices when a signal from the base station device is received in the priority channel.

12. A management method comprising:
acquiring parameters that correspond to each of a plurality of base station devices and for predicting a shortage of a channel used for communication between each of the plurality of base station devices and a terminal device;
generating information that shows a channel in which the terminal should measure a signal in priority when performing a channel scan operation for selecting a channel used by the terminal device for communication with a base station device of the plurality of base station devices in accordance with the acquired parameters; and
transmitting the generated information.

13. A management device comprising:
a specifier that specifies at least one group formed to perform one-to-many communication between three or more terminal devices that communicate using a channel;
a generator that generates information that shows a channel in which the terminal device of the three or more terminal devices belonging to the specified at least one group should measure a signal in priority when performing a channel scan operation for selecting a channel used for communication with the base station device; and a transmitter that transmits the information generated by the generator to the terminal device belonging to the specified at least one group directly or through the base station device, wherein the specifier specifies a group registered in a plurality of base station devices, and wherein the generator generates information that shows a channel in which the terminal belonging to the specified at least one group should measure a signal in priority such that a number of base station devices in which the group is registered is decreased.

14. A management device comprising:

a specifier that specifies at least one group formed to perform one-to-many communication between three or more terminal devices that communicate using a channel;

a generator that generates information that shows a channel in which the terminal device of the three or more terminal devices belonging to the specified at least one group should measure a signal in priority when performing a channel scan operation for selecting a channel used for communication with the base station device; and a transmitter that transmits the information generated by the generator to the terminal device belonging to the specified at least one group directly or through the base station device, wherein the generator selects a terminal device among a plurality of terminal devices belonging to the specified at least one group based on at least one of a position of the terminal device, a user using the terminal device, a receiving capability of the terminal device, a transmitting capability of the terminal device, and radio wave conditions at the terminal device and includes identification information of the selected terminal device in the information that shows a channel in which the terminal belonging to the specified at least one group should measure a signal in priority.

15. A management device comprising:

a specifier that specifies at least one group formed to perform one-to-many communication between three or more terminal devices that communicate using a channel;

a generator that generates information that shows a channel in which the terminal device of the three or more terminal devices belonging to the specified at least one group should measure a signal in priority when performing a channel scan operation for selecting a channel used for communication with the base station device;

a transmitter that transmits the information generated by the generator to the terminal device belonging to the specified at least one group directly or through the base station device; and an index calculator that, for each group registered in a base station device, calculates an index aggregating reception power of the terminal devices belonging to the group, wherein the generator generates the information that shows a channel in which the terminal belonging to the specified at least one group should measure a signal in priority in accordance with the index calculated by the index calculator.

* * * * *